US012756563B2

(12) United States Patent
Jakobsson et al.

(10) Patent No.: US 12,756,563 B2
(45) Date of Patent: Oct. 6, 2026

(54) SYSTEMS AND METHODS FOR TOKEN CREATION AND MANAGEMENT

(71) Applicant: Artema Labs, Inc, Los Angeles, CA (US)

(72) Inventors: Bjorn Markus Jakobsson, New York, NY (US); Stephen C. Gerber, Austin, TX (US)

(73) Assignee: Artema Labs, Inc, Los Angeles, CA (US)

( * ) Notice: Subject to any disclaimer, the term of this patent is extended or adjusted under 35 U.S.C. 154(b) by 439 days.

(21) Appl. No.: 17/808,264

(22) Filed: Jun. 22, 2022

(65) Prior Publication Data

US 2022/0407702 A1 Dec. 22, 2022

Related U.S. Application Data

(60) Provisional application No. 63/213,251, filed on Jun. 22, 2021.

(51) Int. Cl.
*H04L 9/32* (2006.01)
*H04L 9/00* (2022.01)

(52) U.S. Cl.
CPC .......... *H04L 9/3213* (2013.01); *H04L 9/3231* (2013.01); *H04L 9/50* (2022.05)

(58) Field of Classification Search
CPC ........ H04L 9/3213; H04L 9/3231; H04L 9/50
See application file for complete search history.

(56) References Cited

U.S. PATENT DOCUMENTS

| | | | | |
|---|---|---|---|---|
| 5,754,939 | A | 5/1998 | Herz et al. | |
| 8,543,649 | B2 | 9/2013 | Gilmour et al. | |
| 8,620,767 | B2 | 12/2013 | Linden et al. | |
| 9,143,542 | B1 | 9/2015 | Tseytlin | |
| 10,735,192 | B2 * | 8/2020 | Kim ...................... | H04L 9/3213 |
| 10,887,447 | B2 | 1/2021 | Jakobsson et al. | |
| 10,909,529 | B2 | 2/2021 | Ortiz et al. | |
| 10,929,512 | B1 | 2/2021 | Jakobsson | |
| 10,936,749 | B2 | 3/2021 | Jakobsson | |
| 10,951,435 | B2 | 3/2021 | Jakobsson | |
| 10,993,082 | B2 | 4/2021 | Jakobsson | |
| 11,343,107 | B2 | 5/2022 | Främling et al. | |
| 11,610,012 | B1 | 3/2023 | Maggiora et al. | |

(Continued)

FOREIGN PATENT DOCUMENTS

| | | | |
|---|---|---|---|
| EP | 3244332 | B1 | 3/2019 |
| EP | 3582439 | A1 | 12/2019 |

(Continued)

OTHER PUBLICATIONS

International Preliminary Report on Patentability received for International Application PCT/US2022/072829, Report issued Nov. 21, 2023, Mailed on Dec. 21, 2023, 7 pgs.

(Continued)

*Primary Examiner* — Sm A Rahman
(74) *Attorney, Agent, or Firm* — KPPB LLP

(57) ABSTRACT

Systems and methods for token generation and management in accordance with embodiments of the invention are illustrated. One embodiment includes a method for minting tokens. The method includes steps for identifying a set of one or more input tokens, generating an output token based on the set of input tokens, and storing the output token to a ledger.

19 Claims, 31 Drawing Sheets

(56) References Cited

U.S. PATENT DOCUMENTS

| | | | | |
|---|---|---|---|---|
| 12,277,247 | B2 | 4/2025 | Jakobsson et al. | |
| 2007/0033414 | A1* | 2/2007 | Dunko | G06F 21/1012 713/186 |
| 2008/0140602 | A1 | 6/2008 | Roth et al. | |
| 2010/0031335 | A1 | 2/2010 | Handler | |
| 2010/0191919 | A1 | 7/2010 | Bernstein et al. | |
| 2011/0238478 | A1 | 9/2011 | Gottfurcht et al. | |
| 2013/0007041 | A1 | 1/2013 | Comparelli et al. | |
| 2014/0223573 | A1 | 8/2014 | Reedy et al. | |
| 2014/0359782 | A1 | 12/2014 | Golic | |
| 2015/0339020 | A1 | 11/2015 | D'amore et al. | |
| 2016/0050188 | A1 | 2/2016 | Wilson | |
| 2016/0260089 | A1* | 9/2016 | Chen | G06Q 20/367 |
| 2016/0366245 | A1 | 12/2016 | Gupta | |
| 2017/0109839 | A1 | 4/2017 | Berryman | |
| 2017/0250816 | A1 | 8/2017 | Popa et al. | |
| 2017/0277773 | A1 | 9/2017 | Iasi et al. | |
| 2018/0077092 | A1 | 3/2018 | Jalil | |
| 2018/0114013 | A1* | 4/2018 | Sood | G06F 21/606 |
| 2019/0012637 | A1* | 1/2019 | Gillen | G06Q 10/0833 |
| 2019/0079950 | A1 | 3/2019 | Ramabaja | |
| 2019/0122152 | A1 | 4/2019 | Mccoy et al. | |
| 2019/0147495 | A1 | 5/2019 | Wilson | |
| 2019/0164153 | A1 | 5/2019 | Agrawal et al. | |
| 2019/0333031 | A1 | 10/2019 | Kravitz | |
| 2019/0356473 | A1 | 11/2019 | Rosenoer et al. | |
| 2019/0362169 | A1* | 11/2019 | Lin | G06V 30/416 |
| 2019/0394179 | A1 | 12/2019 | Androulaki et al. | |
| 2020/0027117 | A1 | 1/2020 | Cotsakos et al. | |
| 2020/0099530 | A1 | 3/2020 | Khatib et al. | |
| 2020/0106610 | A1* | 4/2020 | Doddavula | H04L 9/0637 |
| 2020/0151715 | A1 | 5/2020 | Sato et al. | |
| 2020/0200824 | A1 | 6/2020 | Narayanaswami | |
| 2020/0250633 | A1 | 8/2020 | Vinson et al. | |
| 2020/0250719 | A1 | 8/2020 | Shah | |
| 2020/0273048 | A1 | 8/2020 | Andon et al. | |
| 2020/0274712 | A1* | 8/2020 | Gray | G06Q 40/04 |
| 2020/0304289 | A1 | 9/2020 | Androulaki et al. | |
| 2020/0313855 | A1* | 10/2020 | Yin | H04L 9/3239 |
| 2020/0334752 | A1 | 10/2020 | Doney et al. | |
| 2020/0364588 | A1 | 11/2020 | Knox | |
| 2020/0387433 | A1 | 12/2020 | Wang et al. | |
| 2020/0410590 | A1 | 12/2020 | Regmi et al. | |
| 2021/0073811 | A1 | 3/2021 | Chan et al. | |
| 2021/0118532 | A1* | 4/2021 | Kho | G16H 50/70 |
| 2021/0209249 | A1* | 7/2021 | Hoffer | G16H 50/20 |
| 2021/0209684 | A1 | 7/2021 | Foote et al. | |
| 2021/0377052 | A1 | 12/2021 | Brown | |
| 2021/0390161 | A1 | 12/2021 | Nakadaira et al. | |
| 2021/0406449 | A1 | 12/2021 | Meling | |
| 2022/0020018 | A1 | 1/2022 | Jivanyan et al. | |
| 2022/0129481 | A1 | 4/2022 | Galindo et al. | |
| 2022/0147961 | A1 | 5/2022 | Yoon et al. | |
| 2022/0198524 | A1 | 6/2022 | Wang et al. | |
| 2022/0391887 | A1 | 12/2022 | Jakobsson et al. | |
| 2022/0398340 | A1 | 12/2022 | Jakobsson et al. | |
| 2022/0398538 | A1 | 12/2022 | Jakobsson et al. | |
| 2023/0050944 | A1 | 2/2023 | De La Cruz et al. | |
| 2023/0385815 | A1 | 11/2023 | Jakobsson et al. | |
| 2024/0086915 | A1 | 3/2024 | Finlow-bates | |

FOREIGN PATENT DOCUMENTS

| | | | |
|---|---|---|---|
| EP | 4356307 | A1 | 4/2024 |
| EP | 4359984 | A1 | 5/2024 |
| WO | 2020090118 | A1 | 5/2020 |
| WO | 2022178096 | A1 | 8/2022 |
| WO | 2022261650 | A2 | 12/2022 |
| WO | 2022266608 | A1 | 12/2022 |
| WO | 2022266609 | A1 | 12/2022 |
| WO | 2022272272 | A1 | 12/2022 |
| WO | 2022261650 | A3 | 1/2023 |
| WO | 2022272272 | A9 | 11/2023 |
| WO | 2024059758 | A1 | 3/2024 |

OTHER PUBLICATIONS

International Preliminary Report on Patentability received for International Application PCT/US2022/072910, Report issued Dec. 14, 2023, Mailed on Dec. 28, 2023, 9 pgs.

International Preliminary Report on Patentability received for International Application PCT/US2022/072911, Report issued Dec. 14, 2023, Mailed on Dec. 28, 2023, 8 pgs.

International Preliminary Report on Patentability received for International Application PCT/US2022/073098, Report issued Dec. 14, 2023, Mailed on Jan. 4, 2024, 5 pgs.

International Search Report and Written Opinion received for International Application No. PCT/US2022/072829, Search completed Oct. 12, 2022, Mailed Oct. 26, 2022, 17 pgs.

International Search Report and Written Opinion received for International Application No. PCT/US2022/072910, Search completed Oct. 2, 2022, Mailed on Oct. 17, 2022, 16 pgs.

International Search Report and Written Opinion received for International Application No. PCT/US2022/072911, Search completed Aug. 16, 2022, Mailed on Oct. 17, 2022, 15 pgs.

International Search Report and Written Opinion received for International Application No. PCT/US2022/073098, Search completed Aug. 20, 2022, Mailed Sep. 12, 2022, 12 pgs.

International Search Report and Written Opinion received for International Application No. PCT/US2023/074260, Search completed Dec. 8, 2023, Mailed on Feb. 9, 2024, 18 pgs.

Baden et al., "Persona: An Online Social Network with User-Defined Privacy", ACM SIGCOMM Computer Communication Review, vol. 39, No. 4, Aug. 17-21, 2009, pp. 135-146, doi: 10.1145/1594977.1592585.

Brands et al., "Distance-Bounding Protocols", Helleseth, T. (eds) Advances in Cryptology—EUROCRYPT '93, Lecture Notes in Computer Science, vol. 765, 1994, pp. 344-359, doi: 10.1007/3-540-48285-7_30.

Camenisch et al., "Signature Schemes and Anonymous Credentials from Bilinear Maps", Advances in Cryptology—CRYPTO 2004, 24th Annual International Cryptology Conference, Aug. 15-19, 2004, 22 pgs., doi: 10.1007/978-3-540-28628-8_4.

Chaum, "Untraceable Electronic Mail, Return Addresses, and Digital Pseudonyms", Communications of the ACM, vol. 24, No. 2, Feb. 1, 1981, pp. 84-88, doi: 10.1145/358549.358563.

Collberg et al., "SPLAT: A System for Self-Plagiarism Detection", Proceedings of the IADIS International Conference WWW/Internet 2003, ICWI 2003, Algarve, Portugal, Nov. 5-8, 2003, 8 pgs.

Coppersmith et al., "Almost Optimal Hash Sequence Traversal", Proceedings of the 6th international conference on financial cryptography, 2003, pp. 102-119, doi: 10.1007/3-540-36504-4_8.

Firsov et al., "BLT+L: Efficient Signatures from Timestamping and Endorsements", 18th International Conference on Security and Cryptography, vol. 1, 2021, pp. 75-86, doi: 10.5220/0010530000750086.

Goldschlag et al., "Onion Routing for Anonymous and Private Internet Connections", Communications of the ACM, vol. 42, No. 2, Feb. 1999, 6 pgs., doi: 10.1145/293411.293443.

Grozea et al., "ENCOPLOT: Pairwise Sequence Matching in Linear Time Applied to Plagiarism Detection", 3rd PAN Workshop. Uncovering Plagiarism, Authorship and Social Software Misuse, 2009, pp. 10-18.

Hastad et al., "Funkspiel Schemes: An Alternative to Conventional Tamper Resistance", CCS '00: Proceedings of the 7th ACM conference on Computer and Communications Security, Nov. 1, 2000, pp. 125-133., doi: 10.1145/352600.352619.

Jakobsson, "Financial Instruments in Recommendation Mechanisms", Financial Cryptography, Proceedings of the 6th international conference on financial cryptography, vol. 2357, Mar. 11, 2002, pp. 31-43, doi: 10.1007/3-540-36504-4_3.

Jakobsson, "On Quorum Controlled Asymmetric Proxy Re-encryption", Lecture Notes in Computer Science, vol. 1560, Oct. 29, 1999, pp. 112-121, doi: 10.1007/3-540-49162-7_9.

Maffei et al., "Privacy and Access Control for Outsourced Personal Records", IEEE Symposium on Security and Privacy, Jul. 20, 2015, pp. 341-358, doi: 10.1109/SP.2015.28.

(56) References Cited

OTHER PUBLICATIONS

Micali et al., "A Simple Method for Generating and Sharing Pseudo-Random Functions, with Applications to Clipper-like Escrow Systems", Proceedings of the 15th Annual International Cryptology Conference on Advances in Cryptology, vol. 963, Aug. 27, 1995, pp. 185-196, doi: 10.1007/3-540-44750-4_15.

Tschudin, "End-to-end Encrypted Scalable Abstract Data Types over ICN", ICN '18: Proceedings of the 5th ACM Conference on Information-Centric Networking, Sep. 21-23, 2018, pp. 88-94, doi: 10.1145/3267955.3267962.

Wang et al., "Fast and Secure Append-Only Storage with Infinite Capacity", Semantic Scholar, Computer Science, Aug. 27, 2003, 9 pgs.

Weyl et al., "Decentralized Society: Finding Web3's Soul", Available at SSRN: https://ssrn.com/abstract=4105763, May 10, 2022, 37 pgs., doi: 10.2139/ssrn.4105763.

Yin et al., "Convolutional Neural Network for Paraphrase Identification", Proceedings of the 2015 Conference of the North American Chapter of the Association for Computational Linguistics: Human Language Technologies, May 31-Jun. 5, 2015, pp. 901-911, doi: 10.3115/v1/N15-1091.

* cited by examiner

SYSTEMS AND METHODS FOR TOKEN CREATION AND MANAGEMENT

CROSS-REFERENCE TO RELATED APPLICATIONS

The current application claims the benefit of and priority under 35 U.S.C. § 119(e) to U.S. Provisional Patent Application No. 63/213,251 entitled "Token Creation and Management Structure" filed Jun. 22, 2021. The disclosure of U.S. Provisional Patent Application No. 63/213,251 is hereby incorporated by reference in its entirety for all purposes.

FIELD OF THE INVENTION

The present invention generally relates to token generation and, more specifically, the generation of associated tokens.

BACKGROUND

In spite of the big steps commerce has taken from its brick-and-mortar of just some ten to twenty years ago to online commerce, there are significant inefficiencies related to the management of information, such as identity information, and the generation of and management of interlinked digital representations of state, such as ownership, access and usage rights, and predicates about people and organizations.

SUMMARY OF THE INVENTION

Systems and methods for token generation and management in accordance with embodiments of the invention are illustrated. One embodiment includes a method for minting tokens. The method includes steps for identifying a set of one or more input tokens, generating an output token based on the set of input tokens, and storing the output token to a ledger.

In a further embodiment, the set of input tokens includes a first token, the first token includes a set of detailed information, and generating the output token includes associating the output token with a generalization of at least a portion of the set of detailed information.

In still another embodiment, the first token is an identity token associated with an individual, the set of detailed information includes a birthdate of the individual, and the generalization indicates whether an age of the individual is over a threshold value and does not include the birthdate.

In a still further embodiment, the first token is a location token, the set of detailed information includes a specific location associated with the location token, and the generalization indicates a broader geographic region surrounding the specific location and does not include the specific location.

In yet another embodiment, the set of input tokens includes a first input token with a first policy and a second input token with a second policy, the method further includes generating a third policy based on the first policy and the second policy, and generating the output token includes associating the output token with the third policy.

In a yet further embodiment, generating the output token includes storing a reference to at least one input token of the set of input tokens in the output token.

In another additional embodiment, the reference to the at least one input token is encrypted.

In a further additional embodiment, the set of input tokens includes an identity token for an individual, the output token includes a license for the individual, and generating the output token includes storing an expiration component in the output token, where a validity of the license can be determined based on the expiration component.

In another embodiment again, the expiration component is an expiration date and the license is determined to no longer be valid after the expiration date.

In a further embodiment again, the license is issued by a certifying party, and the set of input tokens includes a certificate token from the certifying party.

In still yet another embodiment, the expiration component includes a hash chain, and the validity of the license can be determined based on an amount of the hash chain that can be decrypted by the individual.

In a still yet further embodiment, the set of input tokens is a first set of input tokens and at least one of the set of input tokens was generated based on a second set of input tokens.

In still another additional embodiment, the output token includes a graph structure representing a hierarchy of tokens including the first and second sets of input tokens.

In a still further additional embodiment, generating the output token includes storing a digital signature of the set of input tokens.

In still another embodiment again, generating the output token comprises determining whether a set of one or more conditions has been met, and generating the output token is performed when the set of conditions has been met.

In a still further embodiment again, determining whether the set of conditions has been met comprises evaluating the set of input tokens to determine whether the set of input tokens meets at least one condition of the set of conditions, and generating the output token is performed when the set of input tokens meets the at least one condition.

In yet another additional embodiment, the set of input tokens includes evidence in support of an assertion and the generated output token asserts that the assertion is true when the evidence meets the at least one condition.

In a yet further additional embodiment, the set of input tokens includes a biometric verification token, evaluating the set of input tokens includes determining whether to authorize a user based on the biometric verification token and a communication with a digital rights management (DRM) unit, and the DRM unit includes a biometric scanner.

In yet another embodiment again, the biometric scanner is at least one selected from the group consisting of a fingerprint scanner, a facial scanner, and an iris scanner.

In a yet further embodiment again, the method further includes steps for providing the output token to a device to authorize operation of the device.

In another additional embodiment again, determining whether the set of conditions has been met comprises evaluating a processing environment associated with at least one of the set of input tokens and the output token meets at least one condition of the set of conditions, and generating the output token is performed when the processing environment meets the at least one condition.

In a further additional embodiment again, the at least one condition requires the processing environment to be at least one selected from the group consisting of a trusted execution environment (TEE) and an operating system (OS) that enables separation of processes and processing storage from other processes and their processing storage.

In still yet another additional embodiment, at least one of the set of input tokens includes a hash chain, and determining whether the set of conditions has been met comprises determining that at least a portion of the hash chain can be decrypted, and determining whether the set of conditions has been met based on the decrypted portion of the hash chain.

In a further embodiment, data from at least one of the set of input tokens is encrypted with a first encryption key, and generating the output token comprises decrypting the data from the at least input token, encrypting the data from the at least one input token with a different second encryption key, and storing the data encrypted with the second encryption key in the output token.

In still another embodiment, the set of input tokens includes a first token includes a first identifier of an entity associated with the first token, and the generated output token includes a second identifier of the entity and an encrypted reference to the first token.

In a still further embodiment, the first identifier is a public key associated with the entity, and the encrypted reference to the first token is an encrypted copy of the public key.

In yet another embodiment, the second identifier is at least one selected from the group consisting of a license number, a social security number, an employee ID, and a username.

In a yet further embodiment, the set of input tokens comprises an identity token associated with an entity, and a configuration token associated with preferences of the entity, wherein the configuration token is associated with a machine learning model trained to predict the preferences of the entity.

In another additional embodiment, generating the output token is further based on a signal from a set of one or more sensors.

In a further additional embodiment, the set of sensors includes a global positioning system (GPS) sensor.

In another embodiment again, the set of input tokens comprises a set of one or more content tokens, and at least one token includes instructions to render content from the set of content tokens, and generating the output token includes rendering the content from the set of content tokens based on the instructions.

In a further embodiment again, at least one of the set of input tokens represents ownership of an object and the object is at least one selected from the group consisting of a real-world object, a digital object, and a virtual object.

In still yet another embodiment, at least one of the set of input tokens includes executable code and generating the output token includes executing the executable code.

In a still yet further embodiment, at least one of the set of input tokens indicates that at least one selected from the group consisting of a payment has been made and a commitment to pay has been made.

In still another additional embodiment, generating the output token includes generating a log entry indicating use of at least one of the set of input tokens.

In a still further additional embodiment, the log entry includes an identifier of an entity associated with the at least one input token.

In still another embodiment again, the identifier is an alias for the entity.

In a still further embodiment again, the generated output token represents a request for a service from a set of providers, and the request is encrypted using a key specific to the set of providers.

In yet another additional embodiment, the output token includes a machine-readable version of an agreement and human-readable version of the agreement.

In a yet further additional embodiment, the method further includes steps for generating the machine-readable version of the agreement from the human-readable version of the agreement.

In yet another embodiment again, the method further includes steps for generating the human-readable version of the agreement from the machine-readable version of the agreement.

In a yet further embodiment again, the method further includes steps for verifying a match between the machine-readable version of the agreement and the human-readable version of the agreement.

In another additional embodiment again, the method further includes steps for verifying a match between the machine-readable version of the agreement and the human-readable version of the agreement.

In a further additional embodiment again, the ledger is at least one selected from the group consisting of a public blockchain, a private blockchain, and a private branch of a public blockchain.

One embodiment includes a non-transitory machine readable medium containing processor instructions for minting tokens, where execution of the instructions by a processor causes the processor to perform a process that comprises a method for minting tokens. The method includes steps for identifying a set of one or more input tokens, generating an output token based on the set of input tokens, and storing the output token to a ledger.

One embodiment includes token minting system including a set of one or more processors and a non-transitory machine readable medium containing processor instructions for minting tokens, where execution of the instructions by the set of processors causes the set of processors to perform a process that comprises a method for minting tokens. The method includes steps for identifying a set of one or more input tokens, generating an output token based on the set of input tokens, and storing the output token to a ledger.

Additional embodiments and features are set forth in part in the description that follows, and in part will become apparent to those skilled in the art upon examination of the specification or may be learned by the practice of the invention. A further understanding of the nature and advantages of the present invention may be realized by reference to the remaining portions of the specification and the drawings, which forms a part of this disclosure.

BRIEF DESCRIPTION OF THE DRAWINGS

The description and claims will be more fully understood with reference to the following figures and data graphs, which are presented as exemplary embodiments of the invention and should not be construed as a complete recitation of the scope of the invention.

DETAILED DESCRIPTION

Figure 1:
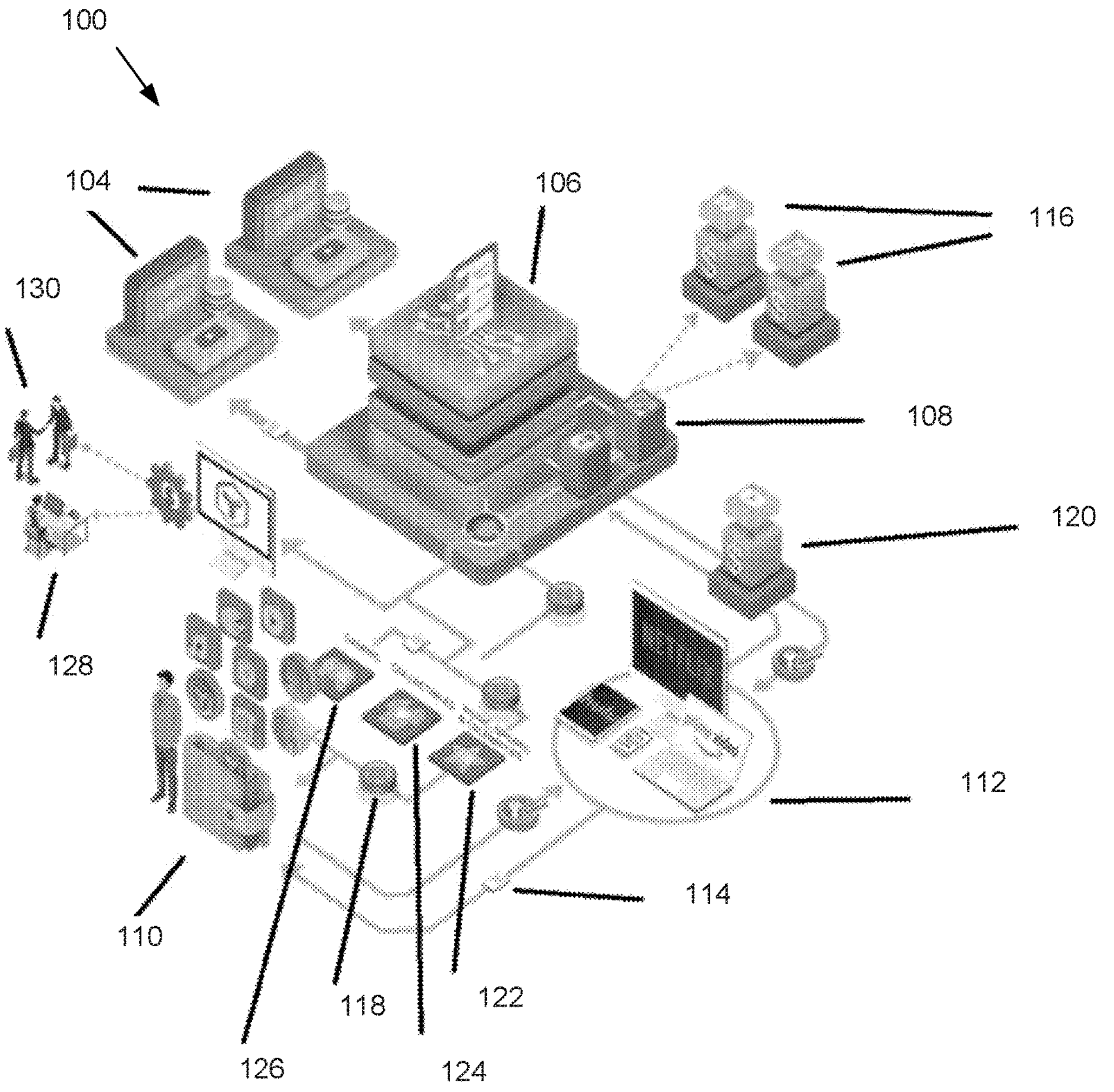
FIG. 1 is a conceptual diagram of an NFT platform in accordance with an embodiment of the invention.

Systems and methods in accordance with many embodiments of the invention provide for the creation and management of tokens in a blockchain-based NFT platform. In numerous embodiments, systems and methods for token management can create and implement new digital structures for memorializing and managing information (e.g., credentials, identities, state information, etc.). Processes in accordance with many embodiments of the invention can generate and/or determine the correctness of such digital structures. Token management in accordance with certain embodiments of the invention can enable the creation of a powerful distributed computational structure that far exceeds the capabilities of traditional computing systems, both in functionality, dynamic capabilities, and speed of computing. In a variety of embodiments, machine learning technologies and artificial intelligence can be utilized for the creation and interpretation of such tokens.

Token management in accordance with various embodiments of the invention can allow a system to provide various benefits, such as (but not limited to), enforcing controlled access, increasing privacy, creating trust in untrusted environments, etc. For example, in order to provide various levels of access and privacy, tokens in accordance with several embodiments of the invention can be stored on various types of ledgers, such as (but not limited to) public, private, centralized, and/or decentralized ledgers. In several embodiments, tokens and/or ledger entries related to tokens can be stored on personalized branches of a public ledger. In some embodiments, tokens (or portions thereof) can be encrypted and/or digitally signed in order to provide privacy, authenticate entities, verify relationships between tokens, verify provenance of a token, etc.

Tokens in accordance with a number of embodiments of the invention can include various components, such as (but not limited to), content data, conditional data, association data, etc. Content data in accordance with a number of embodiments of the invention can include various types of data contained in tokens, such as (but not limited to), identity data, characteristic data, metadata, licenses, media content (e.g., video, audio, text, etc.), and/or references to such data. In many embodiments, content data can include executable data (e.g., scripts, executable code, etc.) that can be executed (e.g., to provide services associated with the token).

In several embodiments, conditional data can include rules (or policies) that indicate permitted actions for a token, such as (but not limited to), acceptable inputs for a token, output types that can be generated for a token, secure environments in which the token can be executed, ways in which content can be used, etc. For example, conditional data in accordance with many embodiments of the invention can include licenses that state limits to the use of media content associated with a token. In many embodiments, conditional data can include expiration dates and/or other rules for determining whether a token has been revoked or is still valid. In various embodiments, conditional data can include hash chains. Hash chains in accordance with several embodiments of the invention can be used for various purposes, such as (but not limited to) renewing a token, extending an expiration date, modifying capabilities of a token, etc. Conditional data in accordance with various embodiments of the invention can be the content data for a token that provides conditions for content of another associated token.

Association data in accordance with a variety of embodiments of the invention can include data that indicates an association or relationship. Tokens in accordance with certain embodiments of the invention can be associated with other tokens in various ways, such as (but not limited to) storing a reference to one or more other tokens, being derived from one or more other tokens, acting as an input (e.g., providing assertions, content, data, etc.) to another token, providing a service to another token, relating two or more tokens, etc. Tokens with associations with other tokens in accordance with a number of embodiments of the invention can include (but are not limited to) derived tokens, relative tokens, inheritance tokens, etc. In various embodiments, tokens can be associated in a hierarchical fashion. Hierarchies of tokens in accordance with various embodiments of the invention can be represented in a graph structure.

In a number of embodiments, associations can be made between a token and another token and/or with other entities (such as, but not limited to, devices, physical objects, virtual objects, preferences, configurations, locations, rights/capabilities, people, and/or organizations). Entities in accordance with a variety of embodiments of the invention include virtual, digital, and/or real-world entities.

In many embodiments, tokens (or other computational constructs) can be associated with entities. In numerous embodiments, multiple tokens can be associated with each other to represent various aspects of the entity. Entity aspects in accordance with several embodiments of the invention can include (but are not limited to) related entities, characteristics of the entity, rules, contracts, rights/capabilities associated with the entity, conditions, goals specified by entity, etc. In some embodiments, tokens can be associated with other entities to indicate a relationship with that entity, such as (but not limited to) parties to an agreement, partners in an endeavor, requestor/recipient of a service, ownership of an object, etc.

An example of tokens that can be associated with entities and with other tokens can be described with reference to identity tokens, alias tokens, and location tokens. In a number of embodiments, identity tokens may be associated with an individual's identity. Identity tokens in accordance with numerous embodiments of the invention can include an individual's personally identifiable characteristics, such as (but not limited to) their name, place and/or date of birth, biometrics, etc. Alias tokens in accordance with certain embodiments of the invention can be a privacy token derived from identity tokens and include an alias (or pseudonym) to protect the identity of the user, while still providing a verifiable link to the identity. In various embodiments, privacy tokens can include generalizations of potentially sensitive information to provide a requesting party with an appropriate level of information without exposing sensitive information. For example, privacy tokens in accordance with various embodiments of the invention can include an assertion that an entity is of an appropriate age, without exposing the entities date of birth or specific age. In this example, the alias token may also be a linked token, containing a reference to the identity token (e.g., an encrypted identifier). Location tokens in accordance with a number of embodiments of the invention can be a token associated with a location. In this example, a relative token can be generated based on the location token and the identity token, to indicate the relationship of two or more other tokens (e.g., the alias and the location tokens).

Tokens in accordance with numerous embodiments of the invention can be used to provide services. In certain embodiments, services can include (but are not limited to) authentication, authorization, contract execution, verification, token minting, content composition, logging, access control, utilization analysis, matching, token management, etc. Tokens in accordance with several embodiments of the invention can represent an agreement (or token) between parties. Agreements in accordance with a variety of embodiments of the invention can be machine readable, human readable, or both. In certain embodiments, machine readable agreements can be verified and/or generated from human readable agreements or vice versa.

In a variety of embodiments, service tokens can take various inputs to provide various outputs. Inputs in accordance with a variety of embodiments of the invention can include, but are not limited to, other tokens, assertions from third parties, ledger entries, sensor data, etc. For example, biometric authentication tokens in accordance with certain embodiments of the invention can take as input results from a biometric sensor (e.g., fingerprint, iris scan, etc.) to determine whether to output an authentication for a user. Outputs in accordance with a variety of embodiments of the invention can include (but are not limited to) assertions, authorizations, authentications, payments, ledger entries, minted tokens, etc.

Although many of the examples described herein tokens with reference to a single characteristic, one skilled in the art will recognize that tokens may have characteristics of multiple different tokens in a variety of applications without departing form this invention, and that the identification of a specific characteristic or token type does not exclude the token from having characteristics of other token types. For example, an alias token may be a derived token (e.g., derived from an identity token) with an alternative identity, a linked token (e.g., containing a reference to the identity token), a protected token (e.g., where the reference to the identity token is encrypted), a privacy token (e.g., including generalizations of sensitive data), a conditional token (e.g., a token with rules surrounding use of the token), a services token (e.g., an executable token that can provide some output), etc. Other examples of various tokens and their relations to various other tokens are described throughout this description.

Turning now to the drawings, systems and methods for implementing blockchain-based Non-Fungible Token (NFT) platforms in accordance with various embodiments of the invention are illustrated. In several embodiments, blockchain-based NFT platforms are platforms which enable content creators to issue, mint, and transfer Non-Fungible Tokens (NFTs) directed to content including, but not limited to, rich media content.

In a number of embodiments, content creators can issue NFTs to users within the NFT platform. NFTs can be created around a large range of real-world media content and intellectual property. Movie studios can mint digital collectibles for their movies, characters, notable scenes and/or notable objects. Record labels can mint digital collectibles for artists, bands, albums and/or songs. Similarly, official digital trading cards can be made from likeness of celebrities, cartoon characters and/or gaming avatars.

NFTs minted using NFT platforms in accordance with various embodiments of the invention can have multifunctional programmable use cases including rewards, private access to premium content and experiences, as discounts toward the purchase of goods, among many other value-added use cases.

In many embodiments, each NFT can have a set of attributes that define its unique properties. NFTs may therefore be classified based on which attributes are emphasized. Possible classifications may address, but are not limited to: NFTs as identifying entities, NFTs output by other NFTs, NFTs as content creation assets, and NFTs as evaluating entities. NFTs can be interpreted differently by various platforms in order to create platform-specific user experiences. The metadata associated with an NFT may also include digital media assets such as (but not limited to) images, videos about the specific NFT, and the context in which it was created (studio, film, band, company song etc.).

In many embodiments, NFT storage may be facilitated through mechanisms for the transfer of payment from users to one or more service providers. Through these mechanisms, a payment system for NFT maintenance can allow for incremental payment and ongoing asset protection. NFT storage may be additionally self-regulated through willing participants disclosing unsatisfactory NFT management in exchange for rewards.

In many embodiments, the NFT platform can include media wallet applications that enable users to securely store NFTs and/or other tokens on their devices. Furthermore, media wallets (also referred to as "digital wallets") can enable users to obtain NFTs that prove purchase of rights to access a particular piece of media content on one platform and use the NFT to gain access to the purchased content on another platform. The consumption of such content may be governed by content classification directed to visual user interface systems.

In several embodiments, users can download and install media wallet applications to store NFTs on the same computing devices used to consume streamed and/or downloaded content. Media wallet applications and NFTs can disseminate data concerning media consumption on the computing devices on which the media wallet applications are installed and/or based upon observations indicative of media consumption independently of the device. Media consumption data may include, but is not limited to, data reporting the occurrence of NFT transactions, data reporting the occurrence of NFT event interactions data reporting the content of NFT transactions, data reporting the content of media wallet interactions, and/or data reporting the occurrence of media wallet interactions.

While various aspects of NFT platforms, NFTs, media wallets, blockchain configurations, reporting structures, and maintenance systems are discussed above, NFT platforms and different components that can be utilized within NFT platforms in accordance with various embodiments of the invention are discussed further below.

NFT Platforms

An NFT platform in accordance with an embodiment of the invention is illustrated in FIG. 1. The NFT platform 100 utilizes one or more immutable ledgers (e.g. one or more blockchains) to enable a number of verified content creators 104 to access an NFT registry service to mint NFTs 106 in a variety of forms including (but not limited to) celebrity NFTs 122, character NFTs from games 126, NFTs that are redeemable within games 126, NFTs that contain and/or enable access to collectibles 124, and NFTs that have evolutionary capabilities representative of the change from one NFT state to another NFT state.

Issuance of NFTs 106 via the NFT platform 100 enables verification of the authenticity of NFTs independently of the content creator 104 by confirming that transactions written to one or more of the immutable ledgers are consistent with the smart contracts 108 underlying the NFTs.

As is discussed further below, content creators 104 can provide the NFTs 106 to users to reward and/or incentivize engagement with particular pieces of content and/or other user behavior including (but not limited to) the sharing of user personal information (e.g. contact information or user ID information on particular services), demographic information, and/or media consumption data with the content creator and/or other entities. In addition, the smart contracts 108 underlying the NFTs can cause payments of residual royalties 116 when users engage in specific transactions involving NFTs (e.g. transfer of ownership of the NFT).

In a number of embodiments, users utilize media wallet applications 110 on their devices to store NFTs 106 distributed using the NFT platform 100. Users can use media wallet applications 110 to obtain and/or transfer NFTs 106. In facilitating the retention or transfer of NFTs 106, media wallet applications may utilize wallet user interfaces that engage in transactional restrictions through either uniform or personalized settings. Media wallet applications 110 in accordance with some embodiments may incorporate NFT filtering systems to avoid unrequested NFT assignment. Methods for increased wallet privacy may also operate through multiple associated wallets with varying capabilities. As can readily be appreciated, NFTs 106 that are implemented using smart contracts 108 having interfaces that comply with open standards are not limited to being stored within media wallets and can be stored in any of a variety of wallet applications as appropriate to the requirements of a given application. Furthermore, a number of embodiments of the invention support movement of NFTs 106 between different immutable ledgers. Processes for moving NFTs between multiple immutable ledgers in accordance with various embodiments of the invention are discussed further below.

In several embodiments, content creators 104 can incentivize users to grant access to media consumption data using offers including (but not limited to) offers of fungible tokens 118 and/or NFTs 106. In this way, the ability of the content creators to mint NFTs enables consumers to engage directly with the content creators and can be utilized to incentivize users to share with content creators' data concerning user interactions with additional content. The permissions granted by individual users may enable the content creators 104 to directly access data written to an immutable ledger. In many embodiments, the permissions granted by individual users enable authorized computing systems to access data within an immutable ledger and content creators 104 can query the authorized computing systems to obtain aggregated information. Numerous other example functions for content creators 104 are possible, some of which are discussed below.

NFT blockchains in accordance with various embodiments of the invention enable issuance of NFTs by verified users. In many embodiments, the verified users can be content creators that are vetted by an administrator of networks that may be responsible for deploying and maintaining the NFT blockchain. Once the NFTs are minted, users can obtain and conduct transactions with the NFTs. In several embodiments, the NFTs may be redeemable for items or services in the real world such as (but not limited to) admission to movie screenings, concerts, and/or merchandise.

As illustrated in FIG. 1, users can install the media wallet application 110 onto their devices and use the media wallet application 110 to purchase fungible tokens. The media wallet application could also be provided by a browser, or by a dedicated hardware unit executing instructions provided by a wallet manufacturer. The different types of wallets may have slightly different security profiles and may offer different features, but would all be able to be used to initiate the change of ownership of tokens, such as NFTs. In many embodiments, the fungible tokens can be fully converted into fiat currency and/or other cryptocurrency. In several embodiments, the fungible tokens are implemented using split blockchain models in which the fungible tokens can be issued to multiple blockchains (e.g. Ethereum). As can readily be appreciated, the fungible tokens and/or NFTs utilized within an NFT platform in accordance with various embodiments of the invention are largely dependent upon the requirements of a given application.

In several embodiments, the media wallet application is capable of accessing multiple blockchains by deriving accounts from each of the various immutable ledgers used within an NFT platform. For each of these blockchains, the media wallet application can automatically provide simplified views whereby fungible tokens and NFTs across multiple accounts and/or multiple blockchains can be rendered as single user profiles and/or wallets. In many embodiments, the single view can be achieved using deep-indexing of the relevant blockchains and API services that can rapidly provide information to media wallet applications in response to user interactions. In certain embodiments, the accounts across the multiple blockchains can be derived using BIP32 deterministic wallet key. In other embodiments, any of a variety of techniques can be utilized by the media wallet application to access one or more immutable ledgers as appropriate to the requirements of a given application.

NFTs can be purchased by way of exchanges 130 and/or from other users. In addition, content creators can directly issue NFTs to the media wallets of specific users (e.g. by way of push download or AirDrop). In many embodiments, the NFTs are digital collectibles such as celebrity NFTs 122, character NFTs from games 126, NFTs that are redeemable within games 126, and/or NFTs that contain and/or enable access to collectibles 124. It should be appreciated that a variety of NFTs are described throughout the discussion of the various embodiments described herein and can be utilized in any NFT platform and/or with any media wallet application.

While the NFTs are shown as static in the illustrated embodiment, content creators can utilize users' ownership of NFTs to engage in additional interactions with the user. In this way, the relationship between users and particular pieces of content and/or particular content creators can evolve over time around interactions driven by NFTs. In a number of embodiments, collection of NFTs can be gamified to enable unlocking of additional NFTs. In addition, leaderboards can be established with respect to particular content and/or franchises based upon users' aggregation of NFTs. As is discussed further below, NFTs and/or fungible tokens can also be utilized by content creators to incentivize users to share data.

NFTs minted in accordance with several embodiments of the invention may incorporate a series of instances of digital content elements in order to represent the evolution of the digital content over time. Each one of these digital elements can have multiple numbered copies, just like a lithograph, and each such version can have a serial number associated with it, and/or digital signatures authenticating its validity. The digital signature can associate the corresponding image to an identity, such as the identity of the artist. The evolution of digital content may correspond to the transition from one representation to another representation. This evolution may be triggered by the artist, by an event associated with the owner of the artwork, by an external event measured by platforms associated with the content, and/or by specific combinations or sequences of event triggers. Some such NFTs may also have corresponding series of physical embodiments. These may be physical and numbered images that are identical to the digital instances described above. They may also be physical representations of another type, e.g., clay figures or statues, whereas the digital representations may be drawings. The physical embodiments may further be of different aspects that relate to the digital series. Evolution in compliance with some embodiments may also be used to spawn additional content, for example, one NFT directly creating one or more secondary NFTs.

When the user wishes to purchase an NFT using fungible tokens, media wallet applications can request authentication of the NFT directly based upon the public key of the content creator and/or indirectly based upon transaction records within the NFT blockchain. As discussed above, minted NFTs can be signed by content creators and administrators of the NFT blockchain. In addition, users can verify the authenticity of particular NFTs without the assistance of entities that minted the NFT by verifying that the transaction records involving the NFT within the NFT blockchain are consistent with the various royalty payment transactions required to occur in conjunction with transfer of ownership of the NFT by the smart contract underlying the NFT.

Applications and methods in accordance with various embodiments of the invention are not limited to media wallet applications or use within NFT platforms. Accordingly, it should be appreciated that the data collection capabilities of any media wallet application described herein can also be implemented outside the context of an NFT platform and/or in a dedicated application and/or in an application unrelated to the storage of fungible tokens and/or NFTs. Various systems and methods for implementing NFT platforms and media wallet applications in accordance with various embodiments of the invention are discussed further below.

NFT Platform Network Architectures

NFT platforms in accordance with many embodiments of the invention utilize public blockchains and permissioned blockchains. In several embodiments, the public blockchain is decentralized and universally accessible. Additionally, in a number of embodiments, private/permissioned blockchains are closed systems that are limited to publicly inaccessible transactions. In many embodiments, the permissioned blockchain can be in the form of distributed ledgers, while the blockchain may alternatively be centralized in a single entity.

Figure 2:
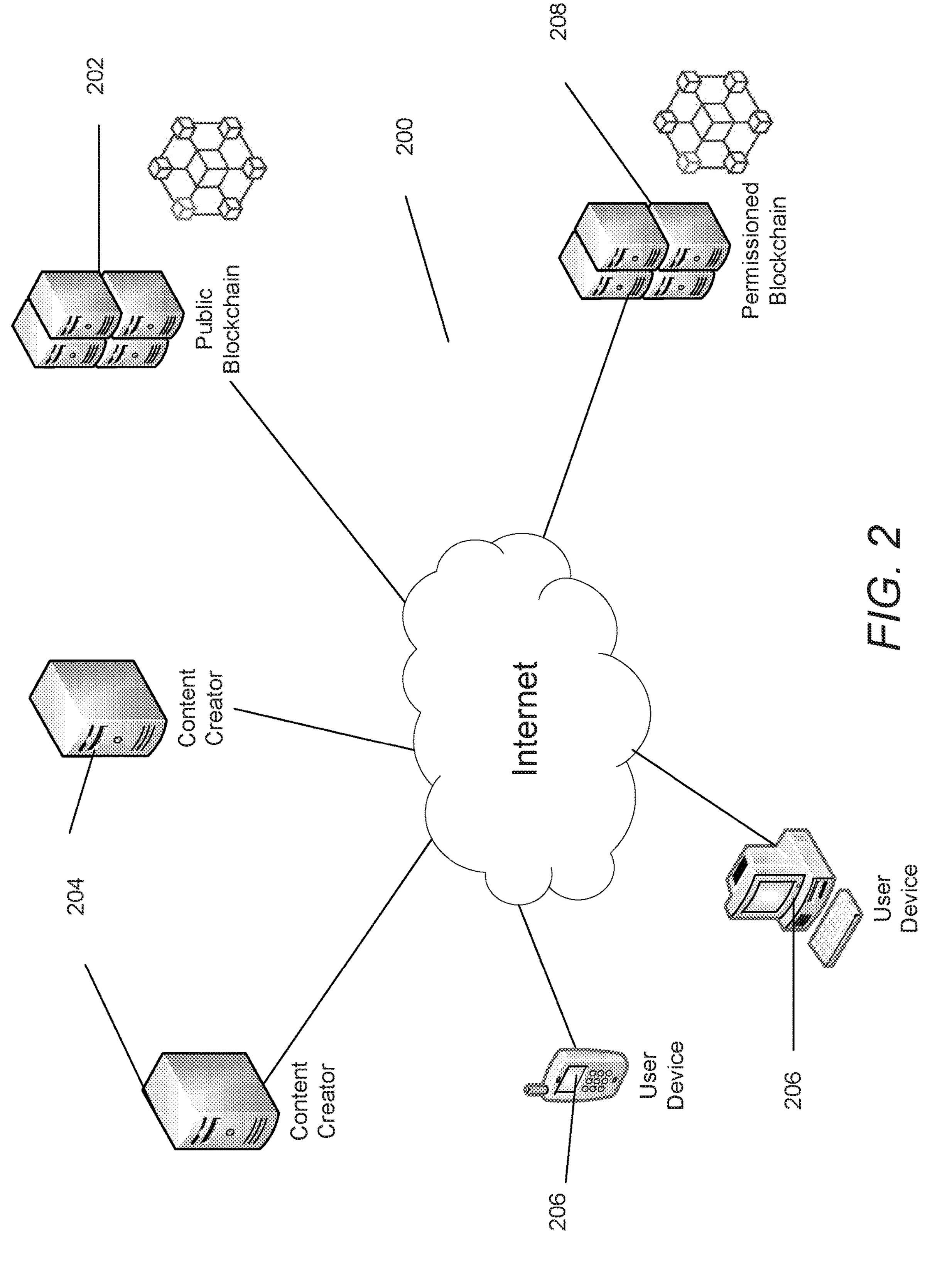
FIG. 2 is a network architecture diagram of an NFT platform in accordance with an embodiment of the invention.

An example of network architecture that can be utilized to implement an NFT platform including a public blockchain and a permissioned blockchain in accordance with several embodiments of the invention is illustrated in FIG. 2. The NFT platform 200 utilizes computer systems implementing a public blockchain 202 such as (but not limited to) Ethereum and Solana. A benefit of supporting interactions with public blockchains 202 is that the NFT platform 200 can support minting of standards based NFTs that can be utilized in an interchangeable manner with NFTs minted by sources outside of the NFT platform on the public blockchain. In this way, the NFT platform 200 and the NFTs minted within the NFT platform are not part of a walled garden, but are instead part of a broader blockchain-based ecosystem. The ability of holders of NFTs minted within the NFT platform 200 to transact via the public blockchain 202 increases the likelihood that individuals acquiring NFTs will become users of the NFT platform. Initial NFTs minted outside the NFT platform can also be developed through later minted NFTs, with the initial NFTs being used to further identify and interact with the user based upon their ownership of both NFTs. Various systems and methods for facilitating the relationships between NFTs, both outside and within the NFT platform are discussed further below.

Users can utilize user devices configured with appropriate applications including (but not limited to) media wallet applications to obtain NFTs. In many embodiments, media wallets are smart device enabled, front-end applications for fans and/or consumers, central to all user activity on an NFT platform. As is discussed in detail below, different embodiments of media wallet applications can provide any of a variety of functionality that can be determined as appropriate to the requirements of a given application. In the illustrated embodiment, the user devices 206 are shown as mobile phones and personal computers. As can readily be appreciated user devices can be implemented using any class of consumer electronics device including (but not limited to) tablet computers, laptop computers, televisions, game consoles, virtual reality headsets, mixed reality headsets, augmented reality headsets, media extenders, and/or set top boxes as appropriate to the requirements of a given application.

In many embodiments, NFT transaction data entries in the permissioned blockchain 208 are encrypted using users' public keys so that the NFT transaction data can be accessed by the media wallet application. In this way, users control access to entries in the permissioned blockchain 208 describing the user's NFT transaction. In several embodiments, users can authorize content creators 204 to access NFT transaction data recorded within the permissioned blockchain 208 using one of a number of appropriate mechanisms including (but not limited to) compound identities where the user is the owner of the data and the user can authorize other entities as guests that can also access the data. As can readily be appreciated, particular content creators' access to the data can be revoked by revoking their status as guests within the compound entity authorized to access the NFT transaction data within the permissioned blockchain 208. In certain embodiments, compound identities are implemented by writing authorized access records to the permissioned blockchain using the user's public key and the public keys of the other members of the compound entity.

When content creators wish to access particular pieces of data stored within the permissioned blockchain 208, they can make a request to a data access service. The data access service may grant access to data stored using the permissioned blockchain 208 when the content creators' public keys correspond to public keys of guests. In a number of embodiments, guests may be defined within a compound identity. The access record for the compound entity may also authorize the compound entity to access the particular piece of data. In this way, the user has complete control over access to their data at any time by admitting or revoking content creators to a compound entity, and/or modifying the access policies defined within the permissioned blockchain 208 for the compound entity. In several embodiments, the permissioned blockchain 208 supports access control lists and users can utilize a media wallet application to modify permissions granted by way of the access control list. In many embodiments, the manner in which access permissions are defined enables different restrictions to be placed on particular pieces of information within a particular NFT transaction data record within the permissioned blockchain 208. As can readily be appreciated, the manner in which NFT platforms and/or immutable ledgers provide fine-grained data access permissions largely depends upon the requirements of a given application.

In many embodiments, storage nodes within the permissioned blockchain 208 do not provide content creators with access to entire NFT transaction histories. Instead, the storage nodes simply provide access to encrypted records. In several embodiments, the hash of the collection of records from the permissioned blockchain is broadcast. Therefore, the record is verifiably immutable and each result includes the hash of the record and the previous/next hashes. As noted above, the use of compound identities and/or access control lists can enable users to grant permission to decrypt certain pieces of information or individual records within the permissioned blockchain. In several embodiments, the access to the data is determined by computer systems that implement permission-based data access services.

In many embodiments, the permissioned blockchain 208 can be implemented using any blockchain technology appropriate to the requirements of a given application. As noted above, the information and processes described herein are not limited to data written to permissioned blockchains 208, and NFT transaction data simply provides an example. Systems and methods in accordance with various embodiments of the invention can be utilized to enable applications to provide fine-grained permission to any of a variety of different types of data stored in an immutable ledger as appropriate to the requirements of a given application in accordance with various embodiments of the invention.

While various implementations of NFT platforms are described above with reference to FIG. 2, NFT platforms can be implemented using any number of immutable and pseudo-immutable ledgers as appropriate to the requirements of specific applications in accordance with various embodiments of the invention. Blockchain databases in accordance with various embodiments of the invention may be managed autonomously using peer-to-peer networks and distributed timestamping servers. In some embodiments, any of a variety of consensus mechanisms may be used by public blockchains, including but not limited to Proof of Space mechanisms, Proof of Work mechanisms, Proof of Stake mechanisms, and hybrid mechanisms.

NFT platforms in accordance with many embodiments of the invention may benefit from the oversight and increased security of private blockchains. As can readily be appreciated, a variety of approaches can be taken to the writing of data to permissioned blockchains and the particular approach is largely determined by the requirements of particular applications. As such, computer systems in accordance with various embodiments of the invention can have the capacity to create verified NFT entries written to permissioned blockchains.

Figure 3:
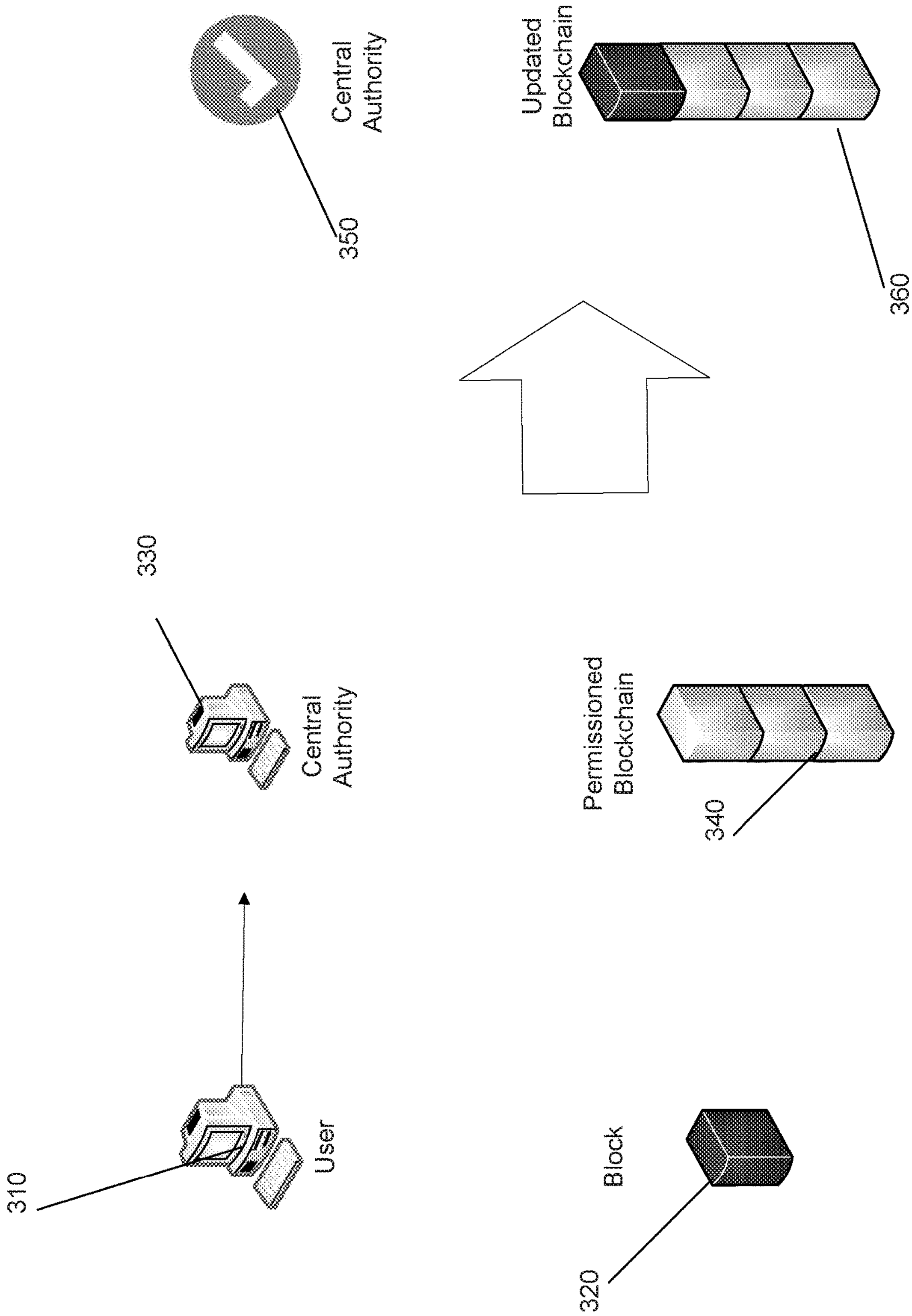
FIG. 3 is a conceptual diagram of a permissioned blockchain in accordance with an embodiment of the invention.

An implementation of permissioned (or private) blockchains in accordance with some embodiments of the invention is illustrated in FIG. 3. Permissioned blockchains 340 can typically function as closed computing systems in which each participant is well defined. In several embodiments, private blockchain networks may require invitations. In a number of embodiments, entries, or blocks 320, to private blockchains can be validated. In some embodiments, the validation may come from central authorities 330. Private blockchains can allow an organization or a consortium of organizations to efficiently exchange information and record transactions. Specifically, in a permissioned blockchain, a preapproved central authority 330 (which should be understood as potentially encompassing multiple distinct authorized authorities) can approve a change to the blockchain. In a number of embodiments, approval may come without the use of a consensus mechanism involving multiple authorities. As such, through a direct request from users 310 to the central authority 330, the determination of whether blocks 320 can be allowed access to the permissioned blockchain 340 can be determined. Blocks 320 needing to be added, eliminated, relocated, and/or prevented from access may be controlled through these means. In doing so the central authority 330 may manage accessing and controlling the network blocks incorporated into the permissioned blockchain 340. Upon the approval 350 of the central authority, the now updated blockchain 360 can reflect the added block 320.

NFT platforms in accordance with many embodiments of the invention may also benefit from the anonymity and accessibility of a public blockchain. Therefore, NFT platforms in accordance with many embodiments of the invention can have the capacity to create verified NFT entries written to a permissioned blockchain.

Figure 4:
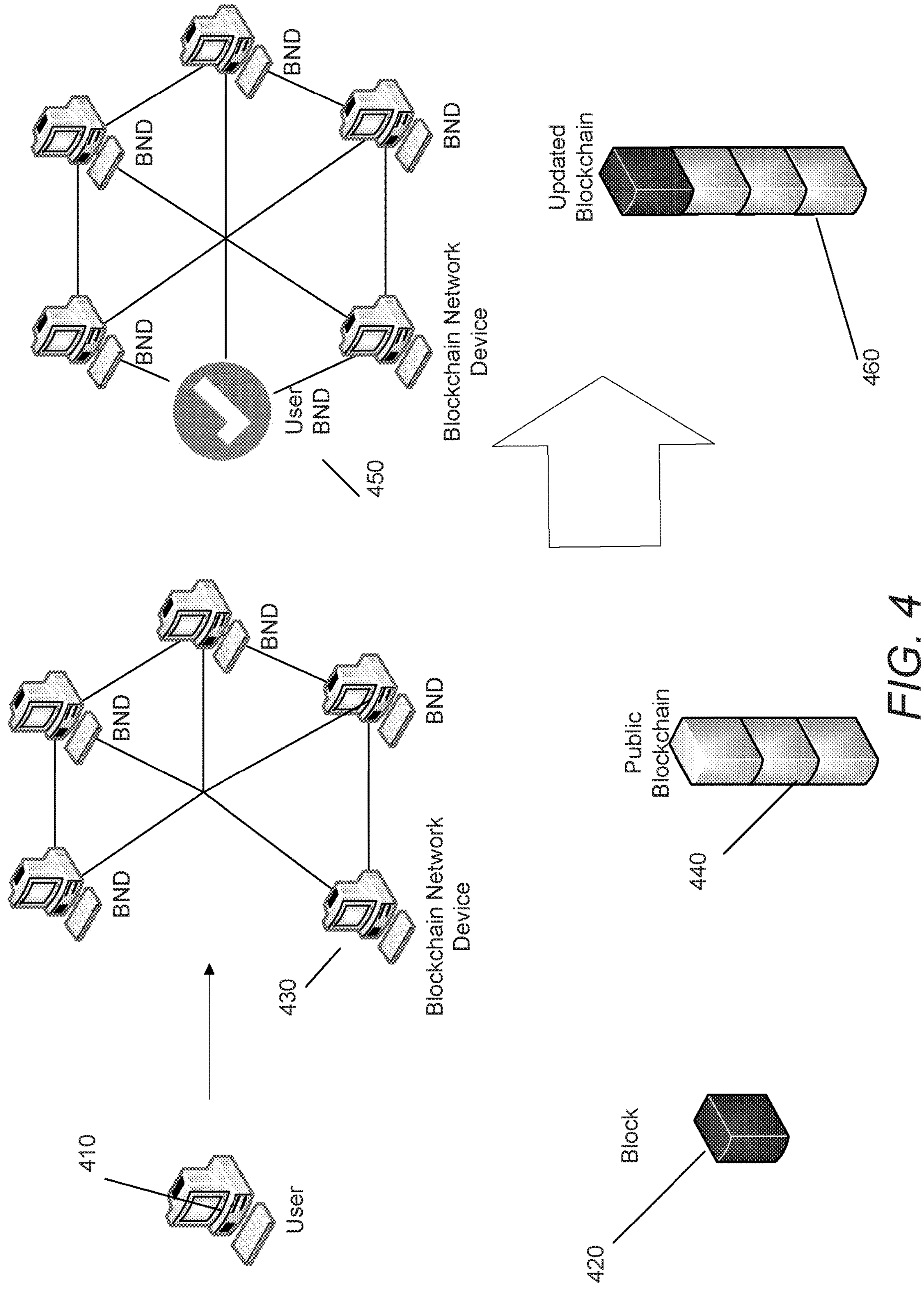
FIG. 4 is a conceptual diagram of a permissionless blockchain in accordance with an embodiment of the invention.

An implementation of a permissionless, decentralized, or public blockchain in accordance with an embodiment of the invention is illustrated in FIG. 4. In a permissionless blockchain, individual users 410 can directly participate in relevant networks and operate as blockchain network devices 430. As blockchain network devices 430, parties would have the capacity to participate in changes to the blockchain and participate in transaction verifications (via the mining mechanism). Transactions are broadcast over the computer network and data quality is maintained by massive database replication and computational trust. Despite being decentralized, an updated blockchain 460 cannot remove entries, even if anonymously made, making it immutable. In many decentralized blockchains, many blockchain network devices 430, in the decentralized system may have copies of the blockchain, allowing the ability to validate transactions. In many instances, the blockchain network device 430 can personally add transactions, in the form of blocks 420 appended to the public blockchain 440. To do so, the blockchain network device 430 would take steps to allow for the transactions to be validated 450 through various consensus mechanisms (Proof of Work, Proof of Stake, etc.). A number of consensus mechanisms in accordance with various embodiments of the invention are discussed further below.

Additionally, in the context of blockchain configurations, the term smart contract is often used to refer to software programs that run on blockchains. While a standard legal contract outlines the terms of a relationship (usually one enforceable by law), a smart contract enforces a set of rules using self-executing code within NFT platforms. As such, smart contracts may have the means to automatically enforce specific programmatic rules through platforms. Smart contracts are often developed as high-level programming abstractions that can be compiled down to bytecode. Said bytecode may be deployed to blockchains for execution by computer systems using any number of mechanisms deployed in conjunction with the blockchain. In many instances, smart contracts execute by leveraging the code of other smart contracts in a manner similar to calling upon a software library.

A number of existing decentralized blockchain technologies intentionally exclude or prevent rich media assets from existing within the blockchain, because they would need to address content that is not static (e.g., images, videos, music files). Therefore, NFT platforms in accordance with many embodiments of the invention may address this with blockchain mechanisms, that preclude general changes but account for updated content.

NFT platforms in accordance with many embodiments of the invention can therefore incorporate decentralized storage pseudo-immutable dual blockchains. In some embodiments, two or more blockchains may be interconnected such that traditional blockchain consensus algorithms support a first blockchain serving as an index to a second, or more, blockchains serving to contain and protect resources, such as the rich media content associated with NFTs.

In storing rich media using blockchain, several components may be utilized by an entity ("miner") adding transactions to said blockchain. References, such as URLs, may be stored in the blockchain to identify assets. Multiple URLs may also be stored when the asset is separated into pieces. An alternative or complementary option may be the use of APIs to return either the asset or a URL for the asset. In accordance with many embodiments of the invention, references can be stored by adding a ledger entry incorporating the reference enabling the entry to be timestamped. In doing so, the URL, which typically accounts for domain names, can be resolved to IP addresses. However, when only files of certain types are located on particular resources, or where small portions of individual assets are stored at different locations, users may require methods to locate assets stored on highly-splintered decentralized storage systems. To do so, systems may identify at least primary asset destinations and update those primary asset destinations as necessary when storage resources change. The mechanisms used to identify primary asset destinations may take a variety of forms including, but not limited to, smart contracts.

Figure 5A:
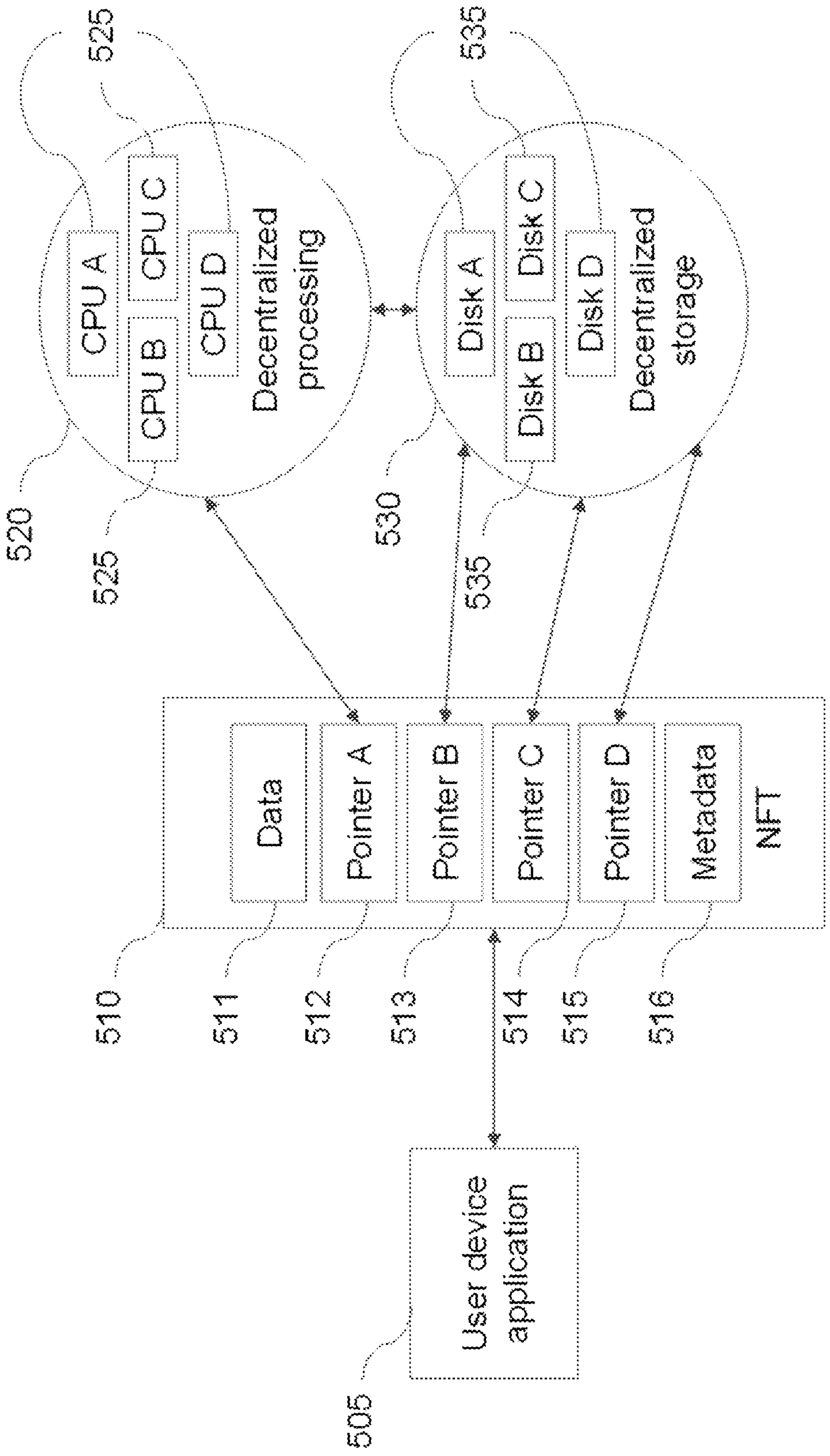
FIGS. 5A-5B are diagrams of a dual blockchain in accordance with a number of embodiments of the invention.

A dual blockchain, including decentralized processing 520 and decentralized storage 530 blockchains, in accordance with some embodiments of the invention is illustrated in FIG. 5A. Application running on devices 505, may interact with or make a request related to NFTs 510 interacting with such a blockchain. An NFT 510 in accordance with several embodiments of the invention may include many values including generalized data 511 (e.g. URLs), and pointers such as pointer A 512, pointer B 513, pointer C 514, and pointer D 515. In accordance with many embodiments of the invention, the generalized data 511 may be used to access corresponding rich media through the NFT 510. The NFT 510 may additionally have associated metadata 516.

Pointers within the NFT 510 may direct an inquiry toward a variety of on or off-ledger resources. In some embodiments of the invention, as illustrated FIG. 5A, pointer A 512 can direct the need for processing to the decentralized processing network 520. Processing systems are illustrated as CPU A, CPU B, CPU C, and CPU D 525. The CPUs 525 may be personal computers, server computers, mobile devices, edge IoT devices, etc. Pointer A may select one or more processors at random to perform the execution of a given smart contract. The code may be secure or nonsecure and the CPU may be a trusted execution environment (TEE), depending upon the needs of the request. In the example reflected in FIG. 5A, pointer B 513, pointer C 514, and pointer D 515 all point to a decentralized storage network 530 including remote off-ledger resources including storage systems illustrated as Disks A, B, C, and D 535.

The decentralized storage system may co-mingle with the decentralized processing system as the individual storage systems utilize CPU resources and connectivity to perform their function. From a functional perspective, the two decentralized systems may also be separate. Pointer B 513 may point to one or more decentralized storage networks 530 for the purposes of maintaining an off-chain log file of token activity and requests. Pointer C 514 may point to executable code within one or more decentralized storage networks 530. And Pointer D 515 may point to rights management data, security keys, and/or configuration data within one or more decentralized storage networks 530.

Figure 5B:
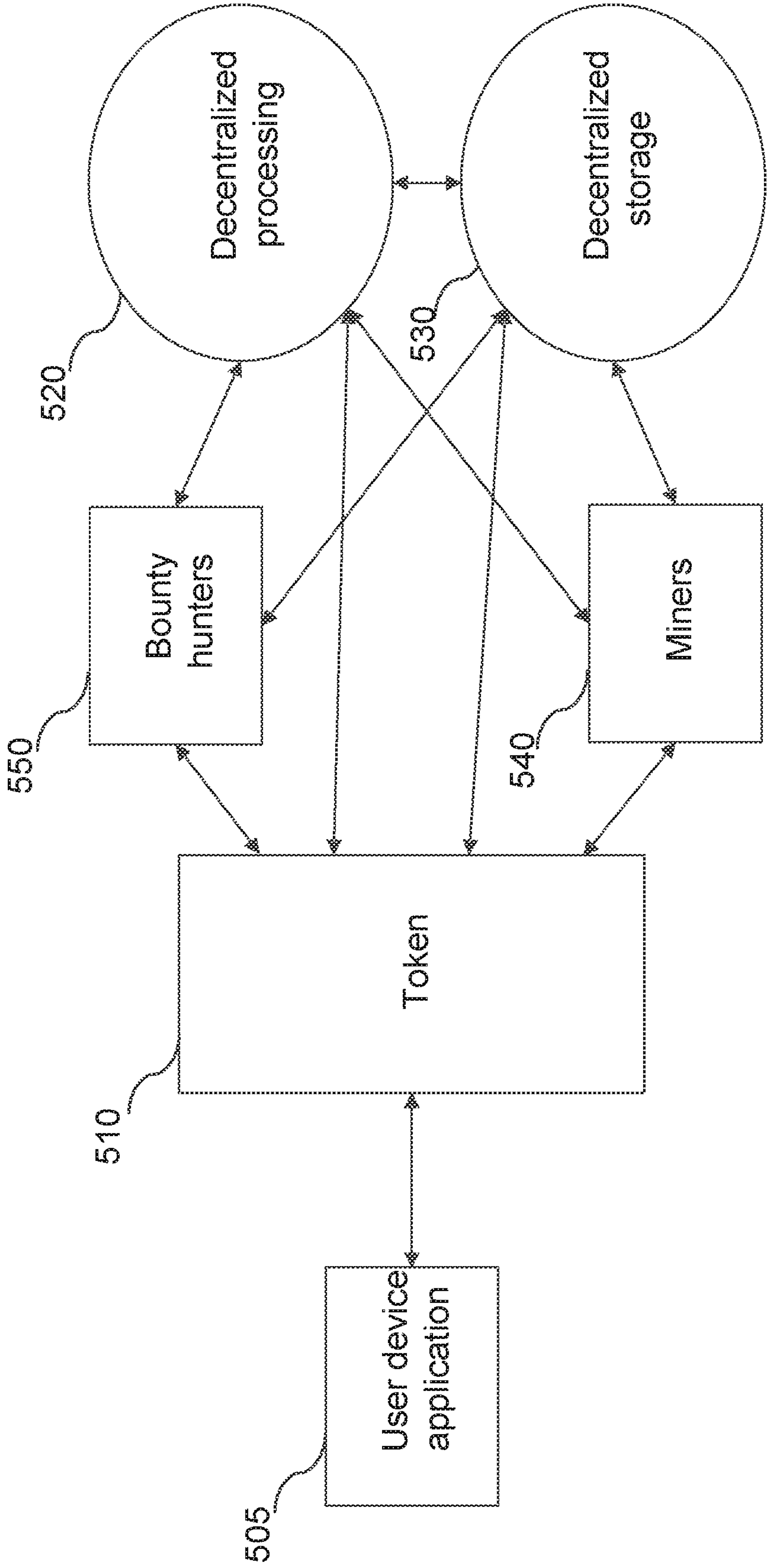

Dual blockchains may additionally incorporate methods for detection of abuse, essentially operating as a "bounty hunter" 550. FIG. 5B illustrates the inclusion of bounty hunters 550 within dual blockchain structures implemented in accordance with an embodiment of the invention. Bounty hunters 550 allow NFTs 510, which can point to networks that may include decentralized processing 520 and/or storage networks 530, to be monitored. The bounty hunter's 550 objective may be to locate incorrectly listed or missing data and executable code within the NFT 510 or associated networks. Additionally, the miner 540 can have the capacity to perform all necessary minting processes or any process within the architecture that involves a consensus mechanism.

Bounty hunters 550 may also choose to verify each step of a computation, and if they find an error, submit evidence of this in return for some reward. This can have the effect of invalidating the incorrect ledger entry and, potentially based on policies, all subsequent ledger entries. Such evidence can be submitted in a manner that is associated with a public key, in which the bounty hunter 550 proves knowledge of the error, thereby assigning value (namely the bounty) with the public key.

Assertions made by bounty hunters 550 may be provided directly to miners 540 by broadcasting the assertion. Assertions may be broadcast in a manner including, but not limited to posting it to a bulletin board. In some embodiments of the invention, assertions may be posted to ledgers of blockchains, for instance, the blockchain on which the miners 540 operate. If the evidence in question has not been submitted before, this can automatically invalidate the ledger entry that is proven wrong and provide the bounty hunter 550 with some benefit.

Applications and methods in accordance with various embodiments of the invention are not limited to use within NFT platforms. Accordingly, it should be appreciated that the capabilities of any blockchain configuration described herein can also be implemented outside the context of an NFT platform network architecture unrelated to the storage of fungible tokens and/or NFTs. A variety of components, mechanisms, and blockchain configurations that can be utilized within NFT platforms are discussed further below. Moreover, any of the blockchain configurations described herein with reference to FIGS. 3-5B (including permissioned, permissionless, and/or hybrid mechanisms) can be utilized within any of the networks implemented within the NFT platforms described above.

NFT Platform Consensus Mechanisms

NFT platforms in accordance with many embodiments of the invention can depend on consensus mechanisms to achieve agreement on network state, through proof resolution, to validate transactions. In accordance with many embodiments of the invention, Proof of Work (PoW) mechanisms may be used as a means of demonstrating non-trivial allocations of processing power. Proof of Space (PoS) mechanisms may be used as a means of demonstrating non-trivial allocations of memory or disk space. As a third possible approach, Proof of Stake mechanisms may be used as a means of demonstrating non-trivial allocations of fungible tokens and/or NFTs as a form of collateral. Numerous consensus mechanisms are possible in accordance with various embodiments of the invention, some of which are expounded on below.

Traditional mining schemes, such as Bitcoin, are based on Proof of Work, based on performing the aforementioned large computational tasks. The cost of such tasks may not only be computational effort, but also energy expenditure, a significant environmental concern. To address this problem, mining methods operating in accordance with many embodiments of the invention may instead operate using Proof of Space mechanisms to accomplish network consensus, wherein the distinguishing factor can be memory rather than processing power. Specifically, Proof of Space mechanisms can perform this through network optimization challenges. In several embodiments the network optimization challenge may be selected from any of a number of different challenges appropriate to the requirements of specific applications including graph pebbling. In some embodiments, graph pebbling may refer to a resource allocation game played on discrete mathematics graphs, ending with a labeled graph disclosing how a player might get at least one pebble to every vertex of the graph.

Figure 6:
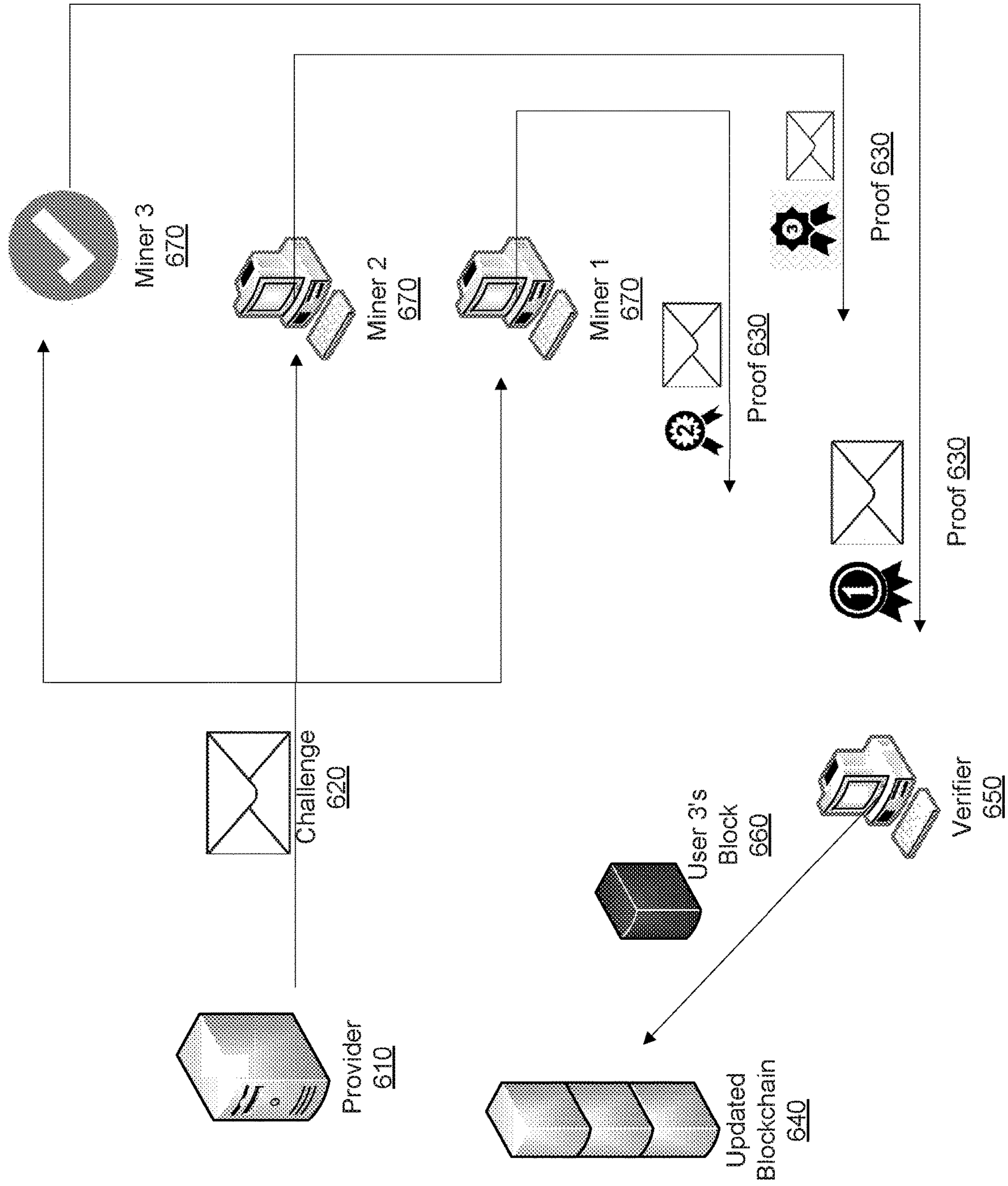
FIG. 6 conceptually illustrates a process followed by a Proof of Work consensus mechanism in accordance with an embodiment of the invention.

An example of Proof of Work consensus mechanisms that may be implemented in decentralized blockchains, in accordance with a number of embodiments of the invention, is conceptually illustrated in FIG. 6. The example disclosed in this figure is a challenge-response authentication, a protocol classification in which one party presents a complex problem ("challenge") 610 and another party must broadcast a valid answer ("proof") 620 to have clearance to add a block to the decentralized ledger that makes up the blockchain 630. As a number of miners may be competing to have this ability, there may be a need for determining factors for the addition to be added first, which in this case is processing power. Once an output is produced, verifiers 640 in the network can verify the proof, something which typically requires much less processing power, to determine the first device that would have the right to add the winning block 650 to the blockchain 630. As such, under a Proof of Work consensus mechanism, each miner involved can have a success probability proportional to the computational effort expended.

Figure 7:
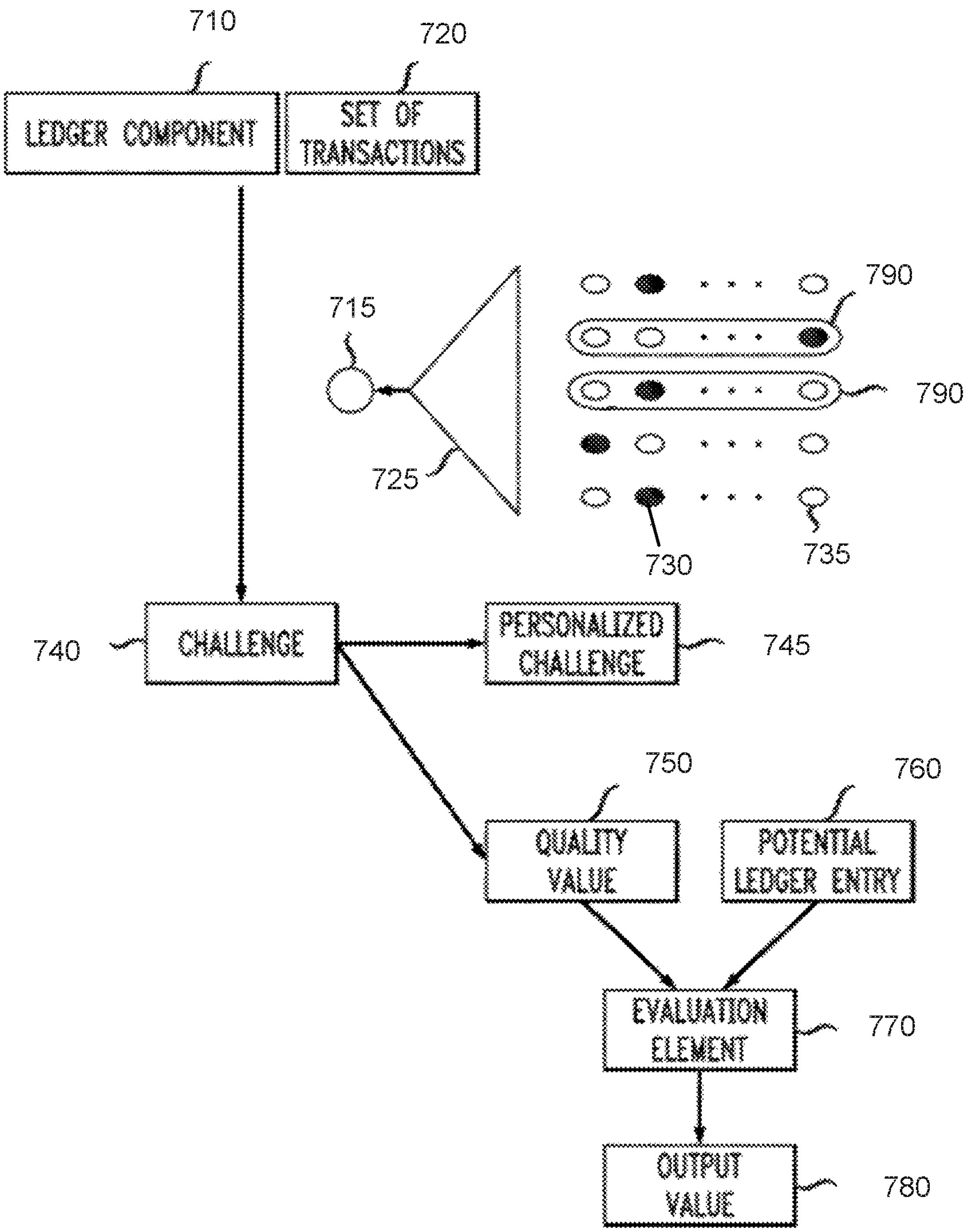
FIG. 7 conceptually illustrates a process followed by a Proof of Space consensus mechanism in accordance with an embodiment of the invention.

An example of Proof of Space implementations on devices in accordance with some embodiments of the invention is conceptually illustrated in FIG. 7. The implementation includes a ledger component 710, a set of transactions 720, and a challenge 740 computed from a portion of the ledger component 710. A representation 715 of a miner's state may also be recorded in the ledger component 710 and be publicly available.

In some embodiments, the material stored on the memory of the device includes a collection of nodes 730, 735, where nodes that depend on other nodes have values that are functions of the values of the associated nodes on which they depend. For example, functions may be one-way functions, such as cryptographic hash functions. In several embodiments the cryptographic hash function may be selected from any of a number of different cryptographic hash functions appropriate to the requirements of specific applications including (but not limited to) the SHA1 cryptographic hash function. In such an example, one node in the network may be a function of three other nodes. Moreover, the node may be computed by concatenating the values associated with these three nodes and applying the cryptographic hash function, assigning the result of the computation to the node depending on these three parent nodes. In this example, the nodes are arranged in rows, where two rows 790 are shown. The nodes are stored by the miner, and can be used to compute values at a setup time. This can be done using Merkle tree hash-based data structures 725, or another structure such as a compression function and/or a hash function.

Challenges 740 may be processed by the miner to obtain personalized challenges 745, made to the device according to the miner's storage capacity. The personalized challenge 745 can be the same or have a negligible change, but could also undergo an adjustment to account for the storage space accessible by the miner, as represented by the nodes the miner stores. For example, when the miner does not have a large amount of storage available or designated for use with the Proof of Space system, a personalized challenge 745 may adjust challenges 740 to take this into consideration, thereby making a personalized challenge 745 suitable for the miner's memory configuration.

In some embodiments, the personalized challenge 745 can indicate a selection of nodes 730, denoted in FIG. 7 by filled-in circles. In the FIG. 7 example specifically, the personalized challenge corresponds to one node per row. The collection of nodes selected as a result of computing the personalized challenge 745 can correspond to a valid potential ledger entry 760. However, here a quality value 750 (also referred to herein as a qualifying function value) can also be computed from the challenge 740, or from other public information that is preferably not under the control of any one miner.

A miner may perform matching evaluations 770 to determine whether the set of selected nodes 730 matches the quality value 750. This process can take into consideration what the memory constraints of the miner are, causing the evaluation 770 to succeed with a greater frequency for larger memory configurations than for smaller memory configurations. This can simultaneously level the playing field to make the likelihood of the evaluation 770 succeeding roughly proportional to the size of the memory used to store the nodes used by the miner. In some embodiments, non-proportional relationships may be created by modifying the function used to compute the quality value 750. When the evaluation 770 results in success, then the output value 780 may be used to confirm the suitability of the memory configuration and validate the corresponding transaction.

In many embodiments, nodes 730 and 735 can also correspond to public keys associated with the miner. The miner may submit valid ledger entries, corresponding to a challenge-response pair including one of these nodes. In that case, public key values can become associated with the obtained NFT. As such, miners can use a corresponding secret/private key to sign transaction requests, such as purchases. Additionally, any type of digital signature can be used in this context, such as RSA signatures, Merkle signatures, DSS signatures, etc. Further, the nodes 730 and 735 may correspond to different public keys or to the same public key, the latter preferably augmented with a counter and/or other location indicator such as a matrix position indicator, as described above. Location indicators in accordance with many embodiments of the invention may be applied to point to locations within a given ledger. In accordance with some embodiments of the invention, numerous Proof of Space consensus configurations are possible, some of which are discussed below.

Hybrid methods of evaluating Proof of Space problems can also be implemented in accordance with many embodiments of the invention. In many embodiments, hybrid methods can be utilized that conceptually correspond to modifications of Proof of Space protocols in which extra effort is expanded to increase the probability of success, or to compress the amount of space that may be applied to the challenge. Both come at a cost of computational effort, thereby allowing miners to improve their odds of winning by spending greater computational effort. Accordingly, in many embodiments of the invention dual proof-based systems may be used to reduce said computational effort. Such systems may be applied to Proof of Work and Proof of Space schemes, as well as to any other type of mining-based scheme.

When utilizing dual proofs in accordance with various embodiments of the invention, the constituent proofs may have varying structures. For example, one may be based on Proof of Work, another on Proof of Space, and a third may be a system that relies on a trusted organization for controlling the operation, as opposed to relying on mining for the closing of ledgers. Yet other proof structures can be combined in this way. The result of the combination will inherit properties of its components. In many embodiments, the hybrid mechanism may incorporate a first and a second consensus mechanism. In several embodiments, the hybrid mechanism includes a first, a second, and a third consensus mechanisms. In a number of embodiments, the hybrid mechanism includes more than three consensus mechanisms. Any of these embodiments can utilize consensus mechanisms selected from the group including (but not limited to) Proof of Work, Proof of Space, and Proof of Stake without departing from the scope of the invention. Depending on how each component system is parametrized, different aspects of the inherited properties will dominate over other aspects.

Figure 8:
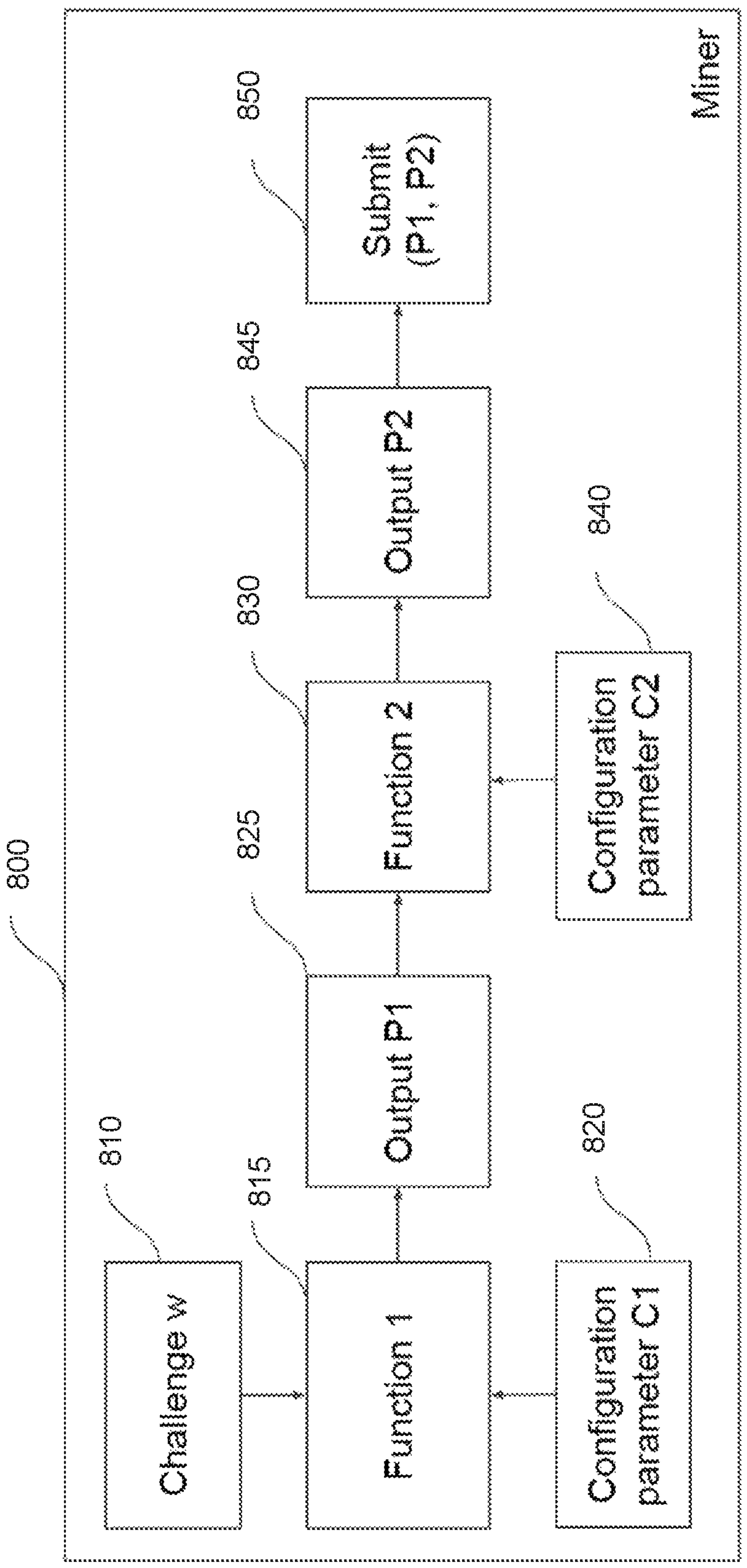
FIG. 8 illustrates a dual proof consensus mechanism configuration in accordance with an embodiment of the invention.

Dual proof configurations in accordance with a number of embodiments of the invention is illustrated in FIG. 8. A proof configuration in accordance with some embodiments of the invention may tend to use the notion of quality functions for tie-breaking among multiple competing correct proofs relative to a given challenge (w) 810. This classification of proof can be described as a qualitative proof, inclusive of proofs of work and proofs of space. In the example reflected in FIG. 8, proofs P1 and P2 are each one of a Proof of Work, Proof of Space, Proof of Stake, and/or any other proof related to a constrained resource, wherein P2 may be of a different type than P1, or may be of the same type.

Systems in accordance with many embodiments of the invention may introduce the notion of a qualifying proof, which, unlike qualitative proofs, are either valid or not valid, using no tie-breaking mechanism. Said systems may include a combination of one or more qualitative proofs and one or more qualifying proofs. For example, it may use one qualitative proof that is combined with one qualifying proof, where the qualifying proof is performed conditional on the successful creation of a qualitative proof. FIG. 8 illustrates challenge w 810, as described above, with a function 1 815, which is a qualitative function, and function 2 830, which is a qualifying function.

To stop miners from expending effort after a certain amount of effort has been spent, thereby reducing the environmental impact of mining, systems in accordance with a number of embodiments of the invention can constrain the search space for the mining effort. This can be done using a configuration parameter that controls the range of random or pseudo-random numbers that can be used in a proof. Upon challenge w 810 being issued to one or more miners 800, it can be input to Function 1 815 along with configuration parameter C1 820. Function 1 815 may output proof P1 825, in this example the qualifying proof to Function 2 830. Function 2 830 is also provided with configuration parameter C2 840 and computes qualifying proof P2 845. The miner 800 can then submit the combination of proofs (P1, P2) 850 to a verifier, in order to validate a ledger associated with challenge w 810. In some embodiments, miner 800 can also submit the proofs (P1, P2) 850 to be accessed by a 3rd-party verifier.

NFT platforms in accordance with many embodiments of the invention may additionally benefit from alternative energy-efficient consensus mechanisms. Therefore, computer systems in accordance with several embodiments of the invention may instead use consensus-based methods alongside or in place of proof-of-space and proof-of-space based mining. In particular, consensus mechanisms based instead on the existence of a Trusted Execution Environment (TEE), such as ARM TrustZone™ or Intel SGX™ may provide assurances of integrity by virtue of incorporating private/isolated processing environments.

Figure 9:
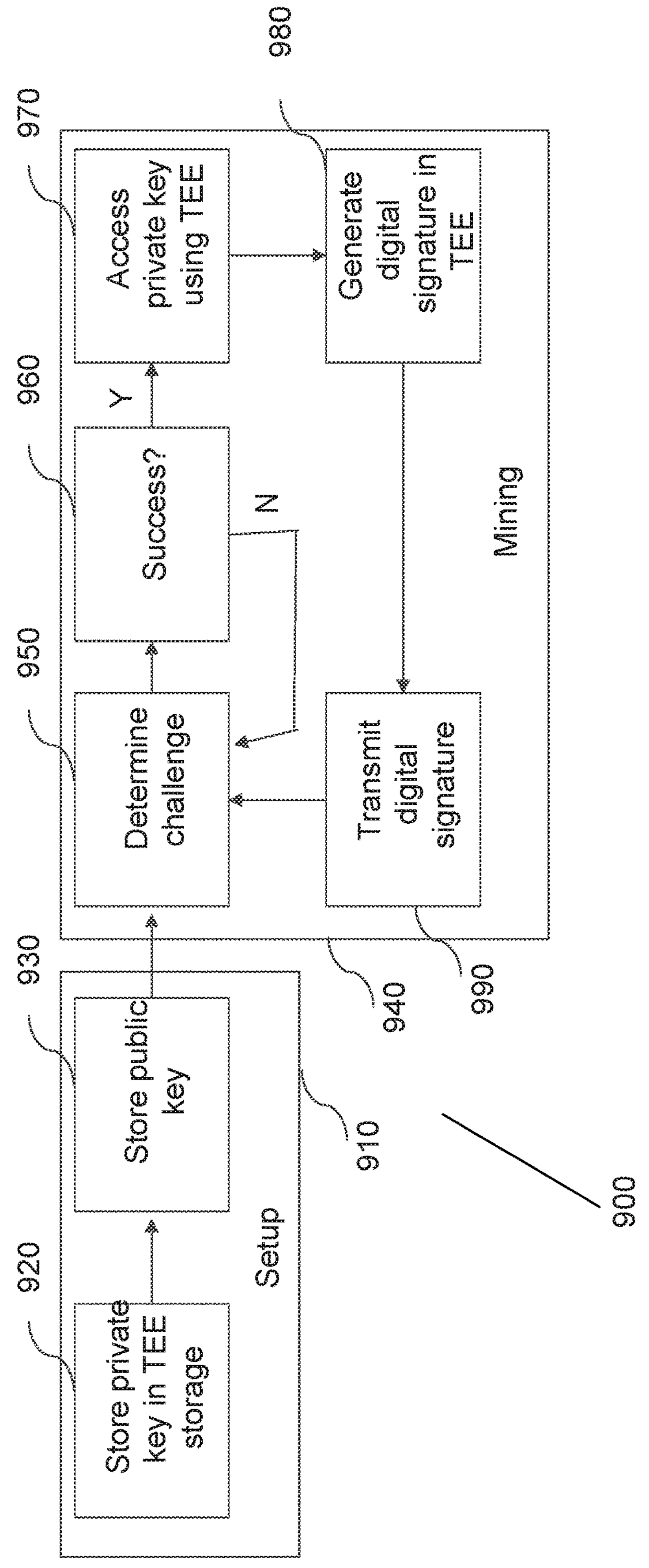
FIG. 9 illustrates a process followed by a Trusted Execution Environment-based consensus mechanism in accordance with some embodiments of the invention

An illustration of sample process 900 undergone by TEE-based consensus mechanisms in accordance with some embodiments of the invention is depicted in FIG. 9. In some such configurations, a setup 910 may be performed by an original equipment manufacturer (OEM) or a party performing configurations of equipment provided by an OEM. Once a private key/public key pair is generated in the secure environment, process 900 may store (920) the private key in TEE storage (i.e. storage associated with the Trusted Execution Environment). While storage may be accessible from the TEE, it can be shielded from applications running outside the TEE. Additionally, processes can store (930) the public key associated with the TEE in any storage associated with the device containing the TEE. Unlike the private key, the public key may also be accessible from applications outside the TEE. In a number of embodiments, the public key may also be certified. Certification may come from OEMs or trusted entities associated with the OEMs, wherein the certificate can be stored with the public key.

In many embodiments of the invention, mining-directed steps can also be influenced by the TEE. In the illustrated embodiment, the process 900 can determine (950) a challenge. For example, this may be by computing a hash of the contents of a ledger. In doing so, process 900 may also determine whether the challenge corresponds to success 960. In some embodiments of the invention, the determination of success may result from some pre-set portion of the challenge matching a pre-set portion of the public key, e.g. the last 20 bits of the two values matching. In several embodiments the success determination mechanism may be selected from any of a number of alternate approaches appropriate to the requirements of specific applications. The matching conditions may also be modified over time. For example, modification may result from an announcement from a trusted party or based on a determination of a number of participants having reached a threshold value.

When the challenge does not correspond to a success 960, process 900 can return to determine (950) a new challenge. In this context, process 900 can determine (950) a new challenge after the ledger contents have been updated and/or a time-based observation is performed. In several embodiments the determination of a new challenge may come from any of a number of approaches appropriate to the requirements of specific applications, including, but not limited to, the observation of as a second elapsing since the last challenge. If the challenge corresponds to a success 960, then the processing can continue on to access (970) the private key using the TEE.

When the private key is accessed, process can generate (980) a digital signature using the TEE. The digital signature may be on a message that includes the challenge and/or which otherwise references the ledger entry being closed. Process 900 can also transmit (980) the digital signature to other participants implementing the consensus mechanism. In cases where multiple digital signatures are received and found to be valid, a tie-breaking mechanism can be used to evaluate the consensus. For example, one possible tie-breaking mechanism may be to select the winner as the party with the digital signature that represents the smallest numerical value when interpreted as a number. In several embodiments the tie-breaking mechanism may be selected from any of a number of alternate tie-breaking mechanisms appropriate to the requirements of specific applications.

Applications and methods in accordance with various embodiments of the invention are not limited to use within NFT platforms. Accordingly, it should be appreciated that consensus mechanisms described herein can also be implemented outside the context of an NFT platform network architecture unrelated to the storage of fungible tokens and/or NFTs. Moreover, any of the consensus mechanisms described herein with reference to FIGS. 6-9 (including Proof of Work, Proof of Space, Proof of Stake, and/or hybrid mechanisms) can be utilized within any of the blockchains implemented within the NFT platforms described above with reference to FIGS. 3-5B. Various systems and methods for implementing NFT platforms and applications in accordance with numerous embodiments of the invention are discussed further below.

NFT Platform Constituent Devices and Applications

A variety of computer systems that can be utilized within NFT platforms and systems that utilize NFT blockchains in accordance with various embodiments of the invention are illustrated below. The computer systems in accordance with many embodiments of the invention may implement a processing system 1010, 1120, 1220 using one or more CPUs, GPUs, ASICs, FPGAs, and/or any of a variety of other devices and/or combinations of devices that are typically utilized to perform digital computations. As can readily be appreciated each of these computer systems can be implemented using one or more of any of a variety of classes of computing devices including (but not limited to) mobile phone handsets, tablet computers, laptop computers, personal computers, gaming consoles, televisions, set top boxes and/or other classes of computing device.

Figure 10:
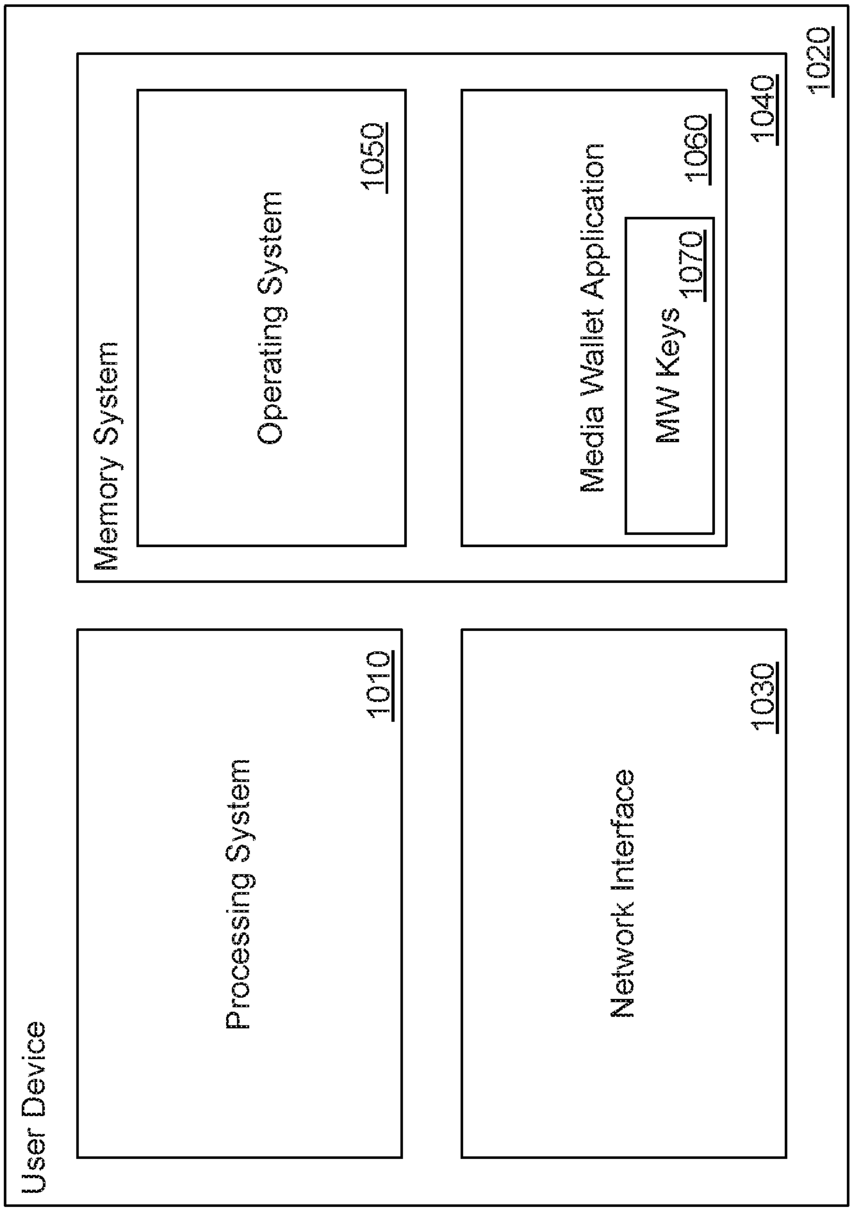
FIGS. 10-12 depicts various devices that can be utilized alongside an NFT platform in accordance with various embodiments of the invention.

A user device capable of communicating with an NFT platform in accordance with an embodiment of the invention is illustrated in FIG. 10. The memory system 1040 of particular user devices may include an operating system 1050 and media wallet applications 1060. Media wallet applications may include sets of media wallet (MW) keys 1070 that can include public key/private key pairs. The set of MW keys may be used by the media wallet application to perform a variety of actions including, but not limited to, encrypting and signing data. In many embodiments, the media wallet application enables the user device to obtain and conduct transactions with respect to NFTs by communicating with an NFT blockchain via the network interface 1030. In some embodiments, the media wallet applications are capable of enabling the purchase of NFTs using fungible tokens via at least one distributed exchange. User devices may implement some or all of the various functions described above with reference to media wallet applications as appropriate to the requirements of a given application in accordance with various embodiments of the invention.

Figure 11:
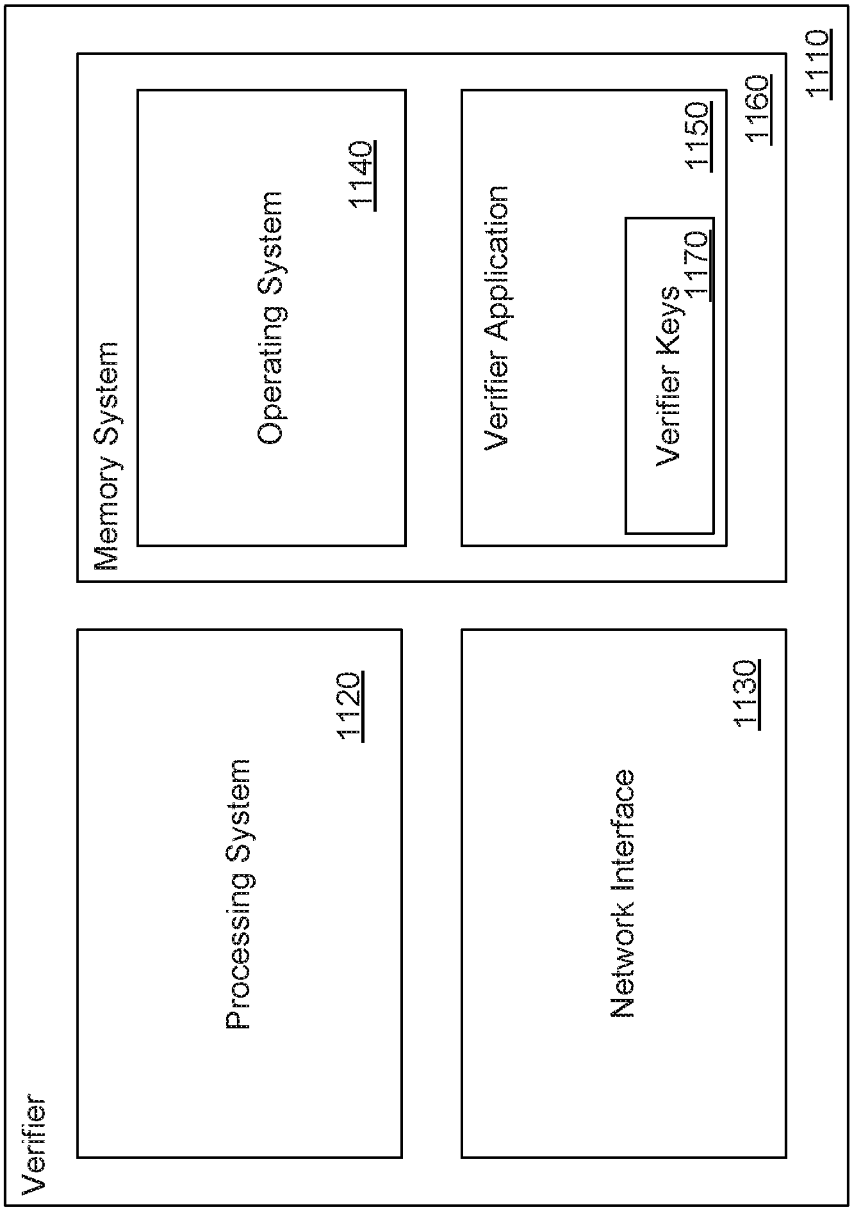

A verifier 1110 capable of verifying blockchain transactions in an NFT platform in accordance with many embodiments of the invention is illustrated in FIG. 11. The memory system 1160 of the verifier computer system includes an operating system 1140 and a verifier application 1150 that enables the verifier 1110 computer system to access a decentralized blockchain in accordance with various embodiments of the invention. Accordingly, the verifier application 1150 may utilize a set of verifier keys 1170 to affirm blockchain entries. When blockchain entries can be verified, the verifier application 1150 may transmit blocks to the corresponding blockchains. The verifier application 1150 can also implement some or all of the various functions described above with reference to verifiers as appropriate to the requirements of a given application in accordance with various embodiments of the invention.

Figure 12:
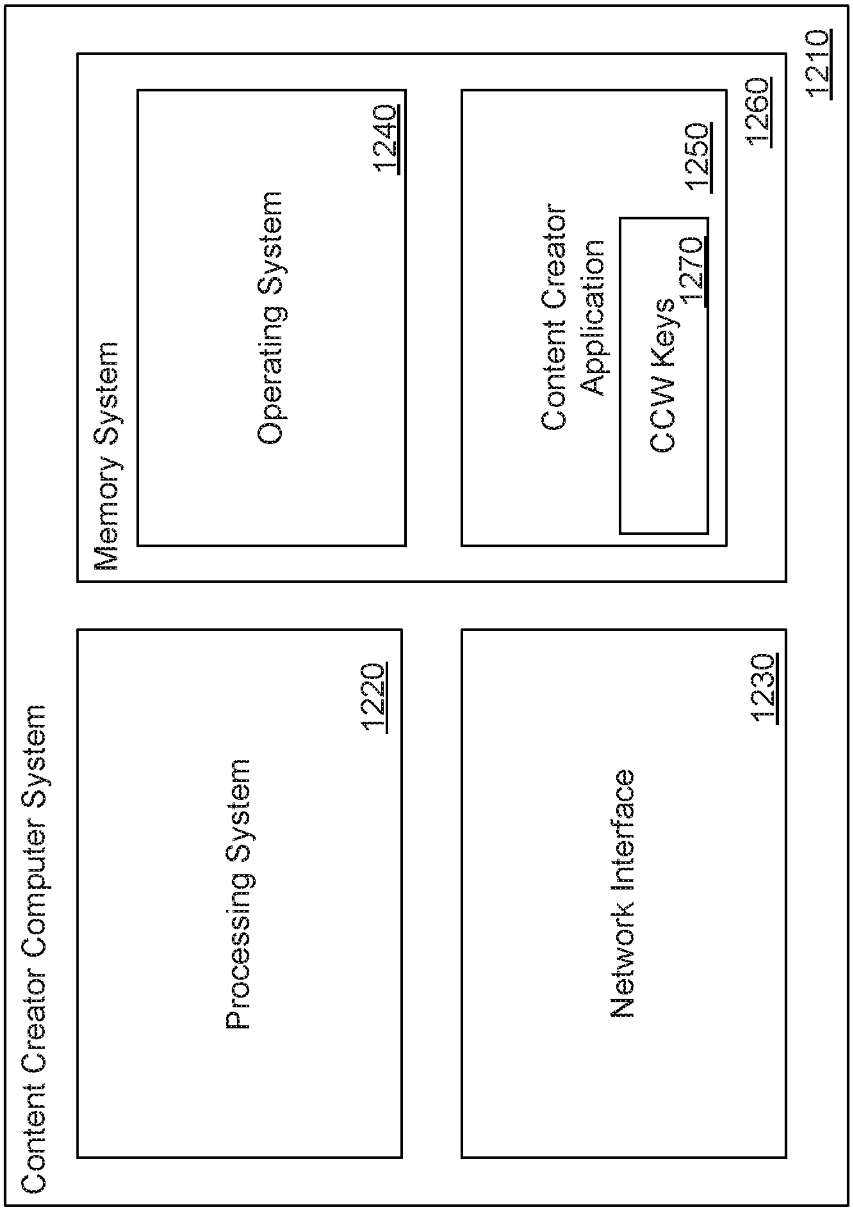

A content creator system 1210 capable of disseminating content in an NFT platform in accordance with an embodiment of the invention is illustrated in FIG. 12. The memory system 1260 of the content creator computer system may include an operating system 1240 and a content creator application 1250. The content creator application 1250 may enable the content creator computer system to mint NFTs by writing smart contracts to blockchains via the network interface 1230. The content creator application can include sets of content creator wallet (CCW) keys 1270 that can include a public key/private key pairs. Content creator applications may use these keys to sign NFTs minted by the content creator application. The content creator application can also implement some or all of the various functions described above with reference to content creators as appropriate to the requirements of a given application in accordance with various embodiments of the invention.

Computer systems in accordance with many embodiments of the invention incorporate digital wallets (herein also referred to as "wallets" or "media wallets") for NFT and/or fungible token storage. In several embodiments, the digital wallet may securely store rich media NFTs and/or other tokens. Additionally, in some embodiments, the digital wallet may display user interface through which user instructions concerning data access permissions can be received.

In a number of embodiments of the invention, digital wallets may be used to store at least one type of token-directed content. Example content types may include, but are not limited to crypto currencies of one or more sorts; non-fungible tokens; and user profile data.

Example user profile data may incorporate logs of user actions. In accordance with some embodiments of the invention, example anonymized user profile data may include redacted, encrypted, and/or otherwise obfuscated user data. User profile data in accordance with some embodiments may include, but are not limited to, information related to classifications of interests, determinations of a post-advertisement purchases, and/or characterizations of wallet contents.

Media wallets, when storing content, may store direct references to content. Media wallets may also reference content through keys to decrypt and/or access the content. Media wallets may use such keys to additionally access metadata associated with the content. Example metadata may include, but is not limited to, classifications of content. In a number of embodiments, the classification metadata may govern access rights of other parties related to the content.

Access governance rights may include, but are not limited to, whether a party can indicate their relationship with the wallet; whether they can read summary data associated with the content; whether they have access to peruse the content; whether they can place bids to purchase the content; whether they can borrow the content, and/or whether they are biometrically authenticated.

Figure 13:
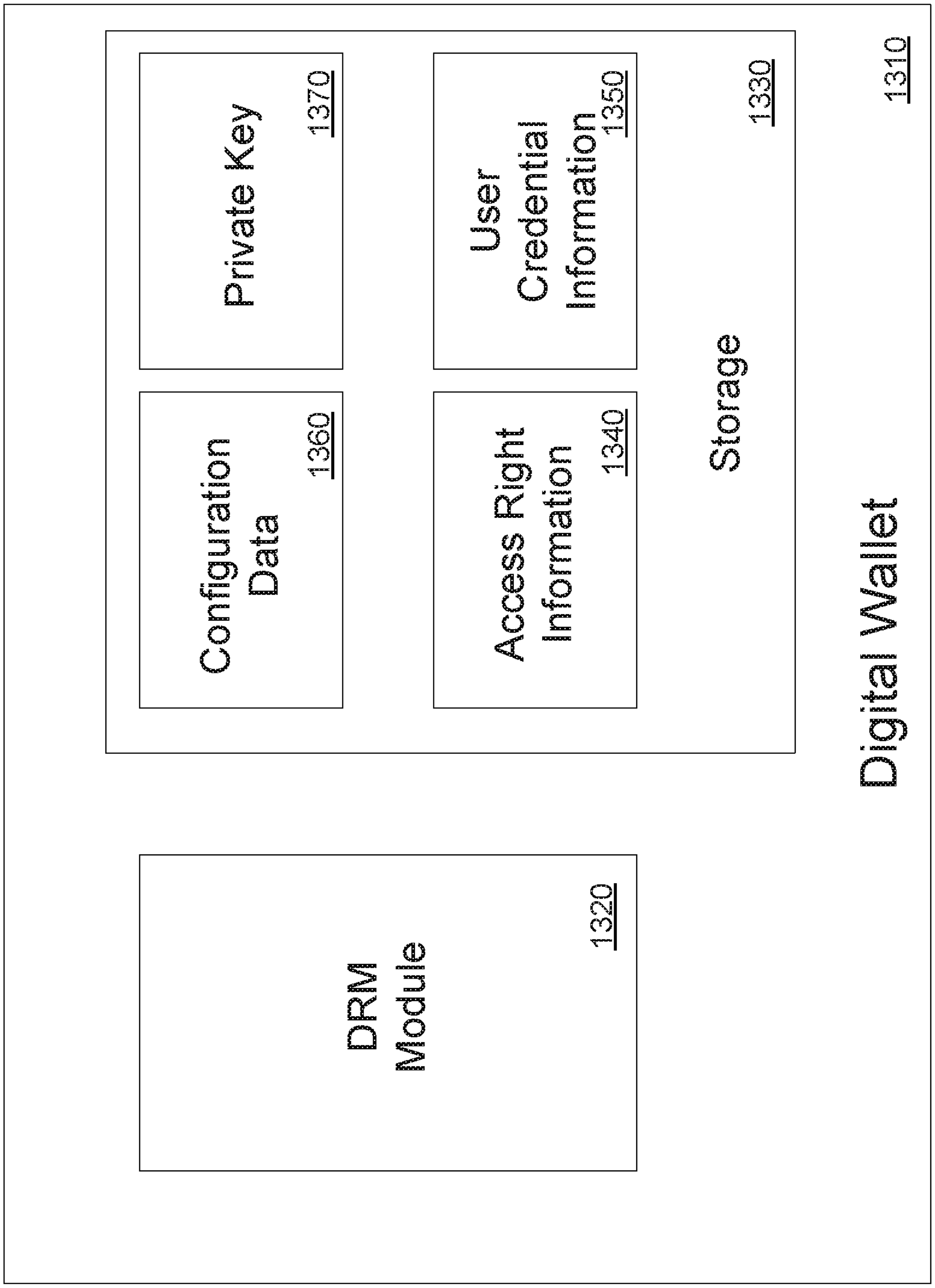
FIG. 13 depicts a media wallet application configuration in accordance with an embodiment of the invention.

An example of a media wallet 1310 capable of storing rich media NFTs in accordance with an embodiment of the invention is illustrated in FIG. 13. Media wallets 1310 may include a storage component 1330, including access right information 1340, user credential information 1350, token configuration data 1360, and/or at least one private key 1370. In accordance with many embodiments of the invention, a private key 1370 may be used to perform a plurality of actions on resources, including but not limited to decrypting NFT and/or fungible token content. Media wallets may also correspond to a public key, referred to as a wallet address. An action performed by private keys 1370 may be used to prove access rights to digital rights management modules. Additionally, private keys 1370 may be applied to initiating ownership transfers and granting NFT and/or fungible token access to alternate wallets. In accordance with some embodiments, access right information 1340 may include lists of elements that the wallet 1310 has access to. Access right information 1340 may also express the type of access provided to the wallet. Sample types of access include, but are not limited to, the right to transfer NFT and/or fungible ownership, the right to play rich media associated with a given NFT, and the right to use an NFT and/or fungible token. Different rights may be governed by different cryptographic keys. Additionally, the access right information 1340 associated with a given wallet 1310 may utilize user credential information 1350 from the party providing access.

In accordance with many embodiments of the invention, third parties initiating actions corresponding to requesting access to a given NFT may require user credential information 1350 of the party providing access to be verified. User credential information 1350 may be taken from the group including, but not limited to, a digital signature, hashed passwords, PINs, and biometric credentials. User credential information 1350 may be stored in a manner accessible only to approved devices. In accordance with some embodiments of the invention, user credential information 1350 may be encrypted using a decryption key held by trusted hardware, such as a trusted execution environment. Upon verification, user credential information 1350 may be used to authenticate wallet access.

Available access rights may be determined by digital rights management (DRM) modules 1320 of wallets 1310. In the context of rich media, encryption may be used to secure content. As such, DRM systems may refer to technologies that control the distribution and use of keys required to decrypt and access content. DRM systems in accordance with many embodiments of the invention may require a trusted execution zone. Additionally, said systems may require one or more keys (typically a certificate containing a public key/private key pair) that can be used to communicate with and register with DRM servers. DRM modules 1320 in some embodiments may also use one or more keys to communicate with a DRM server. In several embodiments, the DRM modules 1320 may include code used for performing sensitive transactions for wallets including, but not limited to, content access. In accordance with a number of embodiments of the invention, the DRM module 1320 may execute in a Trusted Execution Environment. In a number of embodiments, the DRM may be facilitated by an Operating System (OS) that enables separation of processes and processing storage from other processes and their processing storage.

Figure 14B:
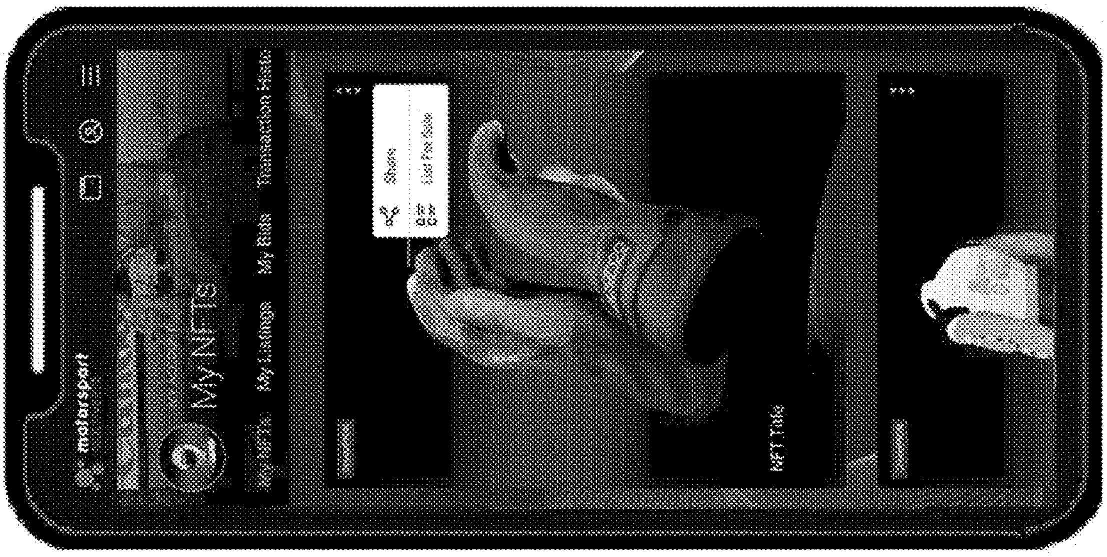
FIGS. 14A-14C depicts user interfaces of various media wallet applications in accordance with a number of embodiments of the invention.
Figure 14A:
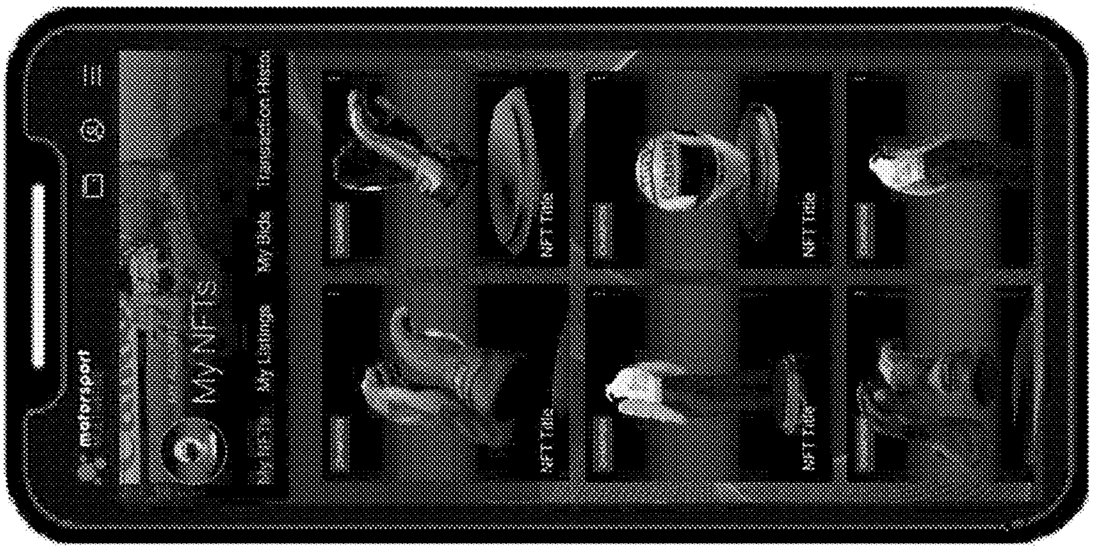
Figure 14C:

Operation of media wallet applications implemented in accordance with some embodiments of the invention is conceptually illustrated by way of the user interfaces shown in FIGS. 14A-14C. In many embodiments, media wallet applications can refer to applications that are installed upon user devices such as (but not limited to) mobile phones and tablet computers running the iOS, Android and/or similar operating systems. Launching media wallet applications can provide a number of user interface contexts. In many embodiments, transitions between these user interface contexts can be initiated in response to gestures including (but not limited to) swipe gestures received via a touch user interface. As can readily be appreciated, the specific manner in which user interfaces operate through media wallet applications is largely dependent upon the user input capabilities of the underlying user device. In several embodiments, a first user interface context is a dashboard (see, FIGS. 14A, 14C) that can include a gallery view of NFTs owned by the user. In several embodiments, the NFT listings can be organized into category index cards. Category index cards may include, but are not limited to digital merchandise/collectibles, special event access/digital tickets, fan leaderboards. In certain embodiments, a second user interface context (see, for example, FIG. 14B) may display individual NFTs. In a number of embodiments, each NFT can be main-staged in said display with its status and relevant information shown. Users can swipe through each collectible and interacting with the user interface can launch a collectible user interface enabling greater interaction with a particular collectible in a manner that can be determined based upon the smart contract underlying the NFT.

A participant of an NFT platform may use a digital wallet to classify wallet content, including NFTs, fungible tokens, content that is not expressed as tokens such as content that has not yet been minted but for which the wallet can initiate minting, and other non-token content, including executable content, webpages, configuration data, history files and logs. This classification may be performed using a visual user interface. Users interface may enable users to create a visual partition of a space. In some embodiments of the invention, a visual partition may in turn be partitioned into sub-partitions. In some embodiments, a partition of content may separate wallet content into content that is not visible to the outside world ("invisible partition"), and content that is visible at least to some extent by the outside world ("visible partition"). Some of the wallet content may require the wallet use to have an access code such as a password or a biometric credential to access, view the existence of, or perform transactions on. A visible partition may be subdivided into two or more partitions, where the first one corresponds to content that can be seen by anybody, the second partition corresponds to content that can be seen by members of a first group, and/or the third partition corresponds to content that can be seen by members of a second group.

For example, the first group may be users with which the user has created a bond, and invited to be able to see content. The second group may be users who have a membership and/or ownership that may not be controlled by the user. An example membership may be users who own non-fungible tokens (NFTs) from a particular content creator. Content elements, through icons representing the elements, may be relocated into various partitions of the space representing the user wallet. By doing so, content elements may be associated with access rights governed by rules and policies of the given partition.

One additional type of visibility may be partial visibility. Partial visibility can correspond to a capability to access metadata associated with an item, such as an NFT and/or a quantity of crypto funds, but not carry the capacity to read the content, lend it out, or transfer ownership of it. As applied to a video NFT, an observer to a partition with partial visibility may not be able to render the video being encoded in the NFT but see a still image of it and a description indicating its source.

Similarly, a party may have access to a first anonymized profile which states that the user associated with the wallet is associated with a given demographic. The party with this access may also be able to determine that a second anonymized profile including additional data is available for purchase. This second anonymized profile may be kept in a sub-partition to which only people who pay a fee have access, thereby expressing a form of membership. Alternatively, only users that have agreed to share usage logs, aspects of usage logs or parts thereof may be allowed to access a given sub-partition. By agreeing to share usage log information with the wallet comprising the sub-partition, this wallet learns of the profiles of users accessing various forms of content, allowing the wallet to customize content, including by incorporating advertisements, and to determine what content to acquire to attract users of certain demographics.

Another type of membership may be held by advertisers who have sent promotional content to the user. These advertisers may be allowed to access a partition that stores advertisement data. Such advertisement data may be encoded in the form of anonymized profiles. In a number of embodiments, a given sub-partition may be accessible only to the advertiser to whom the advertisement data pertains. Elements describing advertisement data may be automatically placed in their associated partitions, after permission has been given by the user. This partition may either be visible to the user. Visibility may also depend on a direct request to see "system partitions." A first partition may correspond to material associated with a first set of public keys, a second partition to material associated with a second set of public keys not overlapping with the first set of public keys, wherein such material may comprise tokens such as crypto coins and NFTs. A third partition may correspond to usage data associated with the wallet user, and a fourth partition may correspond to demographic data and/or preference data associated with the wallet user. Yet other partitions may correspond to classifications of content, e.g., child-friendly vs. adult; classifications of whether associated items are for sale or not, etc.

The placing of content in a given partition may be performed by a drag-and-drop action performed on a visual interface. By selecting items and clusters and performing a drag-and-drop to another partition and/or to a sub-partition, the visual interface may allow movement including, but not limited to, one item, a cluster of items, and a multiplicity of items and clusters of items. The selection of items can be performed using a lasso approach in which items and partitions are circled as they are displayed. The selection of items may also be performed by alternative methods for selecting multiple items in a visual interface, as will be appreciated by a person of skill in the art.

Some content classifications may be automated in part or full. For example, when user place ten artifacts, such as NFTs describing in-game capabilities, in a particular partition, they may be asked if additional content that are also in-game capabilities should be automatically placed in the same partition as they are acquired and associated with the wallet. When "yes" is selected, then this placement may be automated in the future. When "yes, but confirm for each NFT" is selected, then users can be asked, for each automatically classified element, to confirm its placement. Before the user confirms, the element may remain in a queue that corresponds to not being visible to the outside world.

When users decline given classifications, they may be asked whether alternative classifications should be automatically performed for such elements onwards. In some embodiments, the selection of alternative classifications may be based on manual user classification taking place subsequent to the refusal.

Automatic classification of elements may be used to perform associations with partitions and/or folders. The automatic classification may be based on machine learning (ML) techniques considering characteristics including, but not limited to, usage behaviors exhibited by the user relative to the content to be classified, labels associated with the content, usage statistics; and/or manual user classifications of related content.

Multiple views of wallets may also be accessible. One such view can correspond to the classifications described above, which indicates the actions and interactions others can perform relative to elements. Another view may correspond to a classification of content based on use, type, and/or users-specified criterion. For example, all game NFTs may be displayed in one collection view. The collection view may further subdivide the game NFTs into associations with different games or collections of games. Another collection may show all audio content, clustered based on genre. users-specified classification may be whether the content is for purposes of personal use, investment, or both. A content element may show up in multiple views. users can search the contents of their wallet by using search terms that result in potential matches.

Alternatively, the collection of content can be navigated based the described views of particular wallets, allowing access to content. Once a content element has been located, the content may be interacted with. For example, located content elements may be rendered. One view may be switched to another after a specific item is found. For example, this may occur through locating an item based on its genre and after the item is found, switching to the partitioned view described above. In some embodiments, wallet content may be rendered using two or more views in a simultaneous manner. They may also select items using one view.

Media wallet applications in accordance with various embodiments of the invention are not limited to use within NFT platforms. Accordingly, it should be appreciated that applications described herein can also be implemented outside the context of an NFT platform network architecture unrelated to the storage of fungible tokens and/or NFTs. Moreover, any of the computer systems described herein with reference to FIGS. 10-14C can be utilized within any of the NFT platforms described above.

NFT Platform NFT Interactions

NFT platforms in accordance with many embodiments of the invention may incorporate a wide variety of rich media NFT configurations. The term "Rich Media Non-Fungible Tokens" can be used to refer to blockchain-based cryptographic tokens created with respect to a specific piece of rich media content and which incorporate programmatically defined digital rights management. In some embodiments of the invention, each NFT (or token) may have a unique serial number and be associated with a smart contract defining an interface that enables the NFT to be managed, owned and/or traded.

Under a rich media blockchain in accordance with many embodiments of the invention, a wide variety of token configurations may be implemented. Anchored tokens in accordance with many embodiments of the invention can be used to refer to tokens that tie some element, such as a physical entity, to an identifier. In numerous embodiments, tokens can include various types of data, such as (but not limited to), content data, conditional data, and/or association data.

Figure 18:
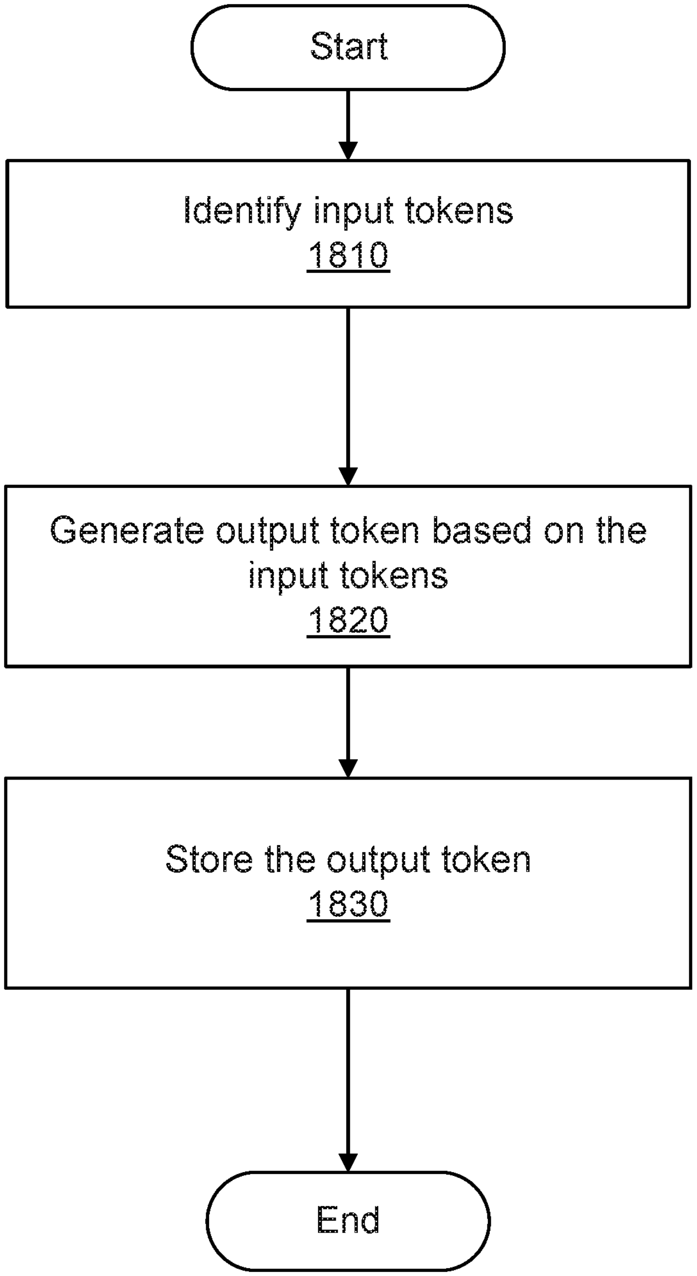
FIG. 18 conceptually illustrates an example of a process for minting tokens in accordance with an embodiment of the invention.

Processes in accordance with numerous embodiments of the invention can provide for minting various tokens in various contexts. An example of a process for minting tokens in accordance with an embodiment of the invention is conceptually illustrated in FIG. 18. Process 1800 identifies (1810) a set of one or more input tokens. Input tokens can include various tokens as described throughout this description, such as (but not limited to) identity tokens, rights tokens, certificate tokens, assertion tokens, etc. In many embodiments, in addition to input tokens, processes can receive other inputs, such as (but not limited to), sensor data, data from a server, data from an environment in which executable code is to be executed, etc.

Process 1800 generates (1820) an output token based on the input tokens. In various embodiments, the set of input tokens can include detailed information where the output token includes a generalization (or alias) of at least a portion of the detailed information. Processes in accordance with various embodiments of the invention can generate a token with a policy, where the policy is based on the policies of one or more of the input tokens. In numerous embodiments, the output token and at least one of the input tokens are related and contain references (that may or may not be encrypted) to one another.

In several embodiments, the output token can be created to expire (e.g., based on an expiration date, a set of rules, etc.). In a variety of embodiments, tokens can include a hash chain to provide for changes to the token (e.g., extensions of expiration, modification to rights granted, etc.). In a number of embodiments, the generation of an output token is conditional on various conditions, such as (but not limited to), processing environment, date/time, presence and sufficiency of inputs, etc. Processes in accordance with various embodiments of the invention may re-encrypt encrypted information from one or more input tokens, where the re-encrypted token uses a different key (or keys) than the encrypted information from the input tokens.

Process 1800 stores (1830) the output token. In a number of embodiments, the input and/or output tokens can be stored on one or more of a public ledger, a private ledger, and/or a private branch of a public ledger.

While specific processes are described above with reference to FIG. 18, token minting and utilization can be implemented in any of a number of different ways to enable as appropriate to the requirements of specific applications in accordance with various embodiments of the invention. Additionally, the specific manner in which tokens can be utilized and/or minted within NFT platforms in accordance with various embodiments of the invention is largely dependent upon the requirements of a given application.

Identity (or social) tokens in accordance with numerous embodiments of the invention are a type of anchored token that may be used to tie users' real-world identities and/or identifiers to a system identifier. Identifiers in accordance with certain embodiments of the invention may include a public key, which can allow content encrypted or signed with a corresponding key, to be traced back to the identifier. In accordance with many embodiments of the invention, an individual's personally identifiable characteristics may be contained, maintained, and managed throughout their lifetime so as to connect new information and/or NFTs to the individual's identity. Identity tokens may include various personally identifiable information, such as, but not limited to, name, place and date of birth, and/or biometrics (e.g., fingerprints, iris scans, DNA prints, etc.).

In a number of embodiments, identity tokens may be contained, maintained, and managed throughout their lifetime so as to connect new tokens to their identity. For example, an identity token with an infant's biometric information could be used in the assignment process of a social security number NFT from the federal government. In some embodiments, the identity token may be associated with rights and capabilities, which may be expressed in other NFTs and/or expressed within a policy of the identity token itself. Identity tokens in accordance with certain embodiments of the invention can be used to derive privacy tokens (e.g., alias tokens, pseudonymous tokens, etc.), which can be used to associate a token or result with a user, without exposing their identity or other potentially sensitive information. Examples of connecting identity tokens with one or more other tokens are described throughout this description.

Identity tokens and/or other associated tokens in accordance with a number of embodiments of the invention may exist on a personalized branch of a centralized or decentralized blockchain ledger. In numerous embodiments, future tokens can be generated to create a life-long ledger record of an individual's public and/or private activities, such as (but not limited to) identification, purchases, personal records (e.g., health and medical records, etc.), access tokens, family records (e.g., future offspring, marriages, familial history, etc.), photographs, audio, videos, tax filings, and/or patent filings. In a variety of embodiments, the management and/or maintenance of an individual's biometrics throughout the individual's life may be immutably connected to the individual's first identity token (e.g., stored on a decentralized blockchain ledger). Identity tokens in accordance with some embodiments of the invention may be thought of as a provenance tool for an individual's entire life.

Figure 15:
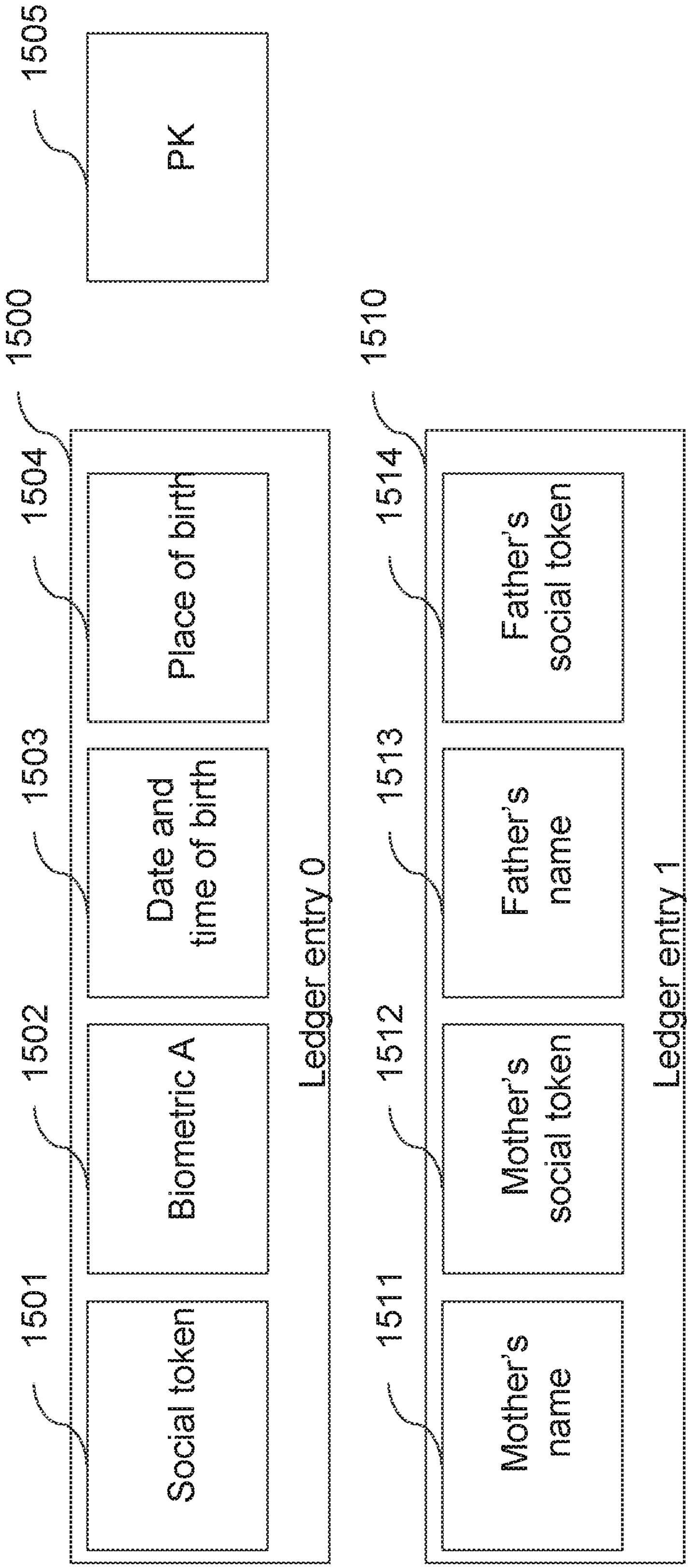
FIG. 15 illustrates an example of ledger entries related to an identity token in accordance with an embodiment of the invention.

An example of ledger entries related to an identity token in accordance with an embodiment of the invention is illustrated in FIG. 15. Identity tokens in accordance with a number of embodiments of the invention can be used to build an immutable identity foundation, whereby identity information (e.g., biometrics, birth and/or parental information, etc.) can be associated with other tokens. In numerous embodiments, identity tokens can be protected with encryption to maintain privacy and security for each individual.

In this example, identity token 1501 is encrypted using private key 1505. The initial entry in the ledger, ledger entry 0 1500 represents the assignment of an identity token 1501 to an individual. Ledger entry 1500 further includes a biometric A 1502 (e.g., the individual's footprint), the individual's date and time of birth 1503, and the individual's place of birth 1504.

In numerous embodiments, identity tokens (and/or alias tokens derived from an identity token) can represent an entity across various different ledger entries. In a variety of embodiments, related ledger entries can include family information (e.g., names, tokens, identifiers, etc.). In this example, subsequent ledger entry 1 1510 includes mothers' name 1511, mother's identity token 1512, father's name 1513, father's identity token 1514. In numerous embodiments, ledger entries may be stored on a private ledger and/or on a private branch of a public ledger. Ledger entries in accordance with a number of embodiments of the invention can be stored on a public ledger, where different ledger entries are associated with each other (e.g., based on an identity identifier).

While specific implementations of ledger entries have been described above with respect to FIG. 15, one skilled in the art will recognize that there are numerous configurations of ledgers, including, but not limited to, those using public/private blockchains, databases, and/or any other configuration as appropriate to the requirements of a given application.

A person skilled in the art will recognize that the various components that make up identity tokens may vary from situation to situation without departing from this invention. For example, identity tokens in accordance with numerous embodiments of the invention may be associated with other information in a ledger, such as (but not limited to) race, gender, governmental number assignments (e.g., social security numbers, driver's license numbers, etc.). In certain embodiments, certain information (e.g., biometrics or parental information) associated with identity tokens may be unavailable or withheld in a given situation, and/or for a given period of time.

Processes in accordance with numerous embodiments of the invention use public and private encryption key systems to enable controlled access to the publicly stored information. Controlled access for identity tokens and examples thereof are described in greater detail below. Identity tokens in accordance with certain embodiments of the invention can pertain to an entity rather than an individual. Entities in accordance with a number of embodiments of the invention can include (but are not limited to) organizations, corporations, governments, etc. In a variety of embodiments, identifiable characteristics for entities may include (but are not limited to) federal employer numbers, entity registration number, etc.

In various embodiments, tokens may be associated with various other tokens. Tokens with associations with other tokens in accordance with a number of embodiments of the invention can include (but are not limited to) derived tokens, relative tokens, inheritance tokens, etc. For example, a first token may associate a first identifier with a name and a birthdate, and optionally, with additional identifiers, such as a driver's license number, a social security number, a passport number, and more. Identifiers in accordance with some embodiments of the invention may be in the form of a first public key for which knowledge of the associated first private key is used to establish an association with the first token. For example, a user device representing a first user may generate a digital signature on a message, using the first private key, after verifying that a user's biometric credentials match the first identifier or an identifier linked to the first identifier. This first token only includes data, as described above.

In this example, a second example token may include a second identifier and one or more descriptions of rights, such as the right to drive a car. Rights in accordance with various embodiments of the invention can correspond to certificates (or certificate tokens), licenses, rules, policies, etc., which may describe rights of a user (or owner) of a given token. In some embodiments, rights may be issued by an authority (e.g., government entities, certifying bodies, etc.). In numerous embodiments, processes may revoke existing rights in a variety of ways, such as (but not limited to), reporting a certificate on a certificate revocation list (CRL), utilizing expiration dates, etc. In many embodiments, rights may expire and require renewal or replacement after such time arrives.

In several embodiments, rights may be associated with one or more rules that can be evaluated. In this example, a right to drive a car may be limited to a given geographic area associated with the rule; limited to a given time of the day, such as after dawn but before dusk; or limited to a specific type of car, such as a car with automatic gears, or to drive with corrective glasses. The third token in this example may then be associated with a car, and have an executable component that determines whether a given condition is fulfilled. For example, a car can determine its geolocation using a built-in GPS unit, or determine whether it is after dawn but before dusk by determining the date and time at the local location and accessing a table that specifies sunrise and sundown for the given location and date. Based on this, the third token may selectively output a state that can be evaluated in the context of a rule of the second token, to determine whether a given user has a valid license for the given conditions.

In several embodiments, digital rights management (DRM) systems can interact with DRM units (e.g., mobile phones, computers, biometric readers, etc.) to facilitate authorization and/or authentication for a user. DRM systems in accordance with various embodiments of the invention can provide an assertion that a user is who they claim to be based on a user's interaction with a DRM unit (e.g., scanning their biometric information).

Continuing with the preceding example, a DRM system associated with the third token may request to be paired with a DRM unit associated with a biometrics-enabled device, such as a cellular phone, or a vehicle component with a biometric reader, such as in a rear-view mirror. This may result in a communication link being established between the car infotainment system and the cellular phone, and the activation of the DRM unit on the cellular phone, which can be used to read a biometric of a user and determine the associated identity. This identity can be communicated or confirmed to the DRM system associated with the third token, which is associated with the car. The executable component of the third token can assert that the user, identified using the biometric method, corresponds to the identity associated with the first token.

In numerous embodiments, DRM can be facilitated by a secure processing environment, such as (but not limited to) a Trusted Execution Environment (TEE). DRM in accordance with a number of embodiments of the invention can be facilitated by an Operating System (OS) that enables separation of processes and processing storage from other processes and their processing storage. Secure processing environments in accordance with numerous embodiments of the invention can also be achieved using sandboxing techniques. DRM systems in accordance with numerous embodiments of the invention may be built into secure processing environments. Alternatively, or conjunctively, DRM systems could include mobile agents, including tokens that receive support from such environments. Tokens in accordance with numerous embodiments of the invention may carry encrypted key material, where only environments with sufficient support for DRM functionality would be capable of receiving keys that can be used to decrypt such encrypted key material and obtain the key material, where such key material is used to decrypt encrypted data contained in or associated with the token. Tokens associated with secure processing environments may be referred to as DRM tokens.

Processes in accordance with several embodiments of the invention can generate and store tokens. In many embodiments, tokens can be generated by a certifying third party. For example, the Department of Motor Vehicles (DMV) may generate a token associated with the rights to drive a car upon issuing a traditional driving license. In a variety of embodiments, certifying third parties may include entities (e.g., banks) that verify a person's identity papers. Certifying parties in accordance with several embodiments of the invention may generate a token in response to a successful verification.

In numerous embodiments, certifying parties may include manufacturers and/or owners of objects (e.g., cars, appliances, etc.), who can generate tokens associated with such objects. For example, a car manufacturer may generate an anchored token for each manufactured car. Car rental companies can generate tokens for each car owned by the company. Certifying parties in accordance with many embodiments of the invention may obtain a license to act as a certifying party. For example, a car rental company may obtain a license to certify its own cars (e.g., in the form of a trusted token or a certificate token), where this license may be expressed as a token including a certificate of the car rental company's public key, as well as one or more rules identifying what types of documents (including tokens) the car rental company certification authority may accept or issue.

In numerous embodiments, certifying tokens may specify rules that require certain types or levels of evidence. For example, a car rental company may be required to provide proof of ownership (e.g., in the form of an ownership token) of a car that it wishes to create an anchored token for. In some embodiments, rules for a certifying token may specify what types of rules the certifying party may associate with the created token.

In some embodiments, non-certified entities may generate tokens and assert their validity. Non-certified entities may be required to put up some form of security. Security for tokens in accordance with a variety of embodiments of the invention may be provided in the form of a conditional payment that is exchangeable for funds if abuse can be detected. Abuse detection in accordance with some embodiments of the invention can be performed by various verification methods, including (but not limited to) bounty hunters. Bounty hunters are further described in U.S. patent application Ser. No. 17/806,728, entitled "Systems and Methods for Encrypting and Controlling Access to Encrypted Data Based Upon Immutable Ledgers", filed Jun. 13, 2022, the disclosure of which is incorporated by reference herein in its entirety.

In certain embodiments, rather than (or in addition to) using a security in the form of a conditional payment, non-certified entities may relate to a publicly accessible reputation record describing the non-certified entity's reputability. If a bounty hunter were to detect abuse, this would negatively affect the reputation, which may be expressed and recorded as a reputation token, as the bounty hunter's verified complaint would be part of the reputation record, and therefore lower the reputation score of the party which it describes. In numerous embodiments, entities with reputation below a threshold value may be required to put up a security when generating a token.

In a variety of embodiments, rather than (or in addition to) security or reputation, users may generate tokens describing assertions by having a third party review the token and attest to its likely validity. This type of token may be referred to as an attestation token. For example, a user may state in a token that he is no longer a smoker. This may be attested as being likely true by a third party such as his doctor, where the doctor generates a token that provides assurance for the user-generated token. These tokens may be evaluated by an insurance company as it generates premium estimates to cover the new non-smoker. Tokens may also be derived from one or more tokens, e.g., by generating a new token describing data related to the input token(s). One reason for this is to enable privacy, as will be described below. Bounty hunters in accordance with a number of embodiments of the invention can be seen as an enforcement token, since its functionality is to identify abuse and error and to report such situations.

In a number of embodiments, one or more tokens can be processed to generate a new token that provides the bearer with increased privacy in comparison to the input tokens used to derive the new token. In several embodiments, a derived token may provide a token that includes a generalization of specific (and potentially sensitive) information along with an association with another token that can be used to verify that the token is associated with an individual, without exposing detailed information. For example, a token may specify the age of a person, and be linked to an identifier that in turn can be verified using biometrics, as described above. This token (input token) can be used to generate a derived token (output token), where the derived token does not specify the age of the person, or other personal information that might ordinarily exist on a traditional identification card, but simply states that the person is at least 21 years of age. The output token may be a token of any of the kinds described herein, and, like the input token, may have multiple classifications. In a variety of embodiments, derived tokens can be associated, using the same or a different identifier as what was encoded in the input token, to a biometric assessment, and therefore to an end user person. In this example, this person may use the derived token, along with a biometrics-enabled device, to prove that they are at least 21 years of age, but without disclosing their exact age, or other data such as their full name.

Derived tokens in accordance with various embodiments of the invention may be generated from multiple input tokens. For example, a derived token may state that a user is at least 21 years of age, and not believed to be a smoker, by combining data from a first input token in which the age is detailed with a second input token in which an assertion is made by a doctor that a third token, created by the user, is truthful, wherein the third token asserts that the user is not a smoker. The derived token may not have the name of the user or an identifier associated with the doctor, and therefore hide such information. In another example, at an airport security screening station or flight boarding gate, a token may be used to verify biometric information, ticket verification, and airline loyalty level.

In several embodiments, derived tokens may have an encrypted component including links to tokens used as input in the generation of the output token. Encrypted components in accordance with several embodiments of the invention may be decrypted by a designated authority. This way, if the quality of a derived token is questioned, it is possible to determine how it was generated. Random audits of these links can be performed periodically by law enforcement or entities certifying parties that generate derived tokens. In such a random audit, one or more links can be decrypted and the identified input tokens verified and compared with the associated derived tokens.

In several embodiments, privacy tokens may be generated to represent a real individual with an alias (e.g., a username for a social media account). By policy, this token would provide privacy to the individual; but could also provide with evidence to society that the token does not represent a bot or similar construct. Example approaches to deriving tokens of this type are described herein. Individual preferences for privacy may require that tokens be created on a ledger branch that is not associated with the individual; therefore, in some embodiments, decentralized ledger entries can be made in isolation to prevent association with the identity of the real individual but with a value that provably points to the real individual. In many embodiments, the value (or identifier) pointing to the real individual may not be accessible (e.g., encrypted) to anyone but to specific entities (e.g., those who possess a corresponding key). In a variety of embodiments, the value can be a keyed hash of an identifier, where only some select entities would have access to the key used in the computation of the keyed hash.

Ledger entries in accordance with a number of embodiments of the invention may contain executable code (e.g., decentralized applications), by policy, that enables a 3rd-party to blindly contact the individual for approval to reveal their identity. For example, a woman in Portland may have violated a copyright with an ill-advised post. The rightsholder, seeking to interview the woman, is able to record an encrypted entry on a ledger proving their entity identity with their private key. The ledger entry, essentially a smart contract using their policies and the privacy protecting policy enabled by the woman's privacy token, executes and sends a blind communication to the woman based upon the contact information in her privacy token. The same executing code confirms the message was sent to the rightsholder. In this example, there is no requirement that the woman respond to the rightsholder. If the rightsholder wishes the content be removed, they may do so through the platform through traditional legal copyright mechanisms. Should the woman abuse the privacy token, for example, by setting up an email spam bot under the same token, the privacy token may be revoked or her reputation score or reputation token diminished relative to the infraction. The infraction may be discovered by a bounty hunter. Privacy enabling tokens in accordance with various embodiments of the invention may include elements that enable pseudonymous communication, such as an alias email address that is forwarded via one or more intermediaries, such as a Tor encrypted email, a service provided, among others by PROTONMAIL. Other examples of pseudonymous communication in accordance with a variety of embodiments of the invention include "Untraceable Electronic Mail, Return Addresses, and Digital Pseudonyms" by David Chaum, and "Onion Routing for Anonymous and Private Internet Connections," by D. Goldschlag, M. Reed, P. Syverson, both of which are incorporated by reference in their entirety.

Current technologies such as OAuth are used to enable access to information, such as online documents and services, based on user credentials, such as biometrics, but without conveying these credentials to the entities managing the documents and services. However, OAuth does not maintain a log of access, and any access logs that are saved by individual organizations are untrustworthy by not being time-stamped, thereby opening up against attacks involving breaches.

Systems and methods in accordance with various embodiments of the invention can address these and other related shortcomings of OAuth and competing technologies by using tokens for the verification of biometrics and other user-specific credentials. Tokens in accordance with certain embodiments of the invention may be protected using encryption when distributed or backed up. In a number of embodiments, tokens may only be enabled on devices meeting pre-specified criteria (e.g., having TEEs or DRMs meeting or exceeding specified standards, having been associated with the user, etc. One example of such a proof may be the provision of sufficient evidence in the form of multiple fingerprints from multiple fingers, as disclosed in U.S. Pat.

No. 10,929,512 to Markus Jakobsson, titled “Authentication Translation”, issued on Feb. 23, 2021, the disclosure of which is incorporated by reference in its entirety.

In many embodiments, secure processing environments (e.g., a TEE or a DRM) can be bound to a token by the provision of evidence by a user that the user has access rights to another supported device that already has been bound to the same token. This is useful, for example, when a user uses a tablet computer to instantiate a new phone, or an old phone to instantiate an old phone. This can be done in a variety of manners involving the generation of a communication channel, such as a Bluetooth connection, between the two devices, and the engagement of the token on the old device, where this engagement involves an authentication by the user to the token of the old device. Such authentication may involve providing fingerprints, iris scans, or other biometrics, or perform another accepted form of authentication supported by the token. In a number of embodiments, a DRM that has been bound to a token can also be transferred from one device, where it is already in use, to a new device, where the DRM instance is verified and then enabled, if the verification succeeded.

Identity verification tokens in accordance with numerous embodiments of the invention can be used relative to other tokens including personal information (e.g., passport number, record of a birthdate, etc.) to prove that a given user matched to the identify verification token (e.g., using biometrics) is associated with the token including the personal information. Tokens in accordance with a number of embodiments of the invention can be related to each other by being linked, where such linking can either be made by one or both of the tokens referring to the other. In several embodiments, tokens can be related to each other by a separate certified token referring to all of the input tokens (e.g., an identity token and a token including a passport number). Alternative methods of associating two tokens are also possible, and several such methods are disclosed herein.

One way to identify fraud for a user account is to analyze logs and identify anomalies. In a variety of embodiments, processes can analyze ledger entries associated with one or more tokens in order to identify anomalies. Anomalies in accordance with various embodiments of the invention can be identified using machine learning (ML) or artificial intelligence (AI) methods. In a variety of embodiments, anomaly identification can be performed on anonymized ledger entries. In certain embodiments, log entries can be anonymized simply by not being directly associated with a token carrying an identity. Anonymized log entries in accordance with numerous embodiments of the invention may be associated with a pseudonymous identity. In several embodiments, anonymized log entries may not have access to specific information but to generalizations of the information.

Pseudonymous tokens in accordance with a variety of embodiments of the invention can be derived from a token with an identity by incorporating a new identifier in the token, which is the pseudonym. In a variety of embodiments, encrypted links to the input token(s) used for generating the pseudonymous token can be included in the pseudonymous token. In a number of embodiments, encrypted links (or portions thereof) could be used in lieu of an explicit pseudonym. For example, the first 160 bits of the ciphertext corresponding to the encrypted link to the one or more input tokens related to the pseudonymous token could be used as a pseudonymous identifier, since this is guaranteed, but for a negligible probability, to be a unique identifier.

In various embodiments, pseudonymous tokens may reference one or more parties that together hold data that can be used to determine the identifier from the pseudonymous identifier, where the association may be stored in a table or be computed from a function that is not publicly computable, nor its inverse publicly computable; for example, a keyed cryptographic hash function can be used, where a dedicated party knows the key used. This key may be a traditional symmetric key.

Pseudonymous tokens are a form of alias token that can provide an alternative and potentially temporary identity in place of a long-lived or actual identity. Alias tokens in accordance with some embodiments of the invention can be derived from other types of tokens. For example, an alias token may be derived from a location token, where the location token specifies the exact geolocation of an entity, and the alias token derived from the location token specifies an approximate or generalized location (e.g., a broader region). For example, it may identify the city or state of the location, but not the specific street or intersection; it may specify that the location is in the front right corner of a movie theatre, but not identify what movie theatre; or it may specify that the user is within a specified distance of another entity, such as within 1 mile of a specified car dealership. Other forms of alias tokens can be generated and used to protect the privacy of end users, enterprises, and governments.

Identity verification tokens in accordance with numerous embodiments of the invention can generate a log including information about its use. In many embodiments, entries on the log may be encrypted in a manner that is only accessible to select tokens, such as (but not limited to) the identity verification token itself; a trusted representative of the user, such as the user's financial institution, or other entities as established based on the jurisdiction of the user. Log entries in accordance with many embodiments of the invention may identify whether a given attempt was successful or failed; the manner of authentication that was used; environmental information related to the authentication, such as the time of the authentication or the location of the device executing the identity verification token. Additional types of information can be encoded, such as an identifier specifying the token (or other service) requesting the authentication. Logs in accordance with some embodiments of the invention can be mined for anomalies to identify abuse and risk thereof, whether by the user associated with the token or by criminals with the potential intent of unlawfully extracting funds or access rights by forcing the rightful user to authenticate, by attempting to impersonate the user, and more. In many embodiments, ML or AI methods can be used to detect anomalies.

Identity verification tokens in accordance with a variety of embodiments of the invention may include alerting capabilities. Examples of alerting capabilities are disclosed in the year 2000 publication titled “Funkspiel schemes: an alternative to conventional tamper resistance”, by Hastad, Jonson, Juels and Yung, the disclosure of which is incorporated by reference herein in its entirety. In a number of embodiments, an alert signaled in one transaction can be used to determine, from a set of transactions including the signaled transaction, that a user, who may be a payer, is being coerced, but without causing a public identification of what transaction included the signal of threat. In some embodiments, processes may require that the tokens corresponding to authentication actions are evaluated in TEEs or DRMs, where these execution environments would be prevented from disclosing information such as the specific transaction (s) setting of the alarm. Prevention of the disclosure could be governed by policies associated with authentication tokens in general, or authentication tokens of the type associated with a given installation of a biometric verification entity. This is only one illustrative example of a privacy and security benefit that can be implemented in distributed environments using the technologies disclosed herein. As will be understood by a skilled artisan, this illustrative example is only one of many related benefits related to security and privacy that the disclosed technology enables.

Trusted bounty hunters in accordance with a number of embodiments of the invention can be implemented using a DRM or a TEE, with at least a minimum security level required by a context. In a number of embodiments, bounty hunters may receive a certification token from an accredited certification authority, the certification token attesting that the bounty hunter is allowed to process information associated with a given context. Contexts in accordance with numerous embodiments of the invention may, for example, be to evaluate sensitive data, including alerts that have been signaled, as described above. The context may also be to process personal information (e.g., an identity token with sensitive information in it) in order to generate a pseudonymous token based on information in the identity token, some of which may be encrypted using a key such that only accredited parties can decrypt the information.

In a variety of embodiments, trusted bounty hunters can evaluate matches between tokens wherein some portion of a request is sensitive, and therefore encrypted. For example, a user concerned with the public learning about a medical condition of his may create a token in which a medical service is requested, in which he does not reveal his identity but instead refers to a pseudonymous token, and wherein the description of the requested service is not available in plaintext, but which is encrypted using a public key associated with parties with a pre-specified trust-level, which may in this case correspond to a party that is a medical doctor and who is certified as such. This doctor may use an application or platform to access requests, where the application or platform corresponds to a token that is certified to correspond to a medical doctor in a given pre-specified jurisdiction. The application or platform may have knowledge of a key used to decrypt such encrypted messages, or a re-encryption intermediary can be used to modify the ciphertext to be decryptable to the application or platform. After this decryption has been performed, the application or platform decrypts the ciphertext and automatically determines whether the request corresponds to the specialization of the doctor or doctors, and if so, forwards the message for additional processing and potentially display. Re-encryption intermediaries is a type of token or service, described herein.

In many embodiments, tokens that are public and posted on ledgers or other public databases may be referred to as public tokens. Tokens placed on private databases and ledgers (e.g., within a governmental organization or a confidential enterprise system) may be referred to as private tokens. In the example of a token associated with a rental car, the token may be a private token and only accessible to the car rental company.

Tokens that are encrypted and posted on ledgers or other databases can be referred to as protected tokens. Protected tokens can only be decrypted by parties associated with the token in that the encryption uses a key for which accessing parties have a decryption key. One token may have one set of accessing parties, whereas another may have a different set of accessing parties. One token may only permit the owner of the token, which may be the party it describes, to decrypt, whereas another token may also require one or more specified authorities to decrypt the protected token.

The type of a token may be specified by its owner or party creating the token, and the type may be modified by a party with access rights. For example, a protected token can be turned into a public token by being decrypted and posted to a ledger. Similarly, a derived token can be generated from a public token, wherein the derived token has a different identifier not correlated to the public token (or only identified in an encrypted link), and wherein the derived token is encrypted and placed on a ledger, thus making it a protected token that is not possible to associate with the related public token without the capability of decrypting the encrypted link.

In a number of embodiments, tokens may include an expiration field. Expiration fields in accordance with numerous embodiments of the invention specify an expiration date when a token ceases to be valid. In many embodiments, expiration may be specified using one or more rules, where such rules can relate to dates, external conditions, and/or to other tokens. When a token is expired, it is no longer used to determine the current state, e.g., of a user, but it can still be used to attest to a historical state. For example, a token attesting to the fact that a user has a driver's license, when expired, no longer grants any rights of driving a car, but can still be used as evidence that previously, the associated user had this right. The department of motor vehicles of a first jurisdiction may, for example, determine that a user with a valid license from a second jurisdiction may qualify to have their license transferred to the first jurisdiction, and another user with an expired license from the second jurisdiction may be requested to perform a first test to get a license in the first jurisdiction, while a third user without any valid or expired license may be required to perform a second test to get a license in the first jurisdiction.

For a token granting the holder with rights (e.g., the right to derive tokens from input tokens in a pre-specified manner), expiration of the token corresponds to the cessation of these rights. To renew these rights, the holder would need to acquire a new token granting this right or have the existing token extended in terms of the expiration date.

In many embodiments, expiration dates can be extended. Expiration dates in accordance with many embodiments of the invention can be encoded using hash chains, where expiration dates further into the future correspond to longer chains being disclosed. The use of hash chains to express time is disclosed in "BLT+L: Efficient Signatures from Timestamping and Endorsements" by Denis Firsov, Henri Lakk, Sven Laur, and Ahto Truu, the disclosure of which is incorporated by reference in its entirety. Efficient management of hash chains is disclosed in "Almost Optimal Hash Sequence Traversal" by Jakobsson and Coppersmith, and is also incorporated by reference in its entirety.

In certain embodiments, the party with the ability of disclosing new hash chain elements may be the party generating the associated token or a third party that is trusted with verifying the conditions required for the extension of the expiration date of the token. Such a party may be able to compute some or any elements of the hash chain. For example, some parties may be able to compute some ten first elements, but not the succeeding ten elements of the hash chain, whereas another party may be able to generate all twenty elements, or more. A party with the ability of generating twenty elements can bestow that capability to a party able to generate only ten, e.g., but disclosing the twentieth element of the hash chain to that party. It can also grant the capability to generate only the first fifteen elements, in spite of itself being able to generate the first twenty elements. This provides a powerful party to grant a less powerful party the right to perform a task, potentially conditional on a verification (e.g., of the track record, reputation, etc.) of the less powerful party by the more power party.

Tokens in accordance with certain embodiments of the invention can express capabilities. Capabilities in accordance with a variety of embodiments of the invention may include one or more values, where each such value may be encoded as a hash chain. Tokens with capabilities encoded as hash chains can be modified to expand (or decrease) the capabilities by modifying the amount of the chain that is exposed, where the length of the chain can correspond with a level of the capability.

In several embodiments, capabilities can be removed, for example, by causing the token to expire (e.g., by not extending its expiration) and replacing it with a token with lesser capabilities. In numerous embodiments, capabilities of a token, and its changes, may be expressed by accessing a ledger entry that expresses any changes, whether increasing or decreasing capabilities. Ledger entries for capability changes in accordance with many embodiments of the invention may include an identifier that is also included in the token that it modifies, thereby facilitating efficient retrieval of capability values. Capabilities in accordance with a number of embodiments of the invention may include the right of a party associated with the token to perform a given action (e.g., whether the party is allowed to generate derived tokens that do not include encrypted elements associated to the identifiers of the input tokens). In various embodiments, capabilities can include pre-requisites required to be able decrypt encrypted elements. Capabilities in accordance with certain embodiments of the invention can include rules regarding whether the party generating the derived token needs to include a proof indicating that the contents of the encrypted link elements is well-formed. For example, proofs in accordance with several embodiments of the invention can use methods developed for encrypted email wherein the encryption comes with an escrow capability. One example of such a system is "A Simple Method for Generating and Sharing Pseudo-Random Functions, with Applications to Clipper-like Escrow Systems" by Micali and Sidney, the disclosure of which is incorporated by reference herein in its entirety.

Tokens in accordance with a number of embodiments of the invention may describe access rights. In a number of embodiments, access control tokens can include access control lists (ACLs) that indicate what users have what access rights. ACLs in accordance with a number of embodiments of the invention can be specified as matrices or tables, where entries include tuplets of identity indicators and right indicators. Identity indicators in accordance with a variety of embodiments of the invention may be represented by references to tokens (e.g., identity tokens), whether of a user or a collection of users. Right indicators may specify simple access rights such as (but not limited to) whether a given user has read or write access or just read access; whether any number of accesses are permitted to the given user; etc. In a number of embodiments, right indicators may include rules or executable elements, refer to tokens that identify rights (or rights tokens), and/or specify the circumstances under which a given resource associated with the right token may be accessed by parties matched by the corresponding identity token (e.g., an identity verification token). Right indicators in accordance with some embodiments of the invention may specify physical entry access such as (but not limited to) entrance to an employer's facilities, entrance to a secure area of a building, parking structure, gate, entrance to a personal home, vehicle, personal safe, and/or locked personal items.

In numerous embodiments, tokens correspond to services. For example, a token may include an executable content that performs a desirable action when executed. Executable content elements in accordance with some embodiments of the invention may specify that they only can be executed in specified trusted execution environments (TEE) or using specified DRM applications, and may be encrypted, in full or in part, to only enable parties with the associated decryption keys to decrypt and use the full contents associated with the token. TEEs and DRMs can be used, for example, for purposes of mining, as described in U.S. patent application Ser. No. 17/806,725, entitled "Grinding Resistant Cryptographic Systems and Cryptographic Systems Based on Certified Miners", filed on Jun. 13, 2022, the disclosure of which is incorporated by reference herein in its entirety. TEEs and DRMs can also be used to manage sensitive data or inputs, such as biometric data. Tokens can specify that pre-specified TEEs or DRMs must be used for at least some execution related to the use of the token, including the execution of an element of the token, where this element may receive information from external computational elements.

In various embodiments, tokens that correspond to a service may cause a billable event when it is executed. In a variety of embodiments, tokens may require, as input, a payment or a commitment to a transaction, as described in U.S. patent application Ser. No. 17/806,725, entitled "Grinding Resistant Cryptographic Systems and Cryptographic Systems Based on Certified Miners", filed on Jun. 13, 2022, the disclosure of which is incorporated by reference herein in its entirety. In a number of embodiments, tokens performing a service may do so conditionally on the provision of one or more inputs satisfying some requirements associated with rules encoded in the token performing the service. For example, such inputs may include reference to other tokens that provide inputs used to evaluate rules. DRM-supported tokens or TEE-supported tokens may be referred to as trusted tokens, since the use of DRMs and TEEs help control the execution and ensure, relative to the environment and associated certification, that the correct actions are performed, as governed by the processed information and the specifications. In other words, the use of trusted tokens, in distributed and untrustworthy environments, helps establish trust.

In various embodiments, ownership tokens correspond to virtual, digital, and physical items. Ownership tokens in accordance with some embodiments of the invention can be used in various applications, such as (but not limited to) ownership tracking, product support, warranty records, etc. as described in U.S. patent application Ser. No. 17/198,123, entitled "Managing Ownership and Access", filed Mar. 10, 2021, and in U.S. patent application Ser. No. 17/401,687, entitled "Proxy Management and Attribution", filed Aug. 13, 2021, the disclosures of which are incorporated by reference herein in their entirety. For example, a gamer may purchase a digital tool for use in an online multiplayer gaming environment and store a record of ownership of the item within an application running on a personal device connected to a server with the gamer's identity and the item represented as tokens within the system. In another example, a homeowner might purchase a cordless drill that she also wants to store in a system that associates her identity-related tokens to her purchase and the items serial number and warranty to one or more tokens to represent her ownership of the item and its genuineness from the manufacturer.

In various embodiments, associated tokens may be created by a manufacturer, a point-of-sales entity effectuating the sale to the user, by the user who bought the item, etc. In numerous embodiments, purchasers may create associated tokens by providing information (e.g., from the receipt or warranty, merchandise serial number, or other identifier) to a service that generates tokens. Token generation services in accordance with several embodiments of the invention may execute on a buyer's device, on a web server, as a token, etc. In certain embodiments, token generation services may be supported by the manufacturer, a merchant, or an entity associated with a standards body that manages serial numbers. In numerous embodiments, tokens may be associated with merchandise prior to purchase. Links to the token can be included with the merchandise, e.g., in the form of a QR code. QR codes may represent a URL that corresponds to a location associated with the token, such as (but not limited to) where token data is stored, an index into a ledger identifying the token, etc. In numerous embodiments, different instances of the same product (e.g., two identical but unique toasters) can be represented by different QR codes, each one of these being associated with different tokens, each such token representing one of the physical products. QR codes in accordance with some embodiments of the invention can be general for the product type, and a user can input a serial number or other unique identifier to locate and retrieve the associated token.

Different tokens, whether associated with the same type of product or different products, and whether corresponding to physical merchandise, virtual items, or representations of service, may have various information related to the corresponding product, such as (but not limited to), the creation dates of the product and/or token, expiration dates, warranty information, identifiers associated with quality control, etc. In several embodiments, a QR code can be scanned to claim ownership of the associated item, e.g., as described in U.S. patent application Ser. No. 17/198,123, entitled "Managing Ownership and Access", filed Mar. 10, 2021, and in U.S. patent application Ser. No. 17/401,687, entitled "Proxy Management and Attribution", filed Aug. 13, 2021, the disclosures of which are incorporated by reference herein in their entirety. In a variety of embodiments, users can be assigned ownership during the checkout process, or as a consequence of initiating, performing, or completing a payment. When a user claims ownership of an item and its associated token, a connection can be made between a token describing property owned and the token representing the item. The token representing property owned may be specific to a given user or otherwise link to a token representing the user. The representation of a user may be pseudonymous, as is described in this disclosure.

In numerous embodiments, ownership tokens (either directly or through relationships with other tokens) may enable individuals and organizations to use items in new ways. For example, a user that has purchased NFTs from musicians or bands may have accumulated a significant library of songs that they wish to listen to on their own devices without the need for music streaming services. This enables the user to prove the right to listen to the song one or more times and provides the artist with an ability to both license their art to the individual or organization directly and to enjoy a direct communication relationship with the user as a result of the transaction. The user, having purchased specific rights to the song, or other type of artwork, digital, or physical goods, may be enabled by policies to listen to the song on a mobile device application, in a home environment, with augmented or virtual reality systems, etc. Tokens containing licenses may be referred to as a licensing token.

In another example, a user may purchase a piece of physical artwork with an accompanying NFT that enables, by policy, the user to reproduce the artwork digitally for use in an augmented reality world, such as a virtual work office. Originators of items, such as videos or songs, can associate a policy with the item, where this policy governs the access rights of acquirers. There may be multiple such policies for an item. For example, one policy may state that a person buying a rendering license to the item may view or listen to the item, or otherwise render it, up to a maximum number of times. The cost of acquiring such a right may be $0.55, which may be stated by the policy or which may be a free-standing requirement, and which also may depend on market forces. At the same time, another policy may state that a user acquiring limited resale rights to the item may render it any number of times, and may sell up to 100 rendering rights with a limit of 2 renderings at a price that the buyer decides; such a policy may be associated with a price of $40 to acquire it. A third policy may correspond to a complete exclusive acquisition, which means that the new owner has all rights, and can set all policies for the item as they wish. The cost of such access may be $1000. Additional policies can be applied by organizations having facilitated the development of the item, e.g., a video production software suite that either has to be licensed by the user, or which will insert advertisements in items, or which will require a $0.02 payment each time an item generated using the services is rendered. In several embodiments, external policies (e.g., from a local government) may be associated with items represented by tokens, e.g., limiting the distribution, rendering or generation of items of certain categories.

Figure 19:
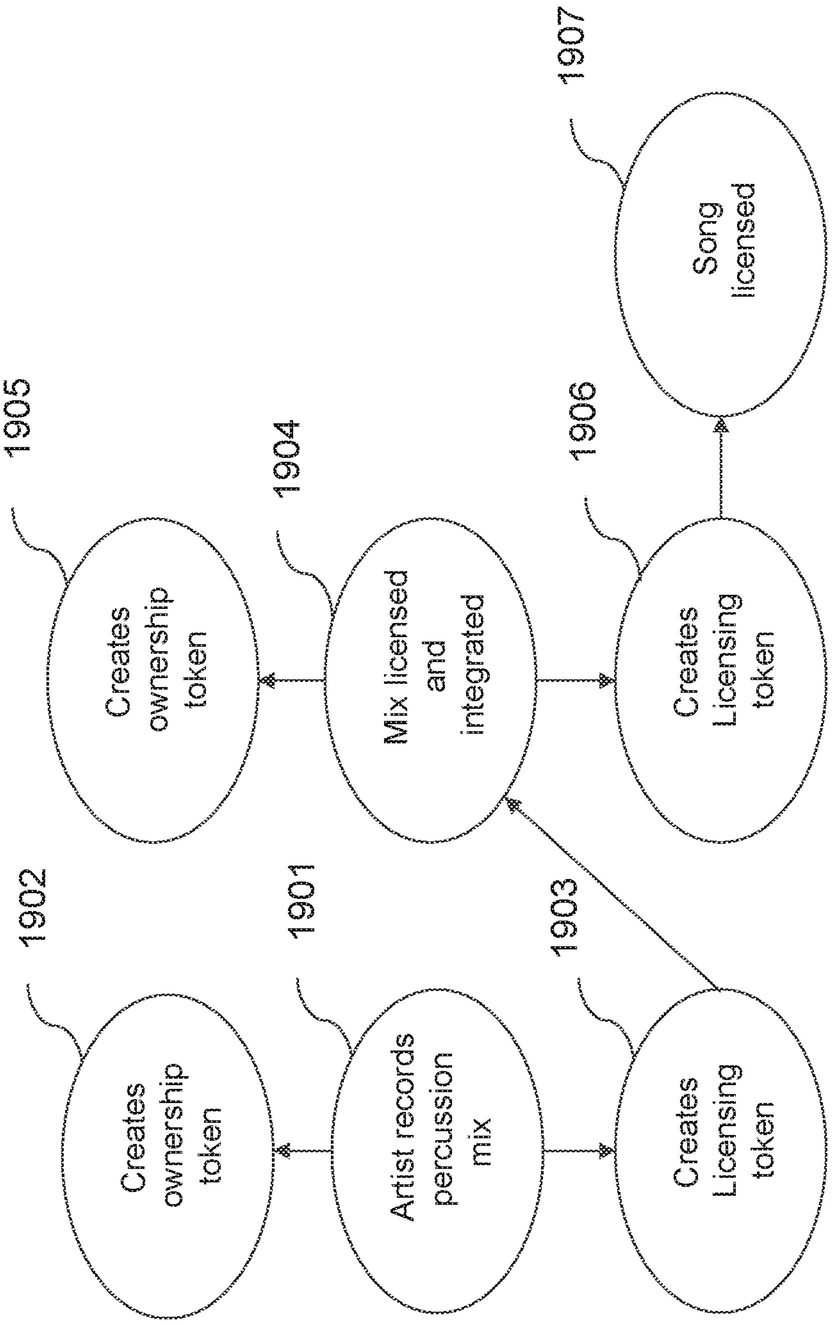
FIG. 19 illustrates examples of ownership tokens and licensing tokens through the creation and licensing of both a percussive beats mix and a song containing the percussive beats mix.

Examples of ownership tokens and licensing tokens through the creation and licensing of both a percussive beats mix and a song containing the percussive beats mix are illustrated in FIG. 19. An artist records a percussion mix 1901 and mints or creates an ownership token 1902. The first artist decides to license the beats mix to bands by creating a licensing token 1903 that enables other artists (licensees), to add the beats mix to their vocals and other instrumentals. The licensee artist takes a mix license and integrates 1904 the percussion mix with their sounds. The licensee artist creates an ownership token 1905 for the licensee artist's work and creates a licensing token 1906 for their fans to enjoy with a song license 1907.

In a related example, an artist records a percussion mix 1901 and mints both an ownership token 1902 to protect their creation, and a licensing token 1903 in order to offer the beats mix to a movie studio for incorporation into an upcoming feature film. The movie studio licenses and integrates the mix 1904 having been matched in a decentralized marketplace by the licensing needs of the artist and the film producer's need to license the beats mix as described in U.S. patent application Ser. No. 17/328,241, entitled "Privacy Preserving Matchmaking", filed May 24, 2021, the disclosure of which is incorporated by reference herein in its entirety. The movie itself is produced and the studio creates an ownership token 1905 for the film to protect their copyrights, and creates a licensing token 1906 such that the film may be licensed 1907 and broadcast to interested viewers.

While specific implementations of ownership and licensing tokens have been described above with respect to FIG. 19, one skilled in the art will recognize that numerous configurations of ownership and licensing tokens may be implemented as appropriate to the requirements of a given application.

In a variety of embodiments, tokens correspond to a need stated by a party association with the creation of the token. Tokens in accordance with several embodiments of the invention may indicate the need to exchange value associated with the token for a service, access, rights or another value. For example, the token may include a rule indicating a first resource and a second resource, where the first resource is associated with the token and the second resource is what is sought. The first resource may be an amount of financial value associated with a coin that is referenced by or part of the token, whereas the second resource may be access rights to watch an indicated movie a specified number of times that may be set to an infinite number of times. This may correspond to an offer to buy access rights to the indicated movie at a maximum price specified by the token. The second resource may be an NFT, e.g., related to the movie described above, for which a party needs access to an access credential to decrypt the movie in an environment pre-specified by the second resource. This could be specified to be a particular DRM environment, for example. This environment may be specified by being one out of a collection of approved environments or as having one or more minimum requirements satisfied, as certified by one or more pre-specified entities. In this example, the token can therefore be seen as a purchase request that could include, for example, an identifier such as an address and a key such as a public key, where a resource access value such as a decryption key could be delivered by transmitting it to the address associated with the identifier, encrypted using the key such as the public key.

As a contract associated with such a token is completed, e.g., by the matching of this first token including the first resource and the second resource descriptor to a second token including information enabling access to the second resource, the access key is transmitted to the address associated with the identifier. This identifier may be an email address, an application unique identifier, a phone number, etc. At the same time, the successful evaluation of the contract associated with the first token to a matching contract associated with the second token would cause the conditional payment associated with the contract to be bound to a public key or other identifier that is embodied in the second token, and the bound contract, or parts thereof, communicated to a public ledger for recordation, or transmitted to an address specified by the second token, the communication optionally encrypted using a public key also specified by the second token.

In a number of embodiments, he evaluation of the two tokens to determine whether they match or not can be done in the manner described in U.S. patent application Ser. No. 17/328,241, entitled "Privacy Preserving Matchmaking", filed May 24, 2021, the disclosure of which is incorporated by reference herein in its entirety. Tokens can also be matched in a decentralized manner in accordance with a number of embodiments of the invention, simply by one or more matching entities scanning posted tokens that correspond to requests to be matched, as indicated in at least one of the tokens, and finding other posted tokens to evaluate whether any one of them match. Some such matching may have to be performed in a specified environment, such as a TEE or a DRM, requiring the matching entities to have such execution environments for the matching attempts to be possible. By policy, tokens containing personal or private information may require the matching entity to record having accessed the information. Matching entities may then compete with each other to find matches, and would be rewarded for finding matches in accordance with components of the tokens that specify matching rewards. Rewards can also be implicit in the system, e.g., specifying that a certain fee is paid automatically to a party that records a matching two or more tokens on a ledger, or otherwise causes the matching to be consummated.

Matching of tokens in accordance with many embodiments of the invention may be performed by a bounty hunter in a decentralized matchmaking system. Individuals or organizations are able to post their needs into a decentralized ledger enabling bounty hunters to serve as match finders. The size of the reward for a match may be specified in the token, or associated with its record. The size of the reward may be governed by one or more policies, and may depend on the final terms of the matched agreement, where a token owner may specify a higher reward for a match that is more favorable to the token owner, and where a certain pre-set minimum requirement must be satisfied for a match to be valid; such requirements can also be specified by a policy.

In one example, several hundred individuals may have created tokens representing their needs such as travel desires, medical tourism needs, investment opportunities, or even mundane services such as plumbing or fence repair. Among these individuals' wants and needs are complementary matches, such as an individual in New Hampshire that wants to rent out their summer home and an individual in Florida looking for a northern getaway in July, as described in U.S. patent application Ser. No. 17/328,241, entitled "Privacy Preserving Matchmaking", filed May 24, 2021, the disclosure of which is incorporated by reference herein in its entirety. The bounty hunter, identifying a potential match, is able to propose a contract or smart contract to the individuals to enable the individuals to complete a negotiation and contractualize their agreement. Alternatively, or conjunctively, one or more of the tokens being matched may include such a contract. Bounty hunters in accordance with several embodiments of the invention may also be entitled to offer additional parties to improve the proposal, such as when a triangular set of needs arises. For example, assume the party in Florida is only able to pay in cryptocurrency, but the New Hampshire property owner will only accept US Dollars. A third-party may be proposed by the bounty hunter to perform a necessary currency conversion for all parties to agree to the contract. In many embodiments, special needs, requirements, or limitations of the parties may be expressed within the requirements field of a token (e.g., when renter's insurance may be necessitated by the property owner). In some embodiments, individual token owners may also attempt to find matches.

Figure 20:
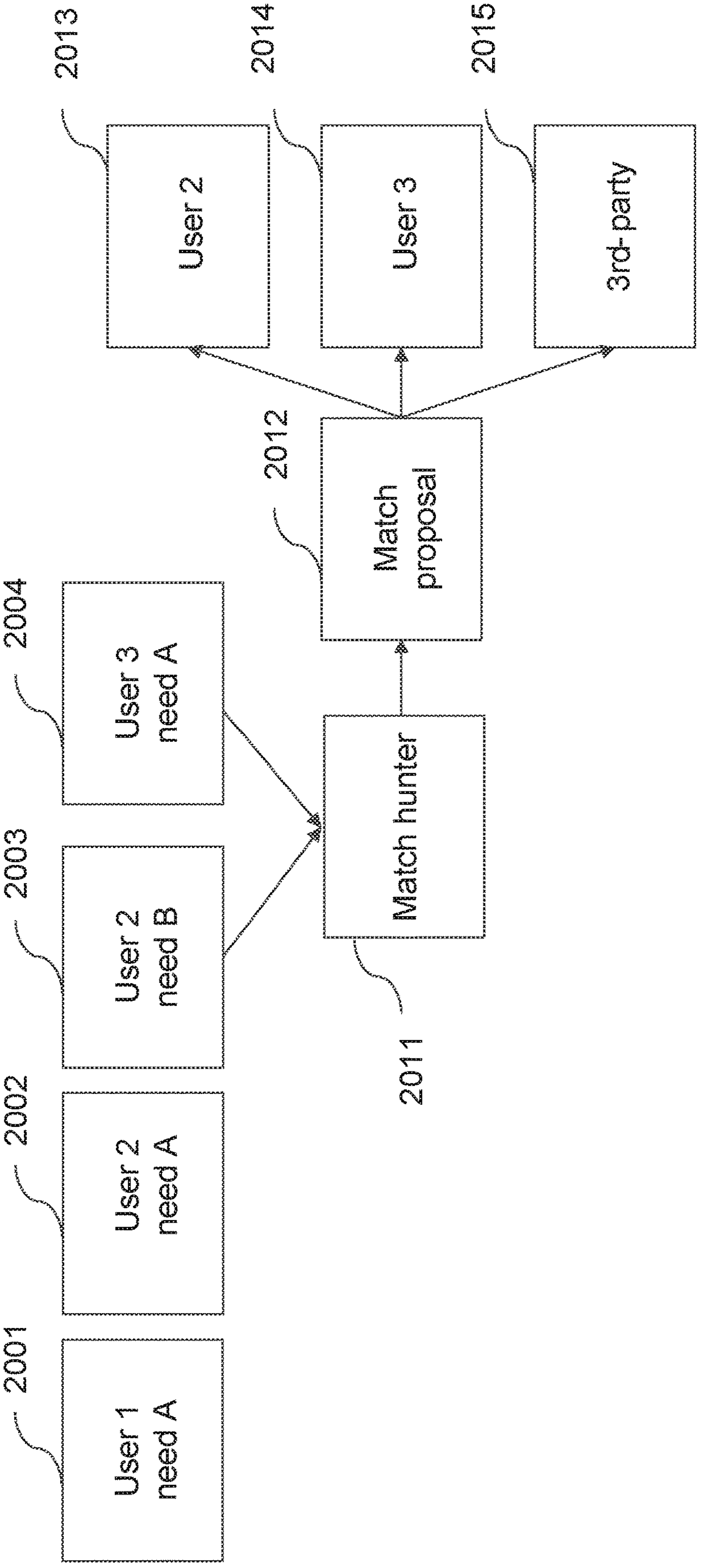
FIG. 20 illustrates an example of matching user needs as represented by tokens in accordance with an embodiment of the invention.

An example of matching user needs, as represented by tokens is illustrated in FIG. 20. The needs of individuals or organizations can be entered by users as match tokens or need tokens into a centralized or decentralized database or ledger system. In this example, there are four need tokens, user 1 need A 2001, user 20 need A 2002, user 20 need B 2003, and user 3 need A 2004. One or more match hunters 2011 evaluate the various need tokens to locate a potential compatible match. User 2 need B 2003 may be a need for a rental cabin in Montana, while user 3 need A 2004 may be the need to rent out their cabin in Montana. The match hunter 2011 may offer a match proposal 2012 to user 2 2013, user 3 2014 and an associated 3rd-party 2015 that is able to offer an insurance and post-rental cleaning service in support of the match proposal 2012. The bounty hunter, serving as a match hunter 2011 may receive a small matching fee for identifying the resource match in a similar manner to how bounty hunters identify, and are rewarded for, internet assets that are not available as contractually obligated as described in U.S. patent application Ser. No. 17/806,065, entitled "Systems and Methods for Maintenance of NFT Assets", filed Jun. 8, 2022, the disclosure of which is incorporated by reference herein in its entirety.

While specific implementations of matching have been described above with respect to FIG. 20, one skilled in the art will recognize that numerous configurations of matching may be implemented as appropriate to the requirements of a given application.

Tokens in accordance with numerous embodiments of the invention can specify, in a requirements field, one or more conditions required to be satisfied to evaluate the token. Conditions in accordance with several embodiments of the invention can indicate a given environment that is required to be used, or some minimum requirement that the environment must satisfy according to one or more approved certificate authorities. For example, a token may specify that a given functionality of the token, such as access to one data or instruction container that is included in the token, can only be performed in a DRM environment that is rated as having a security level of at least 67 by one of several entities specified in the requirement. In certain embodiments, associated containers may be encrypted in a manner that instances of the specified environment can decrypt.

In a number of embodiments, conditions can be managed using key management entities. Key management entities may be specified in a token and may have a private key that enables the decryption of the container, where the key management entity may verify that one or more rules are satisfied prior to decrypting the container. Key management entities in accordance with a number of embodiments of the invention may then encrypt the container for the selected environment, which may entail first receiving an identifier used to verify that the environment qualifies, and then encrypting the decrypted container with a public key associated with the identifier. This enables different instances of the same type of DRM unit to have different encryption keys, and therefore, independent decryption keys. Independent decryption keys offer the benefit of tracking illicit digital copies of copyright material, and to limit the impact of potential breaches. In a number of embodiments, key management entities may replace the encryption layer of the container with an encryption layer associated with the selected, and approved, environment without ever causing the exposure of the plaintext data of the container, even to the key management unit itself. This can be done by a key management unit that is a distributed functionality including a quorum of servers, as disclosed in the 1999 publication titled "On Quorum Controlled Asymmetric Proxy Re-encryption", by Markus Jakobsson, which is hereby incorporated by reference in its entirety. In one embodiment, the re-encryption functionality is not performed by a quorum, but by a single party, which may be represented by a token, and where this may be a trusted token; for example, it may be a token that is implemented as the trusted bounty hunter described herein.

In a number of embodiments, service providers (e.g., key management units) may be indicated by tokens, e.g., by their address or other identifier, certification, or other value indicating that they have the capability and right to perform the services indicated in the associated token. In various embodiments, service providers are tied to both specific environments or qualifications (e.g., certifications) and to a token specifying their functionality. When a token such as a token specifying an available resource and a desired resource are matched to a token representing with the suitable desired resource as its available resource and a suitable available resource as its desired resource, then service providers in accordance with a number of embodiments of the invention may be identified by one or both of the tokens involved in the match and used as a method of converting the identified match into a consummated match. In some embodiments, consummating a match may involve the delivery of data to addresses specified in the two tokens, protected by encryption using keys also specified in the two tokens; it may also involve the verification of at least some rules associated with the two matched tokens, e.g., to determine that neither has expired. Processes in accordance with numerous embodiments of the invention may also verify additional conditions. For example, the first token may express a desire to acquire rights to five instances of a given resource, but not more. The third party may evaluate the number of times the first token has been successfully matched and only complete the operation if no more than four instances have already been acquired. This may entail determining, based on the contents of ledgers recording successful matches, how many times the first token has been matched. If the first token has been matched the number of times it requested, whether before or after the verification, the third party may notify the marketplace to remove the first token from circulation among the tokens to be matched. Such verifications can also be performed during the matching operations, where this may entail access to the ledger recording successful matches.

In a number of embodiments, one or more tokens relate to an investment opportunity. For example, a first token may represent a deed to a first building indicating ownership by a first party, and a second token a deed to a second building indicating ownership by a second party. A third token may represent one or more valuations of the first building, and may in turn be associated with a fourth token that represents credentials of a party performing such a valuation. A fifth token represents one or more valuations of the second building, and may be associated with a sixth token that represents the credentials of a party performing a valuation for the second building. The fourth and sixth tokens may be further associated with one or more insurance policies, asserting that if the parties performing the valuation are mistaken beyond a specified error tolerance, then the insurer would pay up to a specified amount.

A seventh token represents a contract that relates to the planned acquisition of the second building by the first party, from the second party, at a specified price and provided a sufficient investment by a third party. A third party can evaluate the contract of the seventh token, and determine whether the terms are reasonable; then verify the other described tokens to verify that the terms stated in the contract of the seventh token are in agreement. If the third party, which may be represented by a script that is part of an eighth token, determines that the contract exceeds a threshold in terms of value to risk, as assessed by code included in the eighth token, then an executable element of the eighth token may cause a transfer of funds to the an escrow party specified in the contract of the seventh token. Alternatively, code associated with the eighth token may cause the commitment of funds, conditional on the remaining funds being raised within a specified time interval, and post the commitment to a ledger. This can be a smart contract that is conditional on other events, namely the payments needed to complete the raising of sufficient funds to complete the real estate transaction, and may have one or more additional conditions associated with it, such as the reversal of the payment if, after a specified amount of time, the other funds have not been raised; or a condition related to the satisfactory completion of an inspection or additional valuation, etc.

Tokens can not only assert ownership of physical property, as it would in this example, but could also relate to virtual property, such as an NFT, or other rights, such as the rights associated with a patent or pending patent. Thus, this can enable transactions that may not otherwise be practically possible, and with a larger marketplace than is currently practically achievable; thus, this structure and the associated functionality enables new forms of commerce. In certain embodiments, entities involved in ownership of a property may be of a fractional ownership type such as when several individuals or entities come together to purchase or rent one or more specific properties. For example, two brothers wish to purchase an expensive work of digital artwork represented by an NFT. The brothers enter into a smart contract to fund and purchase a valuable work and the resulting token represents each brother's contribution to the purchase and equivalent fractional share of ownership, which may be 50% to each brother.

Biometric verification tokens in accordance with a number of embodiments of the invention are anchor tokens that relate a user's biometric properties (e.g., fingerprints, facial features, and/or iris prints) to an identifier that may be embodied in the biometric verification token, or an external element such as another token, e.g., an identity token. Another example of an anchor token is a location token, which may, for example, identify a GPS location. A location token may either be tied to a sensor, e.g., a location sensor, or it may simply be a descriptive token in which a user has asserted a location.

In many embodiments, biometric verification token may generate an output, such as an authentication assertion token, that can be consumed by other entities, including other tokens. Authentication assertion tokens in accordance with certain embodiments of the invention may have an expiration time and/or date (such as 25 seconds after it was first generated). In several embodiments, authentication assertion tokens may be tied to a specified token or application that will consume the information. Authentication assertion tokens may include indications of identity, including aliases. In some embodiments, authentication assertion tokens may be at least partially encrypted to protect sensitive data. Authentication assertion tokens may relate to a human user, but may also be an identity assertion of an organization, or of a group of users. To represent a group, constructions such as those described in the 2004 publication "Signature Schemes and Anonymous Credentials from Bilinear Maps", by Camenisch and Lysyanskaya, can be used, the disclosure of which is incorporated by reference herein in its entirety.

Figure 21:
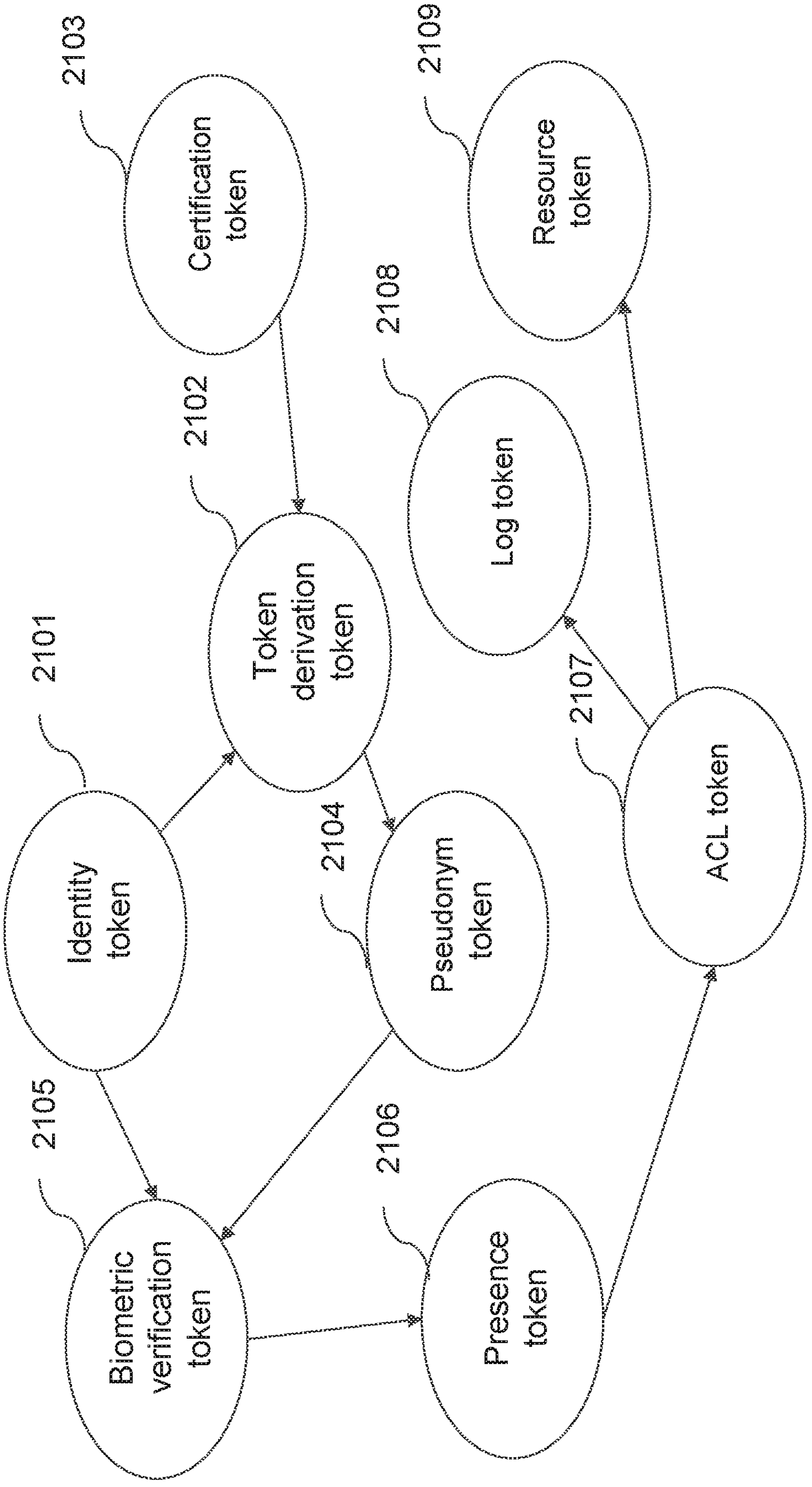
FIG. 21 illustrates a graph including a collection of interrelated tokens in accordance with an embodiment of the invention.

Tokens in accordance with certain embodiments of the invention may be associated with other tokens in various ways. Tokens with associations with other tokens in accordance with a number of embodiments of the invention can include (but are not limited to) derived tokens, relative tokens, inheritance tokens, etc. A graph including a collection of interrelated tokens in accordance with an embodiment of the invention is illustrated in FIG. 21. In this figure, identity token 2101 includes a unique identifier associated with a user. This may, for example, include a system-assigned number, a public key, or a digital certificate. It may also include a traditional identifier, such as a social security number, a passport number or a birth certificate identifier. Identity token 2101 may be at least on part encrypted, and only accessible to select parties, such as the associated owner (and their applications, which may be tokens), and trusted services such as token derivation token 2102, which provides the service of generating derived tokens such as pseudonym token 2104 from identity token. Capabilities to access the plaintext data of identity token 2101 may be provided to token derivation token 2102 by certification token 2103, that may enable token derivation token 2102 the ability to do so, e.g., after verifying that token derivation token 2102 satisfies some criteria, such as being related to a pre-specified TEE or DRM, or passing some pre-specified standard.

Pseudonym token 2104 may include a unique pseudonym identifier associated with identifiers of identity token 2101. In some embodiments, pseudonym tokens can be used for a limited time or a limited number of transactions, and is then replaced by a newly derived token expressing a new pseudonym identifier. This disassociates the user from a series of recorded events, each one of which is associated with different pseudonym identifiers.

Pseudonym token 2104 includes a (potentially encrypted) identifier that is accessible to biometric verification token 2105, which may be associated with a TEE or DRM, and which is associated with one or more biometric sensors. Pseudonym token receives as input either identity token 2101, pseudonym token 2104 or both of these, and determines, based on stored biometric profiles, whether a value received from a biometric sensor is a match with one of the stored biometric profiles. If it is, then biometric verification token 2105 generates a presence token 2106 asserting that the user related to the identity (whether expressed by identity token 2101, pseudonym token 2104 or both) has been confirmed to be present. The presence token 2106 may include additional data, such as information about the type of biometric sensor that was used, the quality of the biometric authentication signal, potential funkspiel alert signals, indications of a resource to be accessed, and more. Some of this data may be encrypted and only accessible to pre-set tokens. The information about the resource to be accessed may have been specified by a user or a token, but is not shown in this figure. Presence token 2106 is conveyed to access control token 2107 that verifies whether the user associated with presence token 2106 is allowed to access an indicated resource also associated with presence token 2106, based on an access control list or on information conveyed in a request (not shown). Access control token 2107 generates a log token 2108 that describes the decision, e.g., whether access was granted or not, and if access is granted, conveys a signal to a resource token 2109 that provides a service or otherwise enables an access. For example, resource token 2109 may enable the rendering of a movie that the user associated with identity token requested.

While specific implementations of token relationships have been described above with respect to FIG. 21, one skilled in the art will recognize that numerous configurations of interrelated tokens may be implemented as appropriate to the requirements of a given application.

In various embodiments, tokens may be relative tokens. For example, a pseudonymous token, which we also refer to as an alias token, is a type of relative token as it is derived from another token in which there is an identity, and therefore relates to this token. Relative tokens in accordance with a number of embodiments of the invention can relate two or more tokens to each other. In numerous embodiments, relationships between tokens can be verified using digital signatures and/or public and private keys. For example, consider a relative token that includes a digital signature that is verified using a public key of an identity token, and where the digital signature is on a message including a location token; this relative token may be an assertion by a person corresponding to the identity token that they are in a location that corresponds to the location token. Conversely, a signature verified using a public key embedded in a location token is a proof, assuming the trustworthiness of the location token, that an entity sensed by the location token is present. Such a sensing mechanism can use the approach described in Chaum and Brands' "Distance Bounding Protocols," published in 2001, the disclosure of which is incorporated by reference herein in its entirety. The signature using the public key of the location token would sign a message including an assertion that a given physical entity, such as a phone represented by a second token including a public key unique to the phone token, is physically present. This digital signature on this message is part of a token that expresses the proximity between the phone and the location; this token is a relative token as it relates one token (the phone token) to another token (the location token). If the location token was generated using a GPS sensor, in a trusted environment such as a TEE or a DRM that is certified, then the relative token describing the proximity is a proof of co-location of the phone and a GPS coordinate, i.e., a proof of location of the phone. Analogously, a proof of proximity between two mobile entities is a proof of co-location, but is not necessarily identifying where either entity is located, only that they are co-located. Relative tokens in accordance with many embodiments of the invention can be derived from other tokens, namely those they relate to, and are therefore also derived tokens. An anchored token may tie to another token, which makes it both anchored and relative.

Figure 22:
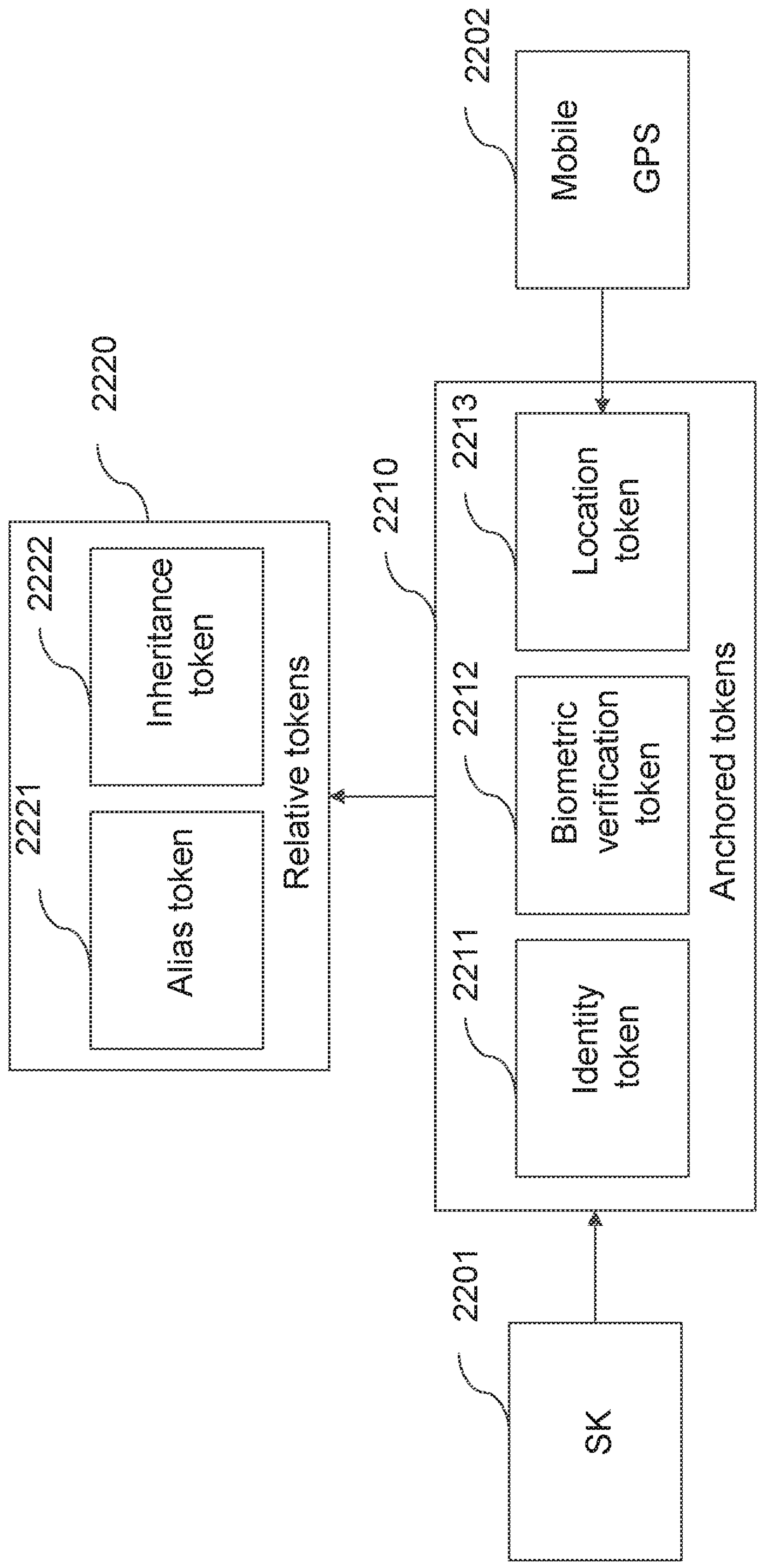
FIG. 22 illustrates an example of a relationship between anchored tokens and relative tokens in accordance with an embodiment of the invention.

An example of a relationship between anchored tokens and relative tokens is illustrated in FIG. 22. In this example, anchored tokens 2210 are used to derive relative tokens 2220. Identity token 2211, which may be the same as identity token 2101, is associated with private key SK 2201 and biometric verification token 2212. Biometric verification token 2212, which is also an anchored token, ties an identifier such as identity token 2211 with its associated private key SK 2201 to a physical being through a biometric record.

Another example anchored token 2210 is a location token 2213 supported, for example, by a system of one or more sensors, such as a mobile device with GPS 2202 receiver, capable of determining a physical location. Relative tokens 2220 may include alias token 2221. Inheritance token 2222 is an example of another relative token 2220. In this example, alias token 2221 is able to access location data from location token 2213 from the anchored tokens 2210.

As an example application, alias token 2221 may be used by a social media application to express the location of a particular alias that is derived from a legitimate identity, without actually having to communicate or reveal the identity of the individual. In one example, user Alice is represented by identity token 2211 that specifies a unique system identifier only used for Alice; this may, for example, be a public key whose corresponding private key is used to sign identity assertions proving that Alice agrees to some fact or request. Such an identity assertion may be in the form of a contract token, for example.

Biometric verification token 2212 includes biometric templates for Alice, and before an identity assertion is generated, the system verifies that biometric verification token 2212 indicates that Alice's biometric template is being matched. In addition, a liveness token (not shown in this Figure) can be used to determine that the biometric verification token is not likely to be generated from a recording of Alice, for example. The liveness token, in some instances, is generated by the same biometric sensor collection that generates the signal corresponding to the biometric verification token.

The location token 2213 asserts an approximate location of Alice. Together, the depicted anchored tokens 2210 therefore corresponds to an assertion that Alice is physically present in a specified location, as determined by the verification of her biometrics and the corresponding liveness verification, combined with the location information of the GPS sensor that is part of the mobile device with GPS 2202. The location may correspond to a position right outside Alice's home's entrance door, which may then be automatically unlocked if the door handle is touched. However, if Alice's biometrics and liveness were verified, but her location either fails to be determined or is determined to be substantially different from right outside her entrance door, then the door is not unlocked.

In another example application, the same technique is used to unlock the door of an enterprise building where Alice works. For purposes of compliance, the enterprise may require a log of who accesses what facilities. However, in some instances, it is not appropriate to log the identity token 2211 as this may be a privacy intrusion, whether to Alice, her employer, or both. Therefore, instead of logging identity token 2211, a corresponding alias token 2221 can be generated and logged. In an extension to this example, the bank makes an acquisition of a small banking enterprise in Alice's hometown with a safety deposit box vault that is much closer to her home than the original bank location. Rather than ask Alice to re-enroll in their biometric identity system at the acquired bank, an inheritance token 2222 is generated by the bank to enable biometric-secured access to the new vault location. The inheritance token consists of Alice's identity token 2211 and biometric verification token 2212 for use in the acquired bank's vault security system.

While specific implementations of token relationships have been described above with respect to FIG. 22, one skilled in the art will recognize that numerous configurations of interrelated tokens may be implemented as appropriate to the requirements of a given application.

Inheritance tokens in accordance with certain embodiments of the invention are a form of relative token that transfers rights associated with a first token to a second token. For example, a computer, represented by an anchored token that is related to a physical entity, namely the hardware of the computer, may have access rights to a WiFi network. When a user replaces the computer with a newer model, it is desirable for the user to maintain all old relationships, e.g., to WiFi hotspots, for the new computer. The new computer will be represented by another anchored token that the one related to the old computer. In some embodiments, inheritance tokens acquire some or all preexisting rights associated with another token (the old computer), and associates those with a new token (e.g., associated with the new computer). A new user of the old computer may be granted none of the rights of the old computer, or some of them. Thus, the old computer may retain only some of the previous rights. More generally, multiple inheritance tokens can be used to selectively transfer rights associated with one token to one or more tokens, where such tokens may correspond to users, devices, or other entities, as described by any of the tokens disclosed herein, when such assignments of rights are applicable.

In several embodiments, inheritance tokens can also be used to transfer property. One way to implement the transfer of property is to create a digital signature using a private key associated with a token currently having the rights, on a message that described the assignment of what rights, under what conditions, etc.; and to what token(s), where the assigned tokens may be represented by identifies unique to these, such as public keys. The inheritance token includes the digital signature and the message and can be verified using the public key corresponding to the private key used to sign the message, where this public key is part of the token from which rights are assigned.

In numerous embodiments, as rights are assigned, they are transferred away from the previous owner (e.g., the token) to a new owner (the token with which they will be associated using the inheritance token). Access to financial resources is one such example. However, sometimes rights may be assigned to a new party without taking the same rights away from the party (i.e., token) from which the rights come. One example of this may be the right to listen to a song, when a license to the song is sold by the artist to a consumer. However, if the seller sells exclusive rights, this causes the seller not to have the rights anymore. Ownership of an investment NFT corresponds to another such situation.

Figure 23:
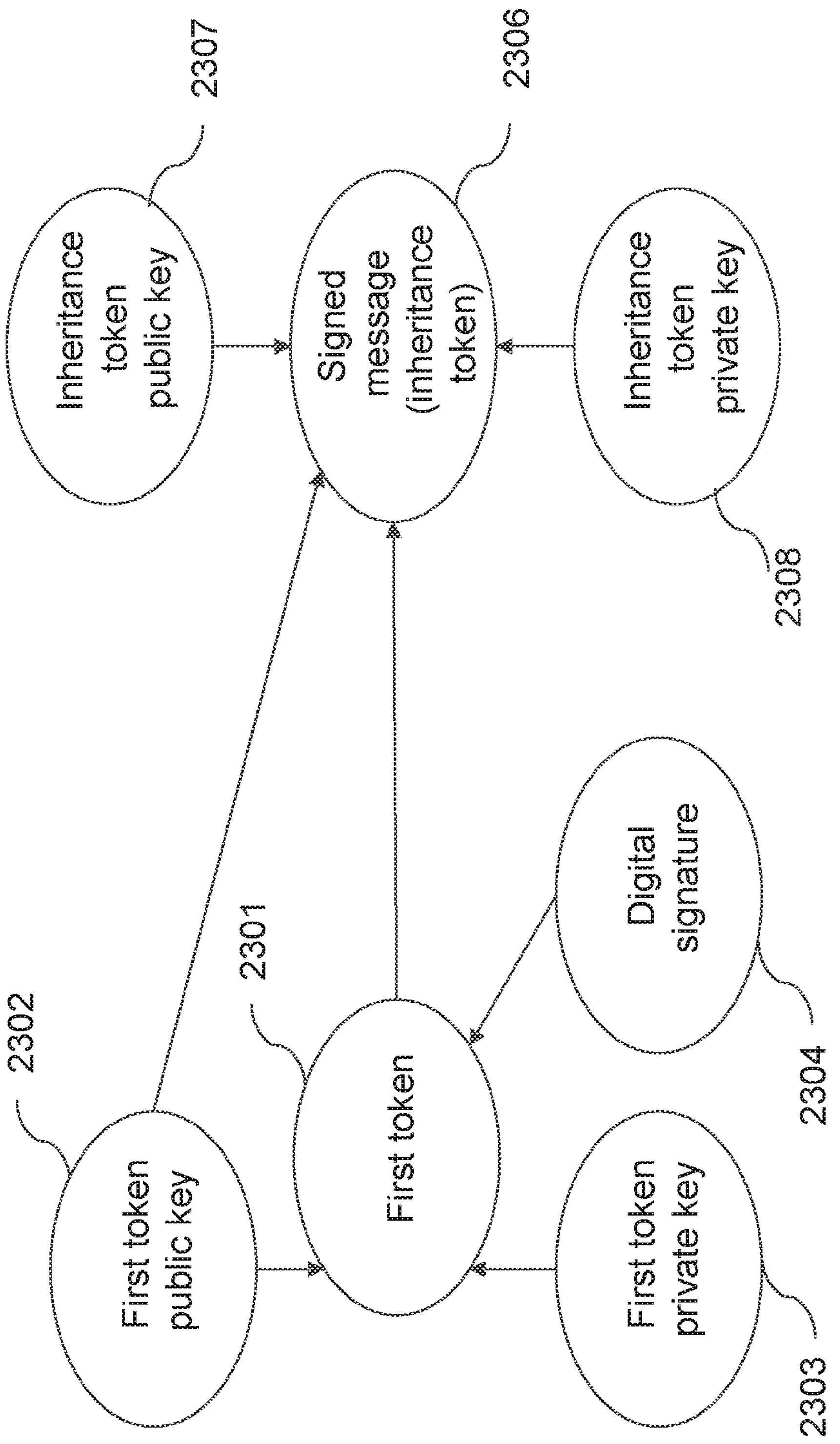
FIG. 23 illustrates an example of the movement of rights from an anchored token to a relative token in accordance with an embodiment of the invention.

An example of the movement of rights from an anchored token to a relative token is illustrated in FIG. 23. In this example the anchored token is first token 2301, which may correspond to identity token 2211 and, or, biometric verification token 2212 in the previous example of Alice's bank. The relative token is signed message 2306, which we also refer to as an inheritance token and which may correspond to inheritance token 2222 in the previous example. First token 2301, which may correspond to identity token 2211, has a corresponding first token public key 2302 and a first token private key 2303. Inheritance token signed message 2306 has a corresponding first token public key 2307 and a first token private key 2308. Signed message 2306 contains the secure passing or transfer of rights information from first token 2301. The inheritance token acquires some or all pre-existing rights associated with the first token 2301. For example, the inheritance token 2222 in the FIG. 22 example may include Alice's identity token 2211 but exclude her biometric verification token 2212 because the acquired bank utilizes a palm-print biometric system rather than a facial identification. The acquired banking system would be authorized to access Alice's identity token in full, but the acquiring bank would not have rights to access Alice's biometric details as stored in the biometric verification token 2212. The transfer of property may occur using a digital signature 2304 using a first token private key 2303 associated with the first token 2301 currently having the rights, on a signed message 2306 that described the assignment of what rights, under what conditions, etc.; and to what token(s), where the assigned tokens may be represented by identities unique to these tokens (e.g., public keys).

While specific implementations of moving rights between tokens have been described above with respect to FIG. 23, one skilled in the art will recognize that numerous configurations of rights transfers may be implemented as appropriate to the requirements of a given application.

In some embodiments, promise tokens can be used for the automatic enforcement of programming rules (e.g., for resource transfers). For example, a user wishes to implement a promise stating "If you reshare this content with at least ten people who have not yet seen it, I will pay $0.01 to charity." This promise may be associated with content such as a promotional video. Additional requirements may be that the content is watched by at least ten people, and that this fact is verified using an attention-verification function.

When an associated policy is triggered (e.g., when a user has performed a qualifying action), promise tokens can automatically enforce programming rules associated with the token. Enforcement in accordance with a number of embodiments of the invention can include (but is not limited to) performing a payment transaction and/or generating a publicly reviewable log event indicating the fulfillment of the action by the user. Promise tokens in accordance with numerous embodiments of the invention describe a promised action that will take place based on the completion of a requested action. In numerous embodiments, promise tokens may be associated with other tokens (e.g., another token carrying content to be forwarded). Alternatively, or conjunctively, promises may be incorporated in the tokens they relate to.

Promise tokens in accordance with many embodiments of the invention are a form of a contract token, as it specifies a condition and an action that is taken provided the condition is satisfied. Contract tokens may specify one or more desired states, or events, where these can be related to resources to which access is desired; as well as one or more events that will take place if the desired state is obtained through a match with other data, which may be embodied by another contract token or by free-standing data.

When a promise relates to a collection of tokens, such as one video token and one audio token selected from a collection of available audio tokens that may correspond to different language preferences, then the promise element in accordance with a number of embodiments of the invention may be incorporated in a token including metadata related to the rendering of these two or more tokens, or be linked from such as a metadata token. Meta-tokens may refer to multiple related tokens to be combined according to rules or policies associated with or included in the meta-token.

Promise tokens may include a promise expressed in a machine-readable form, (e.g., in the form of a policy or an executable script) and/or in a human-accessible form (e.g., as a text or voice-based statement) of the same. In a number of embodiments, the machine-readable and human-readable elements can be generated from each other, or one from the other. In a number of embodiments, machine-readable and human-readable elements cannot be generated from each other, but once they are generated, one can be verified based on the other.

In numerous embodiments, correspondence between the machine-readable and human-readable elements may not be automatically validated against each other. In such cases, bounty hunters in accordance with many embodiments of the invention can be utilized to identify deceptive, incorrect or otherwise flawed correspondences, and report such tokens. In numerous embodiments, bounty hunters may use proprietary automated methods to determine potential discrepancies, or may involve a human admin verifying a relationship, or a combination of these two approaches. Smart contracts including both machine-readable statements and human-accessible statements are useful in a variety of settings, not limited to the implementation of promise tokens.

Moreover, promise tokens are not limited to actions taken by individual users or tokens, but may also relate to general conditions, and may be used as a marketplace. In another non-limiting example, a user can implement horse betting by generating a first promise token that offers a payment of $10 if horse X does not win, under the condition that the first promise token is matched with a second promise token that causes a transfer of funds to a public key specified with the first promise token if horse X wins, and where the amount is at least $15.

Promise tokens may be associated with a token that causes the execution of a policy or rule indicated by the promise token. Coming back to the example in which a user associates a promise of paying a charity with the sharing of a token, the associated promise token may identify a situation that satisfies the rule associated with the promise token, thereby causing the transfer of funds (such as $0.01) when the condition is satisfied (as described above). In a variety of embodiments, a conditional payment token can be embedded in or associated with the promise token. In various embodiments, contract tokens can cause the transfer of funds by performing a match, where the match is between a promise token and an input that identifies that the conditions are satisfied. The input can take the form of another token with observations, referred to as a matching token or an observation token. In a variety of embodiments, matching tokens may also be of another form, and may correspond to another token as described herein and/or to input data that is not embodied in a token.

Returning to the example in which a charity is paid if a token, corresponding to some content, is shared, the observation token may include evidence that the content token was forwarded to at least ten other users, and that at least ten of these users had not previously viewed the content. Furthermore, if a policy is added that the corresponding users must watch the content and pay attention, the observation token may be in the form of links to ten or more attention tokens, where an attention token includes an assertion that a user paid attention to associated content when such content was rendered. In a variety of embodiments, the determination of attention may be performed on a device where the content was rendered. In a number of embodiments, the determination of attention may be derived from data from an on-board camera associated with the rendering device, where images from that camera can be used to determine that a user was watching the screen at the time the content was rendered. In a number of embodiments, attention can be determined by monitoring a browser window or application display to verify that it was the primary application in use during the media display period.

Different methods of attention determination may provide different levels of certainty. For example, a user acknowledging information on the screen or making a selection by radio buttons, voice input, etc., is a very high degree of certainty, such as 90 points out of 100 on an attention scale. The device determining that the user's pupils are aimed in a manner consistent with the screen portion on which the acknowledgement is presented, and an acknowledgement signal is received, may correspond to a score of 100. The device determining, using user-facing camera input, that a face is in the range of the camera, and aimed in the general direction of the screen and the camera, may correspond to a score of 75. The device determining that there likely is a user present, e.g., by motion detected by a mobile device, may correspond to a score of 40.

There are many indicators of attention, and these can be combined to increase the score in accordance with a variety of embodiments of the invention. Some may be intrusive in that they require an explicit user action in response to a stimulus, such as a request for an acknowledgment; others are less intrusive and may detect an implicit user action. There is a tradeoff between a high certainty and a good user experience. In some embodiments, a series of different attention determinations with different requirements on the score are made, with the goal of maximizing the user experience (UX) while also maximizing the certainty that a user is paying attention. Determining attention is a better way of avoiding bots to take actions on behalf of users than, for example, to use a traditional CAPTCHA; especially when this determination is frequent. The use of derived tokens in this context protects user privacy, as camera footage used to determine attention will not leave the enclosure where the attention token is generated.

In certain embodiments, liveness tokens can be used to determine whether a user is alive. In certain embodiments, liveness can be determined based on a biometric signal used for the generation of a token asserting an identity is generated from the proper input, i.e., a live user, as opposed to from a photo or movie of the user. Unlike an attention token, liveness tokens may not require that the user's attention is focused on the device, or on some text, etc. Therefore, a liveness token is typically a type of token with lower demands in terms of its generation, in comparison with an attention token.

Script tokens (or composite content tokens) in accordance with several embodiments of the invention may include various elements related to a script or composite content presentation, such as (but not limited to) text, story line, scene details, image elements, avatar models, sound profiles (e.g., voice data for avatars), rules and policies that describe how script elements are combined (e.g., whether serially or to create composite content representations), and/or rightsholder information such as copyright information.

Script tokens in accordance with various embodiments of the invention may also include executable elements. Executable elements can include instructions for various action, such as (but not limited to) how to process inputs; how to configure other elements associated with the script token; and/or how to process information from other tokens used in combination with the script token. One use of the script token is to generate presentations of information to a user, whether on a traditional computer, a mobile computer, or a virtual reality display device, as disclosed in co-pending application "Augmented Reality for Virtual Environments", by Jakobsson and Gerber, the disclosure of which is incorporated by reference herein in its entirety.

In a variety of embodiments, script tokens may be used to provide the content for an avatar in a game, an avatar used as a digital assistant, or an instructor in a virtual reality language class. Script tokens may include audio-visual information describing how input text is presented, along with the input text that provides the material to be presented. It may also include what may be thought of as the personality of the avatar, including how the avatar may react to various types of input from an associated user.

Figure 24:
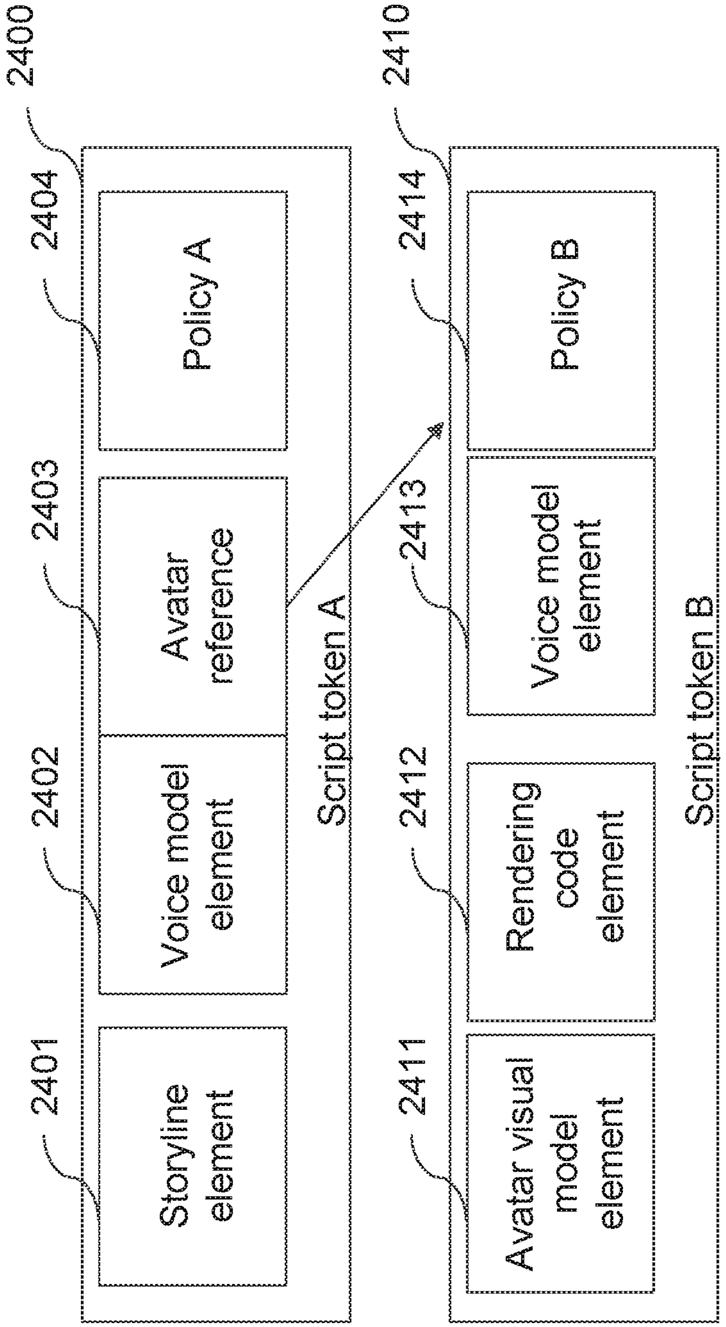
FIG. 24 illustrates an example of script tokens in accordance with an embodiment of the invention.

An example of script tokens in accordance with an embodiment of the invention is illustrated in FIG. 24. Script token A 2400 includes storyline element 2401, voice model element 2402, avatar reference 2403 and policy A 2404. Additional elements, such as origination data (not shown) may be part of the token. Origination data in accordance with a number of embodiments of the invention may indicate the identities or pseudonyms of the originators of tokens or elements thereof. Avatar reference 2403 is a pointer to script token B 2410, which includes avatar visual model element 2411, rendering code element 2412, voice model element 2413 and policy B 2414. Voice model element 2402 has priority over voice model element 2413 in the context of rendering script token A 2400, which causes the rendering using non-conflicting aspects of script token B 2410.

Policy A 2404 may specify the compatibility with other tokens, i.e., the rules for how other tokens can be derived from or reference to script token A 2400. It may also specify policies for how script token A 2400 may be rendered, e.g., minimum requirements on the execution environments used for processing of script token A 2400. Similarly, Policy B 2414 specifies the policies for processing of and rendering of script token B 2410. Policy B 2414 may specify that script token B 2410 may only be rendered in some specified jurisdictions (a whitelist) or that it may not be rendered in some specified jurisdictions (a blocklist); if script token A 2400 is attempted to be rendered in an environment, such as a computational environment or jurisdiction that is allowed under policy A 2404 but not policy B 2414 then script token A will either not be rendered in this context or will be rendered without using script token B 2410. In several embodiments, fallback tokens, to be used instead of script token B 2410 in such situations, may be specified in avatar reference 2403 or other elements (not shown) of script token A 2400.

Figure 25:
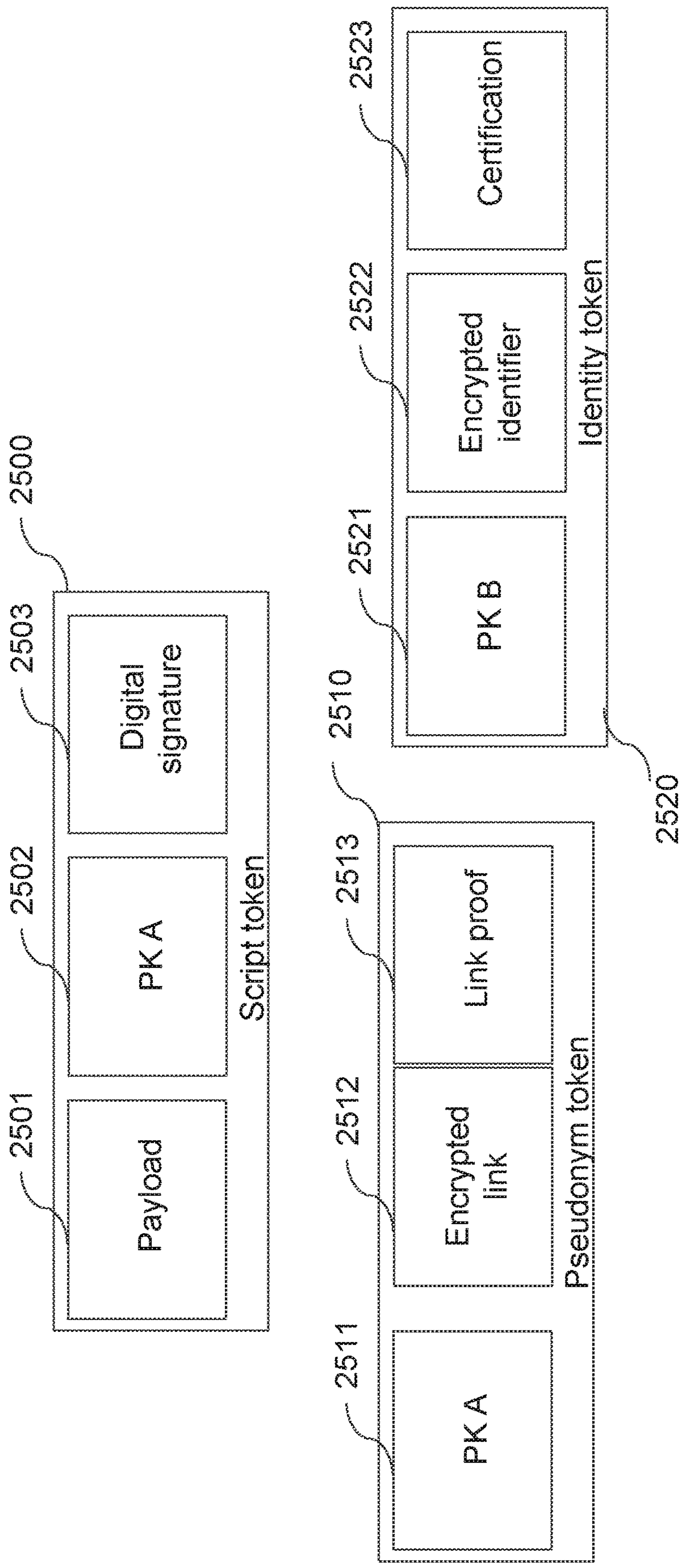
FIG. 25 illustrates an example of a script token and related tokens in accordance with an embodiment of the invention.

An example of a script token and related tokens in accordance with an embodiment of the invention is illustrated in FIG. 25. Script token 2500 includes payload 2501, which may include various elements similar to those described in the example above. Script token 2500 includes a public key PK A 2502, which corresponds to a private key SK A (not shown). This is a reference to pseudonym token 2510, which includes public key PK A 2511 that is the same as or related to public key PK A 2502. Digital signature 2503 is a digital signature on at least portions of script token 2500, such as on payload 2501, and is verified using public key PK A 2502. To verify the origin assertion of script token 2500, digital signature 2503 is verified.

However, since a cheater may claim that payload 2501 originated with him, and can generate an alternative public key (not shown) and an associated digital signature (also not shown), the originator also posts script token 2500 to the ledger in order to timestamp it. Since the cheater cannot generate an earlier timestamp, a verifier can determine what entity truly originated script token 2500. In this case, the verifier will determine that script token 2500 was originated by a party corresponding to pseudonym token 2510, since that contains matching public key PK A 2510.

The originator of script token A is the entity corresponding to identity token 2520, which includes a public key PK B 2521 that is distinct from public key PK A 2510 and which cannot be correlated with each other. Identity token 2520 also includes an encrypted identifier 2522, from which the plaintext identifier can be determined by a trusted party. The trusted identifier may be the name, address, phone number and email address of a user or an enterprise. Certification 2523 is a digital signature by a certificated authority, on public key PK B 2521 and encrypted identifier 2522, where the certification indicates that the plaintext version of encrypted identifier 2522 has been verified and is valid.

Pseudonym token 2510 contains encrypted link 2512 that is a ciphertext of an indicator of identity token 2520. It may, for example, be an encryption, using the public key of a trusted party, of public key PK B 2521. Without being able to decrypt encrypted link 2512, it is not possible to determine the relationship between pseudonym token 2510 and identity token 2520. Optional link proof 2513 may be a certificate, issued by the party that derived pseudonym token 2510 from identity token 2520, asserting that this party has correctly generated encrypted link 2512 based on the indicator of identity token 2520. It may also be a proof of knowledge that there exists an indicator of identity token 2520 which, when encrypted, becomes encrypted link 2512. Similar expressions of relationships are used for other related tokens, as will be understood by a skilled artisan.

While specific implementations of script tokens have been described above with respect to FIGS. 24-25, one skilled in the art will recognize that numerous configurations of script and other composite tokens may be implemented as appropriate to the requirements of a given application.

In some embodiments, script tokens may be linked to a configuration token. In numerous embodiments, configuration tokens may indicate a user's preferences, the user's purchase history, the user's demographic profile, and more. Configuration tokens in accordance with a variety of embodiments of the invention can include a model that has been trained on a human user. Configuration tokens can be generated based on observations of a user made by one or more applications.

In various embodiments, a single user may correspond to multiple configuration tokens, where different configuration tokens may correspond to different pseudonymous tokens. As one pseudonymous token is replaced with a new one, e.g., to improve privacy by reducing linkability, data from one configuration token associated with the old pseudonymous token may be copied or used to bootstrap a new configuration token associated with the new pseudonymous token.

Configuration tokens in accordance with numerous embodiments of the invention may be at least in part encrypted, and the ciphertext may use homomorphic encryption methods, allowing for one ciphertext to be generated from another one by using re-encryption methods, thereby hiding the relationship between the two ciphertexts while maintaining the content. A hybrid encryption can be used and re-encrypted, as disclosed in the 2001 publication titled "An optimally robust hybrid mix network", by Jakobsson and Juels, the disclosure of which is incorporated herein by reference in its entirety. A configuration token may include one or many ciphertexts, and such ciphertexts may be related to the same or different public keys used for encryption, and accordingly, different private keys used for decryption. This enables different portions of a configuration token to be accessible by different parties that may satisfy different trust requirements from each other.

In some embodiments, configuration tokens may include a machine learning (ML) model trained on a given user, or on a collection of related users, where the relationship may be a similar level of proficiency in a given topic. The ML model may also identify personal likes or dislikes. In a variety of embodiments, configuration models may include an indication of a language model a given user is associated with, i.e., what words the user prefers or uses. It may also include indications of preferred behaviors for an avatar, or of the system in general. Configuration data may be inferred from user actions and events, or may be explicitly stated by a user or a party associated with him or her.

Employee tokens are another example of tokens in accordance with some embodiments of the invention. Similar to a key card photo identification, an employee token may take numerous forms. Employee token in accordance with several embodiments of the invention may contain or reference company information, employee identity information, an individual's identity token, and/or access token information. Access token information may indicate what portions of a building and/or computer system the employee is allowed to access. In numerous embodiments, employee tokens might include the individual's biometrics, such as a face image or fingerprint data. Employee tokens in accordance with certain embodiments of the invention may be in the form of a contract token. Employee tokens may include policies or rules of the organization or enterprise. In numerous embodiments, employee tokens may be a meta-token that references a collection of other tokens, and which also includes data related to policies describing any conditionality or relationship between the tokens, and any rules not already captured in referenced tokens, such as access tokens.

Figure 26:
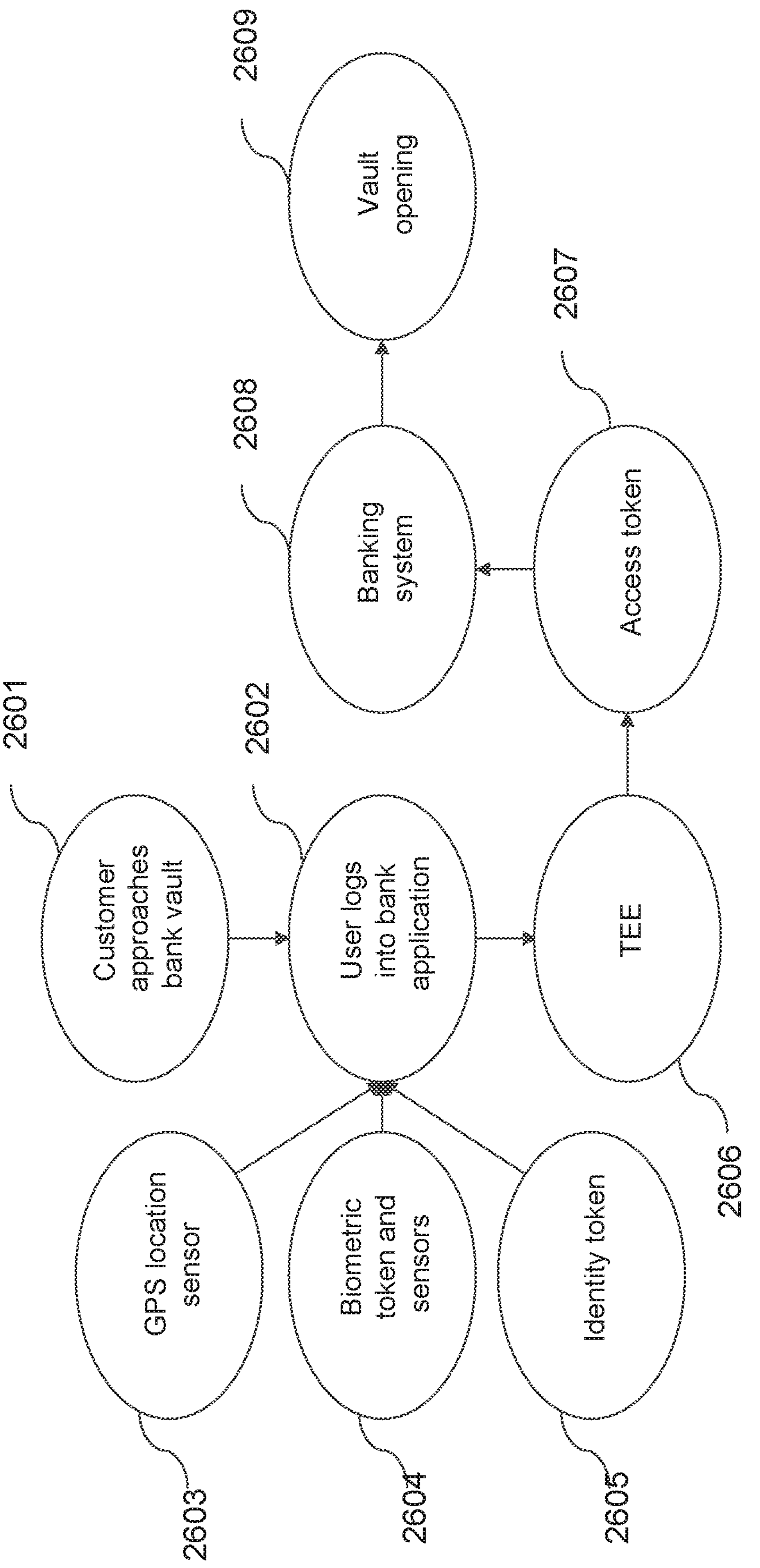
FIG. 26 illustrates an example usage of an access token for entering a physical safety deposit box bank vault in accordance with an embodiment of the invention.

An example usage of an access token for entering a physical safety deposit box bank vault is illustrated in FIG. 26. A customer approaches a bank vault 2601 and the user logs into their bank application 2602 with the intent of accessing their safety deposit box through the bank's application. The bank application 2602 will have a minimum security level requirement for log-in whether one or more of, a password, pin code, biometric, security questions, and two factor authentication, for example.

The application might utilize a GPS location sensor 2603 to validate the location of the device running the application is nearby the vault and likely in view of the security camera system. The same application might utilize a biometric token and sensors 2604 to validate the person using the application is the proper bank customer along with the bank customer's identity token 2605. The biometric token and sensors 2604 may include a liveness detection capability and liveness token.

The biometric and liveness details, location, and identity information might be presented to a TEE 2606 trusted execution environment for secure processing of the provided information prior to communicating the results in the form of an access token 2607 or, an authentication assertion token as described above, to the banking system 2608 and the vault opening 2609.

As an additional example, Bob's employer utilizes a secure physical vault for precious metals that are used in their manufacturing line. The vault is protected with an access system that includes a keycard reader and a fingerprint scanner. When Bob accesses the vault, he first swipes his company keycard which contains his identity token. The vault system confirms with hardware, that is preferred to be a trusted execution environment, that Bob's identity token matches an entry in its authorized user database and requests Bob scan his fingerprint to ensure that it is actually Bob in possession of the keycard. The fingerprint sensor includes protections for liveness detection such that the person entering has not taken Bob's keycard and finger for illicit entry.

Once the access system has confirmed Bob's identity and presence in the approved user access database, and the access system has confirmed Bob's fingerprint candidate scan versus Bob's fingerprint template from a biometric token, which may be available from the keycard electronic storage or within the access system's database, for example, and the system has determined the proper level of liveness during the fingerprint acquisition, the system provides Bob with access to the vault. The biometric token in this example, might also include additional security data, such as password data and pin codes and, or, data related to knowledge questions, for use as alternative authentication methods. The token may report on what method was used, or the quality of the authentication, etc.

Figure 27:
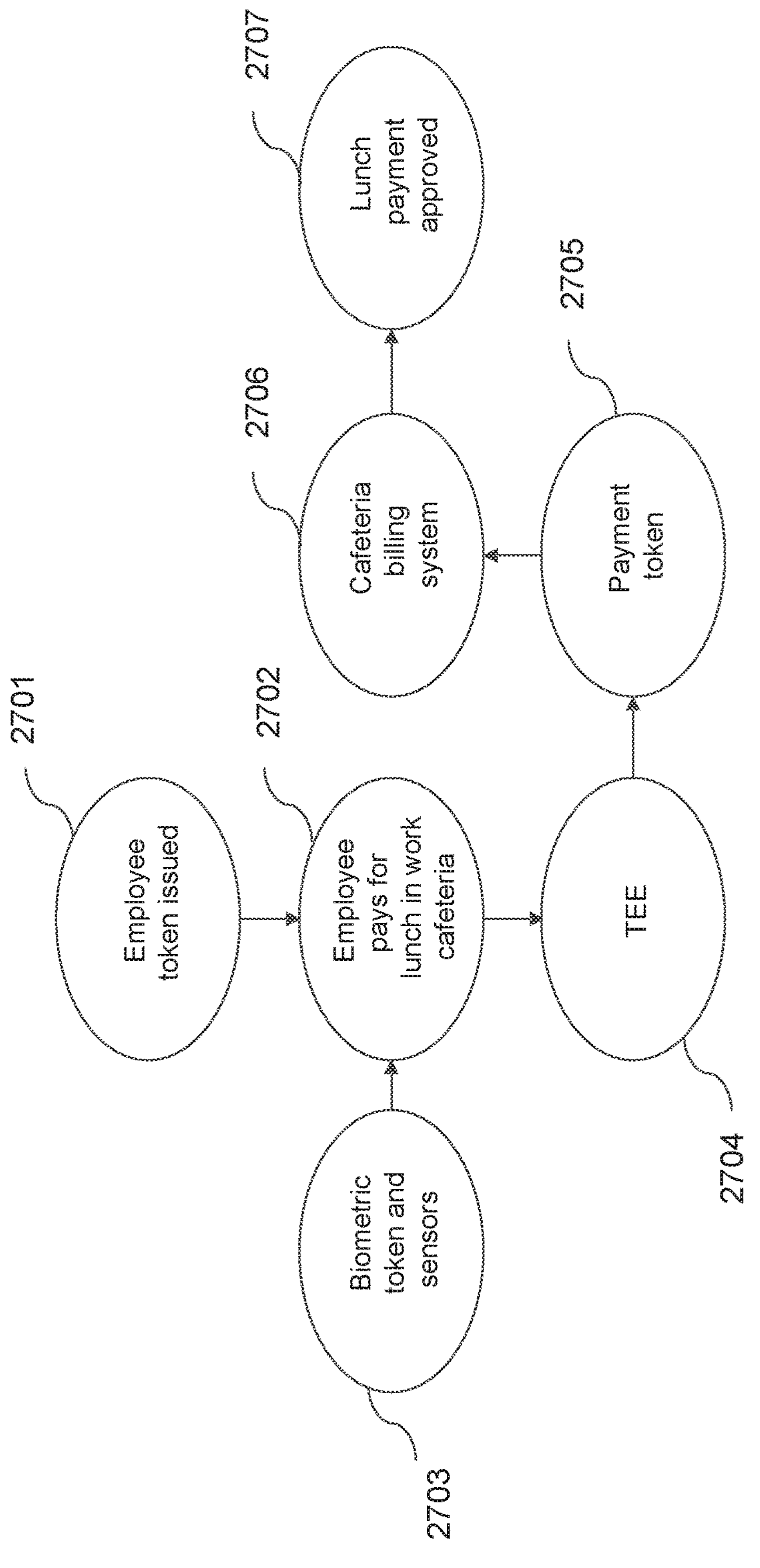
FIG. 27 illustrates an example of an employee purchasing lunch at a workplace cafeteria using their employee token and a payment token in accordance with an embodiment of the invention.

An example of an employee purchasing lunch at a workplace cafeteria using their employee token and a payment token is illustrated in FIG. 27. The employee token is issued 2701 by the employer, typically on the employee's first day of work. Embedded in the employee token might be numerous additional tokens, or references to tokens such as identity tokens and payment tokens. In this example, the employee pays for lunch in a work cafeteria 2702 with the assistance of their mobile device or a point-of-sale payment processing system, either of which might confirm the employee token issued 2701 matches the biometric token with the use of biometric token sensor 2703 devices with a secure TEE 2704 that issues a payment token 2705 to the cafeteria billing system 2706 so that the lunch payment is approved 2707.

As an example, Carol works as the CEO's executive assistant at a large manufacturing conglomerate and enjoys a free hot lunch everyday at her office because of her status in the company. Many years after she was hired, the company implemented a new identity system that incorporates their employee keycard system and their cafeteria accounting system. During the implementation of the new identity system, Carol was issued a new keycard with an embedded identity token 2701. The identity token includes her name, current position in the company, and her employee number. The keycard also includes her biometric token and sensors 2703. The keycard consists of a computation device or trusted execution environment 2704, memory, electrodes configured to measure her fingerprint, and electrodes to gain power and communicate with a point of sale system. The keycard might also feature an NFC system whereby the devices are powered via a near-field system.

When Carol goes to the cafeteria each day, she chooses her lunch items and inserts her employee keycard into a point of sale terminal with her thumb placed over the fingerprint sensor. The keycard gains its power source from the point of sale terminal and communicates securely with the point of sale terminal and accounting system. The point of sale system, tasked with gaining credentials from the keycard in order to approve the lunch purchase, makes an inquiry to the keycard for a biometrically-secured employee number. The keycard, having been asked to provide both the employee number stored on the card and a verification that the thumb presently on the electrodes matches the biometric template stored in the keycard's memory, uses its TEE 2704 to match the fingerprint and access the employee number for transmission to the point of sale terminal. The point of sale system communicates the lunch order information and employee number to the cafeteria billing system 2706 whereupon the cafeteria billing system 2706 responds to the point of sale terminal with a transaction approval lunch payment approved 2707. Cafeteria billing system 2706 is pre-programmed to charge Carol's meal purchases to the company rather than to her payroll deduction account, which is what most employees would be accustomed to. One skilled in the art will recognize that various portions, if not the entire computation and biometric sensor system may be implemented within the employee's keycard, personal mobile device, or even within the point of sale terminal.

Promotional tokens can be used to provide a promotional event. Traditional online give-aways suffer from several problems such as bots impersonation, no verification that the promoter actually provided a winner with the goods, and no verification that the winner was randomly selected. In a number of embodiments, a promotional giveaway operates as a decentralized application and is protected from bots with entrants restricted to those using an identity token that is intended to associate with a real individual and not a bot. Promotional contracts in accordance with a number of embodiments of the invention can be used with a smart contract to provide a verifiable release of the goods, such as 1.0 bitcoin, or a gift card token that is useful to purchase either the specified goods, or goods of the winners choosing. In some embodiments, a smart contract can be constructed in a manner that randomly selects the winner based upon best practice random number generation. All of these aspects may also be auditable by bounty hunters, as described in U.S. patent application Ser. No. 17/806,728, entitled "Systems and Methods for Encrypting and Controlling Access to Encrypted Data Based Upon Immutable Ledgers", filed Jun. 13, 2022, the disclosure of which is incorporated by reference herein in its entirety.

Figure 28:
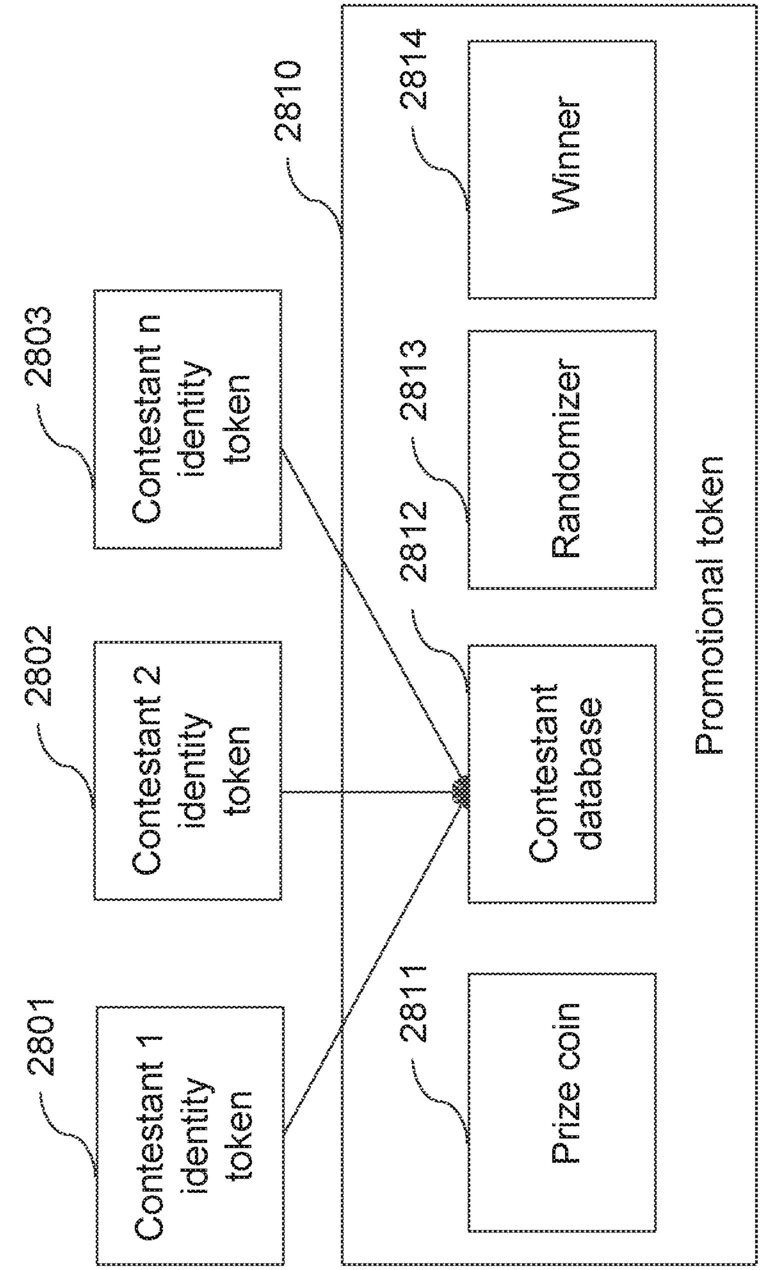
FIG. 28 illustrates an example promotional giveaway process utilizing identity tokens, a randomized winner selection, and a guaranteed payout prize based upon a smart contract or decentralized application.

An example of a promotional giveaway process utilizing identity tokens, a randomized winner selection, and a guaranteed payout prize based upon a smart contract or decentralized application in accordance with an embodiment of the invention is illustrated in FIG. 28. A promotion token 2810 is initiated by the promoter containing a prize coin 2811, contestant database 2812, randomizer 2813, and an output token winner 2814. Contestants enter the contest by providing their identity or pseudonymous token, contestant 1 identity token 2801, contestant 2 identity token 2802, to user n, contestant n identity token 2803 where n represents the upper range of contestants. The promotional system, represented by promotion token 2810 is designed to capture all valid contestant identity tokens or a pseudonymous token and is designed to filter out non-human entries such as those submission attempts made by bots. The identity tokens are recorded in a contestant database 2812. The contestant database 2812 can be implemented in a public ledger in the same manner as the promotional token 2810. In numerous embodiments, the database may be maintained in a networked cloud storage environment. The promotional token 2810 records valid contestant entries until the time limit specified in the promotion token 2810. At which time, in some embodiments, a randomizer within the smart contract selects one or more winners, as appropriate, from the contestant database and announce the winner 2814 with an entry in the public ledger system.

In a number of embodiments, the entire promotional give-away may be constructed within a public ledger using smart contracts. A promotional system such as that illustrated in FIG. 28 is designed to solve several problems. For example, Charlie is an avid participant in give-aways. In particular, Charlie likes to participate in travel promotions, but he never seems to win. All Charlie ever gets for his effort is an endless stream of email spam. Charlie has come to believe most of the contests are not real, no prize is ever awarded, or the promoter cherry-picks the winner based on some non-random element such as whether the contestant is young, skilled, attractive, wealthy, or known to the promoter, for example. Charlie identifies a travel contest for a trip to Key West that he would really like to win. He provides his contestant 1 identity token 2801, or an equivalent pseudonymous token to protect his identity, via a web browser interface or specialized application that communicates with the promotion token 2810 and its contestant database 2812. But, Charlie doesn't win and he's concerned that this was another rigged contest.

Charlie, with the help of his browser or specialized application is able to query the public record ledger to determine, for instance, the exact number of contestant entries, the time and date of the randomizer 2813 selection and the details of the winner 2814 token. He might also be able to query the system to be assured that bot entries were disallowed. Charlie might even be able to send a blind message to the winner 2814 in the hopes that the contestant might respond to Charlie's questions about whether they actually won the trip. Privacy enabling tokens, such as those described above, may include elements that enable pseudonymous communication, such as an alias email address that is forwarded via one or more intermediaries, such as a Tor encrypted email, a service provided, among others by PROTONMAIL. Other example embodiments include "Untraceable Electronic Mail, Return Addresses, and Digital Pseudonyms" by David Chaum, and "Onion Routing for Anonymous and Private Internet Connections," by D. Goldschlag, M. Reed, P. Syverson, both of which are incorporated by reference herein in their entirety. The winner 2814 need not reply given the rules of the contest and their own privacy wishes. However, Charlie feels a lot better about the integrity of the giveaway given the promotion token 2810 constraints on the contest, its transparency to his queries, and his ability to witness the transactions surrounding the prize coin 2811.

Alternatively, the suspicious user may be able to audit the random selection, i.e., determine that the selection was made in a manner that depends in a pseudo-random manner on a committed set of inputs and a pre-specified public string such as the trading price of copper futures and the Dow Jones at the time of the ending of the time period of the contest. This way, he can verify that the correct contestant was selected, and that all contestant entries were considered.

Additionally, the entire promotional token 2810 approach to contests may be audited by bounty hunters, who may verify the randomness and the selections. Any irregularities in the contest may be revealed by bounty hunters as described in U.S. patent application Ser. No. 17/806,728, entitled "Systems and Methods for Encrypting and Controlling Access to Encrypted Data Based Upon Immutable Ledgers", filed Jun. 13, 2022, the disclosure of which is incorporated by reference herein in its entirety.

In some embodiments, a contest might include a transaction fee to any bounty hunter that delivers evidence of nefarious contest activity on the part of the promoter within a specified period of time to provide assurances to the contestants that the promotion is legitimate. In another example, the give-away illustrated above, in FIG. 28, can be implemented as a raffle, whereby the contestants provide their identity and a form of payment, such as a payment token, when signing up for the contest.

In many embodiments, script tokens (or composite content tokens) used to govern the behavior and content of a system can be created by enterprises, such as software companies and movie studios, with digital signatures asserting the provenance of the scripts. Script tokens may also, whether in full or in part, be generated by freelancers. For example, a text script related to a movie, an interactive experience, a tutorial, or other material, may be created by an individual content creator, and then combined with a voice model or avatar model created by an established content producer, and then combined with a background created by yet another party.

Various content producers can generate parts of the content, or all the content, associated with a script token, and can compete to improve various aspects. For example, one small software company can produce an improved script for rendering of movement, shadows or faces, and combine this improved script with other script component to create an alternative representation of a previously published script token, where the resulting new script token may have advantages, such as better rendering, less computationally demanding rendering, rendering that is more suitable to low-cost display devices, rendering that incorporates a previously not used sensor in the final evaluation of the resulting script token, and more.

In certain embodiments, features of other tokens can be incorporated in a new token using techniques related to inheritance tokens and/or by making references to the other tokens. References in accordance with a variety of embodiments of the invention can be used to automatically generate log entries, and may result in revenue events, such as for the use of somebody else's model or storyline script.

Since the script tokens include of multiple elements, it is possible for a content producer with special skills related to one particular element to generate an element of this kind and present it using other elements, in the form of a script token that can be executed and rendered. This helps democratize not only the writing of storylines for content, but also enables outsourcing for visual models, art work, and other creative aspects associated with the content production. For each such element, an identifier establishing the origin or provenance of the element can be included. In several embodiments, policy elements can be incorporated that identify the conditions under which a given script element may be used, such as (but not limited to) conditions related to execution environment, trust, licenses, logging, financial terms for use, and other requirements, such as what other types of elements the given element are compatible with, is allowed to be combined with according the terms of service, and more. Skilled artisans will recognize that the same techniques can be applied in computation contexts that are variants of the contexts disclosed herein.

In certain embodiments, metadata tokens can be used to combine one or more compatible script tokens. Such compositions can be iterated, resulting in a hierarchy of associated tokens. Compositions may still be considered a form of content token, and can be consumed or rendered by compatible applications, which may be represented as tokens as well. Accordingly, a graph structure may be generated, expressing content as well as rules, needs, contracts and payments.

Evaluation units in accordance with certain embodiments of the invention may be used with various NFT classifications to collect information on their use. Evaluation units can take a graph representing all existing tokens or a subset of these and make inferences from the observed graph component. From this, valuable insights can be gained. For example, the evaluation unit can identify tokens whose popularity is increasing or waning, where popularity can be expressed as the number of derivations of the token that are made; the number of renderings, executions or other uses are made; and the total revenue that is generated to one or more parties based on renderings, executions or other uses.

In many embodiments, evaluations can be done with respect to a specific window of time, a specific collection of end-users associated with the consumption of data in the tokens, or a combination of these. Evaluations can be done in a manner that ranks tokens among tokens of the same type (such as all script tokens, or all identity tokens of a given originator or cluster of originators of content). This may enable the system to identify tokens that are likely to be of interest to various users, thereby implementing a recommendation mechanism that is useful for individual content consumers as well as content originators, as described in U.S. patent application Ser. No. 17/806,728, entitled "Systems and Methods for Encrypting and Controlling Access to Encrypted Data Based Upon Immutable Ledgers", filed Jun. 13, 2022, the disclosure of which is incorporated by reference herein in its entirety.

Evaluations in accordance with a number of embodiments of the invention may enable originators of script elements to identify potential combination opportunities, by also allowing ranking based on compatibility. This may be a useful feature to content creators, especially when used in combination with rankings based on select demographics identified by the content creators as being valuable target groups. Accordingly, content creators such as artists, musicians and programmers can identify how to make their content more desirable to intended target groups, e.g., by combination of their material with other script elements or elements of thereof. Similarly, it enables advertisers to identify, by target group, what features are most likely to be appealing. For example, they may identify that their intended target group prefers one type of avatar over another one. This type of insight may be automatically generated by the system, as opposed to requiring slow, error-prone and costly surveys and pilot studies, and is therefore a very valuable aspect of the system, as it enables a rapid identification of preferences, trends and script elements.

Evaluations may also help identify origins of tokens, such as script tokens, as well as components of such; accordingly, an artist with great story telling skills may rapidly be discovered by the system, using these automated tools, and the prowess of the artist may become publicly observable to any entity with access to search results and rankings of this type. This may not only be a benefit for the parties looking for great talent, but also to the talent, whose success leads to discovery.

In a number of embodiments, the generation of rankings, whether in response to search queries received by the system or as part of periodic reports generated by the system, can be supported by machine learning (ML) methods, artificial intelligence (AI) methods, statistical methods, as well as combinations of these. Anomaly detection methods developed to identify fraud can be repurposed to identify outliers, whether to flag abuse risks or to improve the ranking effort. Systems in accordance with numerous embodiments of the invention can use rule-based approaches to identify tokens of importance, whether the importance is ascribed to the origination of the tokens, the use of the tokens, the velocity of content creation of identified clusters or classes, the actions taken by consumers of token, including reuse of a token, the lack of reuse of a token, the increased or decreased use of a token in a selected social network, and more.

In many embodiments, multiple competing evaluation units can make competing predictions using alternative and proprietary algorithms, selling their results to parties making requests or providing information to subscribers. Thus, there may be different evaluation units created to identify different types of events to different types of subscribers, monetizing their insights related to the data they access. This is a great step forward in comparison to today's proprietary mining of insights for purposes of targeted advertising, wherein the data is owned by giant organizations. Given the absence of competition, relative to one source of data, today's marketplace has a lack of transparency and is therefore prone to abuse.

In various embodiments, evaluation units are a form of tokens (evaluation tokens) that derive insights from massive amounts of input data, the input data corresponding to the graph component being analyzed. To avoid undesired disclosure of sensitive data, only evaluation unit tokens that are certified to allow access to specific types of information may be able to use the data of associated protected tokens or components thereof.

The minting of NFTs may associate rights with first owners and/or with an optional one or more policies and protection modes. An example policy and/or protection mode directed to financial information may express royalty requirements. An example policy and/or protection mode directed to non-financial requirements may express restrictions on access and/or reproduction. An example policy directed to data collection may express listings of user information that may be collected and disseminated to other participants of the NFT platform.

Figure 16A:
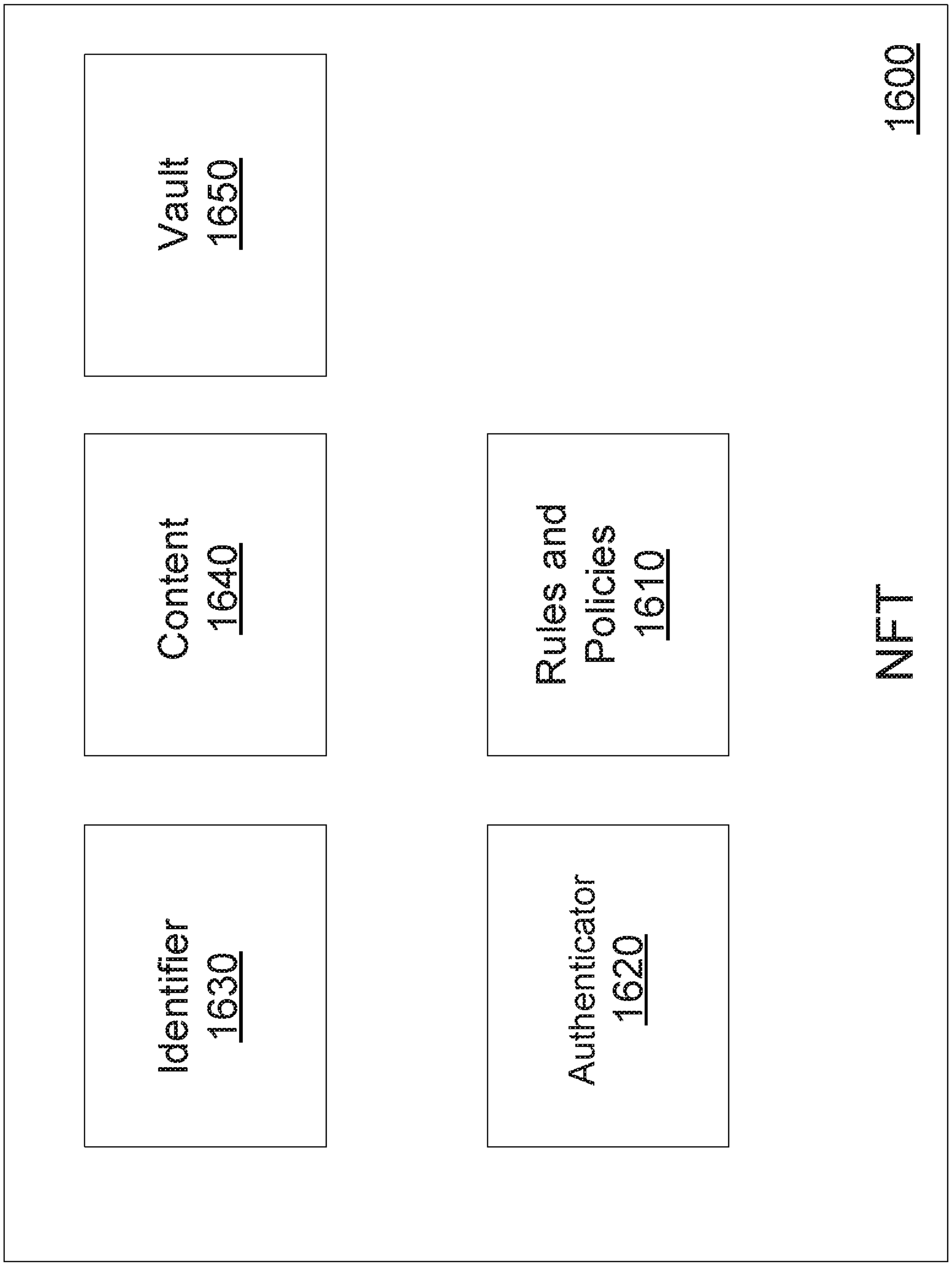
FIGS. 16A-16B illustrate an NFT arrangement relationship with corresponding physical content in accordance with an embodiment of the invention.
Figure 16B:
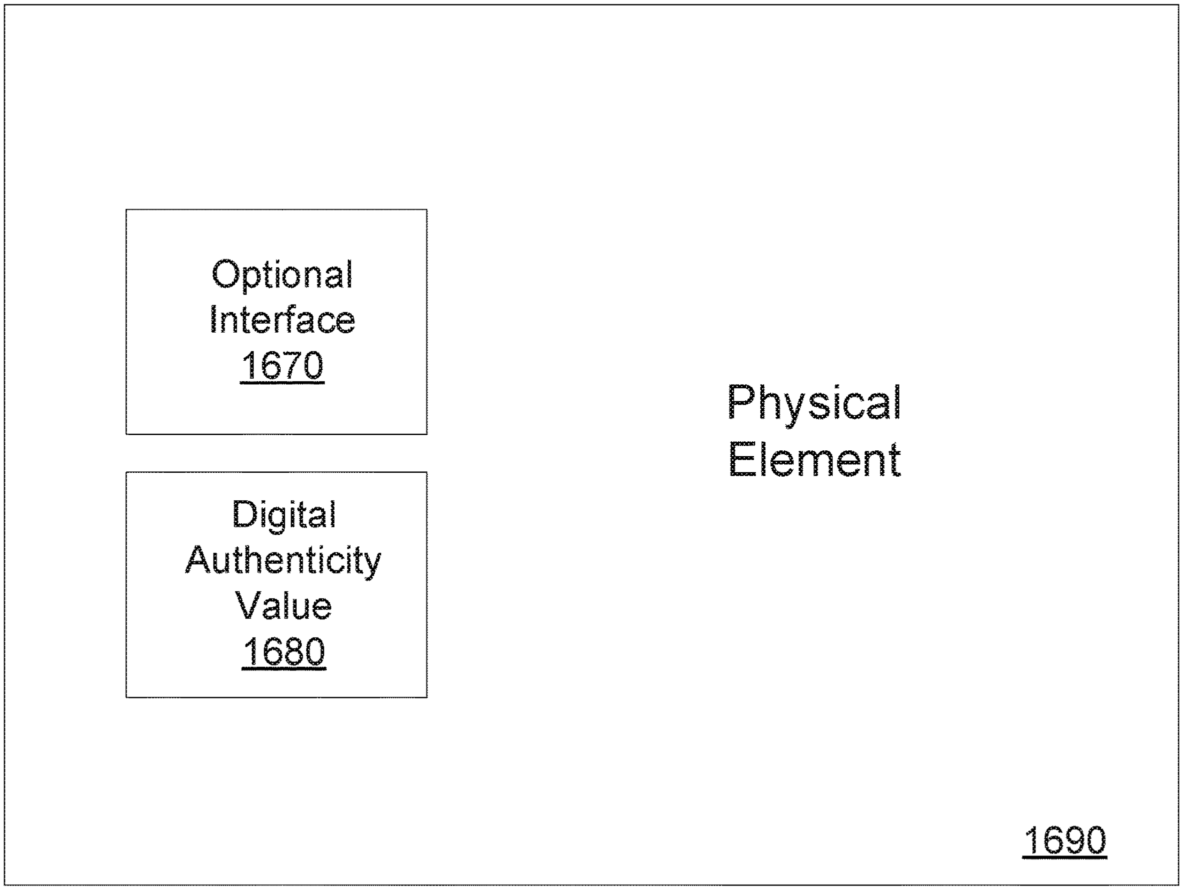

An example NFT which may be associated with specific content in accordance with several embodiments of the invention is illustrated in FIG. 16A. In some embodiments, an NFT 1600 may utilize a vault 1650, which may control access to external data storage areas. Methods of controlling access may include, but are not limited to, user credential information 1350. In accordance with a number of embodiments of the invention, control access may be managed through encrypting content 1640. As such, NFTs 1600 can incorporate content 1640, which may be encrypted, not encrypted, yet otherwise accessible, or encrypted in part. In accordance with some embodiments, an NFT 1600 may be associated with one or more content 1640 elements, which may be contained in or referenced by the NFT. A content 1640 element may include, but is not limited to, an image, an audio file, a script, a biometric user identifier, and/or data derived from an alternative source. An example alternative source may be a hash of biometric information). An NFT 1600 may also include an authenticator 1620 capable of affirming that specific NFTs are valid.

In accordance with many embodiments of the invention, NFTs may include a number of rules and policies 1610. Rules and policies 1610 may include, but are not limited to access rights information 1340. In some embodiments, rules and policies 1610 may also state terms of usage, royalty requirements, and/or transfer restrictions. An NFT 1600 may also include an identifier 1630 to affirm ownership status. In accordance with many embodiments of the invention, ownership status may be expressed by linking the identifier 1630 to an address associated with a blockchain entry.

In accordance with a number of embodiments of the invention, NFTs may represent static creative content. NFTs may also be representative of dynamic creative content, which changes over time. In accordance with many examples of the invention, the content associated with an NFT may be a digital content element.

One example of a digital content element in accordance with some embodiments may be a set of five images of a mouse. In this example, the first image may be an image of the mouse being alive. The second may be an image of the mouse eating poison. The third may be an image of the mouse not feeling well. The fourth image may be of the mouse, dead. The fifth image may be of a decaying mouse.

The user credential information 1350 of an NFT may associate each image to an identity, such as of the artist. In accordance with a number of embodiments of the invention, NFT digital content can correspond to transitions from one representation (e.g., an image of the mouse, being alive) to another representation (e.g., of the mouse eating poison). In this disclosure, digital content transitioning from one representation to another may be referred to as a state change and/or an evolution. In a number of embodiments, an evolution may be triggered by the artist, by an event associated with the owner of the artwork, randomly, and/or by an external event.

When NFTs representing digital content are acquired in accordance with some embodiments of the invention, they may also be associated with the transfer of corresponding physical artwork, and/or the rights to said artwork. The first ownership records for NFTs may correspond to when the NFT was minted, at which time its ownership can be assigned to the content creator. Additionally, in the case of "lazy" minting, rights may be directly assigned to a buyer.

In some embodiments, as a piece of digital content evolves, it may also change its representation. The change in NFTs may also send a signal to an owner after it has evolved. In doing so, a signal may indicate that the owner has the right to acquire the physical content corresponding to the new state of the digital content. Under an earlier example, buying a live mouse artwork, as an NFT, may also carry the corresponding painting, and/or the rights to it. A physical embodiment of an artwork that corresponds to that same NFT may also be able to replace the physical artwork when the digital content of the NFT evolves. For example, should the live mouse artwork NFT change states to a decaying mouse, an exchange may be performed of the corresponding painting for a painting of a decaying mouse.

The validity of one of the elements, such as the physical element, can be governed by conditions related to an item with which it is associated. For example, a physical painting may have a digital authenticity value that attests to the identity of the content creator associated with the physical painting.

An example of a physical element 1690 corresponding to an NFT, in accordance with some embodiments of the invention is illustrated in FIG. 16A. A physical element 1690 may be a physical artwork including, but not limited to, a drawing, a statue, and/or another physical representation of art. In a number of embodiments, physical representations of the content (which may correspond to a series of paintings) may each be embedded with a digital authenticity value (or a validator value) value. In accordance with many embodiments of the invention, a digital authenticity value (DAV) 1680 may be therefore be associated with a physical element 1690 and a digital element. A digital authenticity value may be a value that includes an identifier and a digital signature on the identifier. In some embodiments the identifier may specify information related to the creation of the content. This information may include the name of the artist, the identifier 1630 of the digital element corresponding to the physical content, a serial number, information such as when it was created, and/or a reference to a database in which sales data for the content is maintained. A digital signature element affirming the physical element may be made by the content creator and/or by an authority associating the content with the content creator.

In some embodiments, the digital authenticity value 1680 of the physical element 1690 can be expressed using a visible representation. The visible representation may be an optional physical interface 1670 taken from a group including, but not limited to, a barcode and a quick response (QR) code encoding the digital authenticity value. In some embodiments, the encoded value may also be represented in an authenticity database. Moreover, the physical interface 1670 may be physically associated with the physical element. One example of such may be a QR tag being glued to or printed on the back of a canvas. In some embodiments of the invention, the physical interface 1670 may be possible to physically disassociate from the physical item it is attached to. However, if a DAV 1680 is used to express authenticity of two or more physical items, the authenticity database may detect and block a new entry during the registration of the second of the two physical items. For example, if a very believable forgery is made of a painting the forged painting may not be considered authentic without the QR code associated with the digital element.

In a number of embodiments, the verification of the validity of a physical item, such as a piece of artwork, may be determined by scanning the DAV. In some embodiments, scanning the DAV may be used to determine whether ownership has already been assigned. Using techniques like this, each physical item can be associated with a control that prevents forgeries to be registered as legitimate, and therefore, makes them not valid. In the context of a content creator receiving a physical element from an owner, the content creator can deregister the physical element 1690 by causing its representation to be erased from the authenticity database used to track ownership. Alternatively, in the case of an immutable blockchain record, the ownership blockchain may be appended with new information. Additionally, in instances where the owner returns a physical element, such as a painting, to a content creator in order for the content creator to replace it with an "evolved" version, the owner may be required to transfer the ownership of the initial physical element to the content creator, and/or place the physical element in a stage of being evolved.

Figure 17:
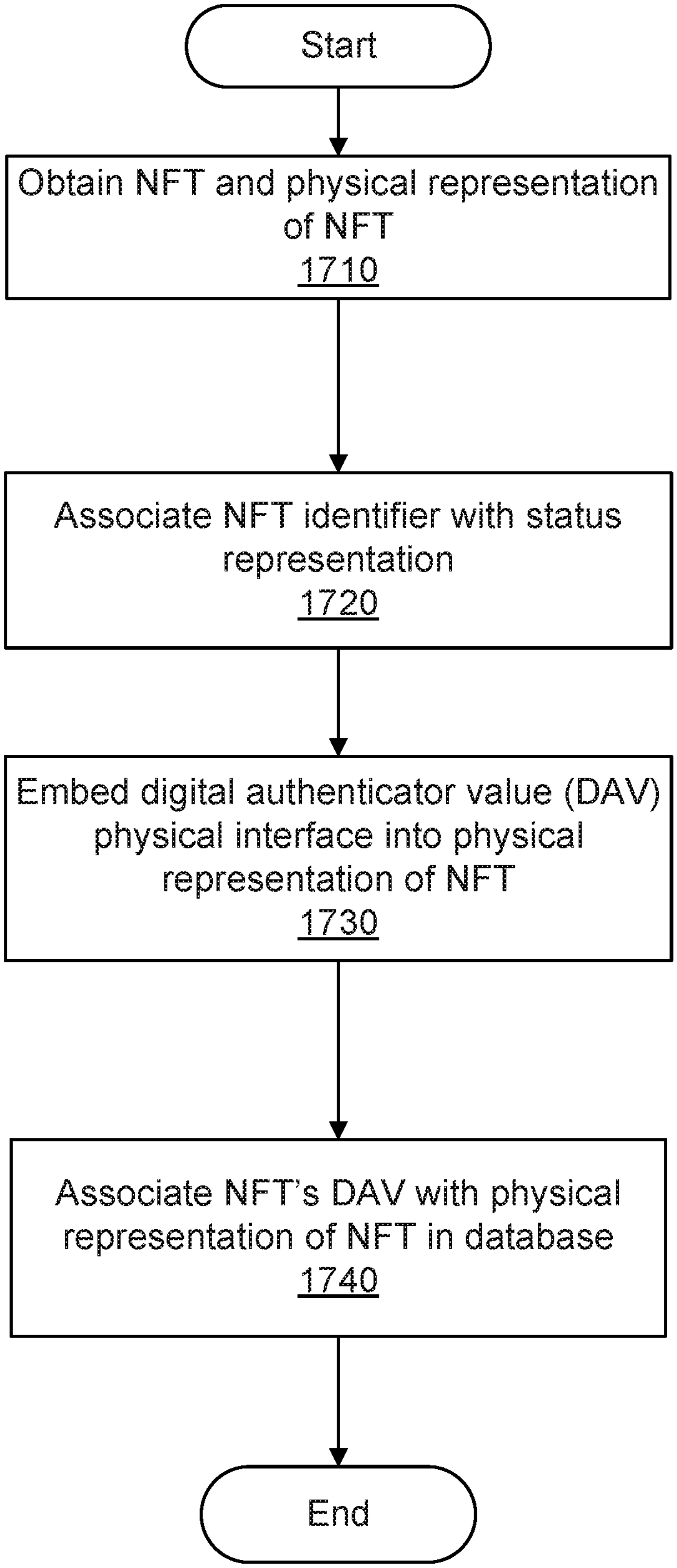
FIG. 17 illustrates a process for establishing a relationship between an NFT and corresponding physical content.

An example of a process for connecting an NFT digital element to physical content in accordance with some embodiments of the invention is illustrated in FIG. 17. Process 1700 may obtain (1710) an NFT and a physical representation of the NFT in connection with an NFT transaction. Under the earlier example, this may be a painting of a living mouse and an NFT of a living mouse. By virtue of establishing ownership of the NFT, the process 1700 may associate (1720) an NFT identifier with a status representation of the NFT. The NFT identifier may specify attributes including, but not limited to, the creator of the mouse painting and NFT ("Artist"), the blockchain the NFT is on ("NFT-Chain"), and an identifying value for the digital element ("no. 0001"). Meanwhile, the status representation may clarify the present state of the NFT ("alive mouse"). Process 1700 may also embed (1730) a DAV physical interface into the physical representation of the NFT. In a number of embodiments of the invention, this may be done by implanting a QR code into the back of the mouse painting. In affirming the connection between the NFT and painting, Process 1700 can associate (1740) the NFT's DAV with the physical representation of the NFT in a database. In some embodiments, the association can be performed through making note of the transaction and clarifying that it encapsulates both the mouse painting and the mouse NFT.

While specific processes are described above with reference to FIGS. 15-28, NFTs can be implemented in any of a number of different ways to enable as appropriate to the requirements of specific applications in accordance with various embodiments of the invention. Additionally, the specific manner in which NFTs can be utilized within NFT platforms in accordance with various embodiments of the invention is largely dependent upon the requirements of a given application.

While the above description contains many specific embodiments of the invention, these should not be construed as limitations on the scope of the invention, but rather as an example of one embodiment thereof. Accordingly, the scope of the invention should be determined not by the embodiments illustrated, but by the appended claims and their equivalents.

What is claimed is:

1. A method for minting tokens, the method comprising:
identifying a set of one or more input tokens stored on a blockchain ledger, each input token of the set of one or more input tokens being associated with a smart contract on the blockchain ledger;
generating an output token based on the set of one or more input tokens, wherein generating the output token comprises storing, in the output token, at least one encrypted reference to at least one input token of the set of one or more input tokens, wherein the at least one encrypted reference comprises a location of the at least one input token of the set of one or more input tokens on the blockchain ledger; and
storing the output token to the blockchain ledger, wherein storing the output token comprises using a consensus mechanism to approve a transaction to store the output token to the blockchain ledger, wherein the consensus mechanism achieves consensus based on verification of a proof submitted in response to a challenge.

2. The method of claim 1, wherein:
the set of input tokens comprises a first token, the first token comprising a set of detailed information; and
generating the output token comprises associating the output token with a generalization of at least a portion of the set of detailed information.

3. The method of claim 2, wherein:
the first token is an identity token associated with an individual;
the set of detailed information comprises a birthdate of the individual; and
the generalization indicates whether an age of the individual is over a threshold value and does not include the birthdate.

4. The method of claim 1, wherein:
the set of input tokens comprises a first input token with a first policy and a second input token with a second policy;
the method further comprises generating a third policy based on the first policy and the second policy; and
generating the output token comprises associating the output token with the third policy.

5. The method of claim 1, wherein:
the set of input tokens comprises an identity token for an individual;
the output token comprises a license for the individual; and
generating the output token comprises storing an expiration component in the output token, where a validity of the license can be determined based on the expiration component.

6. The method of claim 5, wherein:
the expiration component comprises a hash chain; and
the validity of the license can be determined based on an amount of the hash chain that can be decrypted by the individual.

7. The method of claim 1, wherein the set of input tokens is a first set of input tokens and at least one of the set of input tokens was generated based on a second set of input tokens.

8. The method of claim 7, wherein the output token comprises a graph structure representing a hierarchy of tokens including the first and second sets of input tokens, wherein generating the output token comprises storing a digital signature of the set of input tokens.

9. The method of claim 1, wherein generating the output token comprises:
determining whether a set of one or more conditions has been met; and
generating the output token is performed when the set of conditions has been met.

10. The method of claim 9, wherein determining whether the set of conditions has been met comprises:
evaluating the set of input tokens to determine whether the set of input tokens meets at least one condition of the set of conditions; and generating the output token is performed when the set of input tokens meets the at least one condition.

11. The method of claim 10, wherein:

the set of input tokens comprises a biometric verification token;

evaluating the set of input tokens comprises determining whether to authorize a user based on the biometric verification token and a communication with a digital rights management (DRM) unit; and the DRM unit comprises a biometric scanner.

12. The method of claim 9, wherein determining whether the set of conditions has been met comprises:

evaluating a processing environment associated with at least one of the set of input tokens and the output token meets at least one condition of the set of conditions; and generating the output token is performed when the processing environment meets the at least one condition.

13. The method of claim 1, wherein:

data from at least one of the set of input tokens is encrypted with a first encryption key; and generating the output token comprises:

decrypting the data from the at least input token;

encrypting the data from the at least one input token with a different second encryption key; and storing the data encrypted with the second encryption key in the output token.

14. The method of claim 1, wherein:

the set of input tokens comprises a first token comprising a first identifier of an entity associated with the first token;

the first identifier is a public key associated with the entity;

the generated output token comprises a second identifier of the entity and an encrypted reference to the first token; and the encrypted reference to the first token is an encrypted copy of the public key.

15. The method of claim 1, wherein:

the set of input tokens comprises:

a set of one or more content tokens; and at least one token comprising instructions to render content from the set of content tokens; and generating the output token comprises rendering the content from the set of content tokens based on the instructions.

16. The method of claim 1, wherein:

generating the output token comprises generating a log entry indicating use of at least one of the set of input tokens;

the log entry comprises an identifier of an entity associated with the at least one input token; and the identifier is an alias for the entity.

17. A non-transitory machine readable medium containing processor instructions for minting tokens, where execution of the instructions by a processor causes the processor to perform a process that comprises:

identifying a set of one or more input tokens stored on a blockchain ledger, each input token of the set of one or more input tokens being associated with a smart contract on the blockchain ledger;

generating an output token based on the set of one or more input tokens, wherein generating the output token comprises storing, in the output token, at least one encrypted reference to at least one input token of the set of one or more input tokens, wherein the at least one encrypted reference comprises a location of the at least one input token of the set of one or more input tokens on the blockchain ledger; and storing the output token to the blockchain ledger, wherein storing the output token comprises using a consensus mechanism to approve a transaction to store the output token to the blockchain ledger, wherein the consensus mechanism achieves consensus based on verification of a proof submitted in response to a challenge.

18. A token minting system comprising:

a set of one or more processors; and a non-transitory machine readable medium containing processor instructions for minting tokens, where execution of the instructions by a processor causes the processor to perform a process that comprises:

identifying a set of one or more input tokens stored on a blockchain ledger, each input token of the set of one or more input tokens being associated with a smart contract on the blockchain ledger;

generating an output token based on the set of one or more input tokens, wherein generating the output token comprises storing, in the output token, at least one encrypted reference to at least one input token of the set of one or more input tokens, wherein the at least one encrypted reference comprises a location of the at least one input token of the set of one or more input tokens on the blockchain ledger; and storing the output token to the blockchain ledger, wherein storing the output token comprises using a consensus mechanism to approve a transaction to store the output token to the blockchain ledger, wherein the consensus mechanism achieves consensus based on verification of a proof submitted in response to a challenge.

19. The method of claim 1, wherein the consensus mechanism is selected from Proof of Space mechanisms, Proof of Work mechanisms, Proof of Stake mechanisms, and hybrid mechanisms.

* * * * *